(12) United States Patent
Polk et al.

(10) Patent No.: US 8,535,582 B2
(45) Date of Patent: Sep. 17, 2013

(54) METHOD OF FORMING A MOLDED ARTICLE BY WIRELESS CONTROL

(75) Inventors: Donald Polk, Titusville, FL (US); Dale E. Polk, Jr., Titusville, FL (US)

(73) Assignee: LRM Industries International, Inc., Rockledge, FL (US)

( * ) Notice: Subject to any disclaimer, the term of this patent is extended or adjusted under 35 U.S.C. 154(b) by 137 days.

(21) Appl. No.: 12/998,434

(22) PCT Filed: Oct. 22, 2009

(86) PCT No.: PCT/US2009/005765
§ 371 (c)(1),
(2), (4) Date: Apr. 20, 2011

(87) PCT Pub. No.: WO2010/047811
PCT Pub. Date: Apr. 29, 2010

(65) Prior Publication Data
US 2011/0193253 A1 Aug. 11, 2011

Related U.S. Application Data

(60) Provisional application No. 61/107,716, filed on Oct. 23, 2008.

(51) Int. Cl.
*B29C 37/00* (2006.01)
*B29C 69/00* (2006.01)

(52) U.S. Cl.
USPC ... 264/40.1; 264/40.7; 264/297.1; 264/297.8; 425/150; 425/162; 425/167; 425/193

(58) Field of Classification Search
USPC .............. 264/40.1–40.7, 297.1, 297.2, 297.8, 264/297.9; 425/150, 162, 163, 165–167, 425/169, 170
See application file for complete search history.

(56) References Cited

U.S. PATENT DOCUMENTS
4,824,627 A 4/1989 Hammer et al.
5,741,528 A * 4/1998 Amano et al. .................. 425/29
(Continued)

FOREIGN PATENT DOCUMENTS
JP 2003-251708 * 9/2003

*Primary Examiner* — Jill Heitbrink
(74) *Attorney, Agent, or Firm* — M.A. Ervin & Associates; Michael A. Ervin

(57) ABSTRACT

The present invention relates to a method and molding system (1) for forming a molded plastic article by wireless control. The molding system includes a primary controller (12) that is adapted to engage in wireless communications with the carriage controller (45) of one or more self-propelled carriages (15). Each carriage (15) includes a carriage location indicator (62) that determines the location of the carriage, which is transmitted substantially continuously to the carriage controller (45), and then communicated substantially continuously and wirelessly from the carriage controller to the primary controller (12). The primary controller (12) wirelessly communicates position directives (e.g., a polymer introduction station position directive) to each carriage controller (45), which correspondingly provides operational position instructions to each carriage's respective propulsion system (30), so as to re-position at least one carriage. The primary controller also provides directives to other secondary controllers in the molding system, depending on the status of, and in particular the location of the various carriages within, the molding system. For example, with a carriage (15) positioned in the polymer introduction station (18), the primary controller (12) communicates one or more polymer introduction directives to a polymer introduction controller (68), which then provides operational polymer introduction instructions to a polymer introduction apparatus (71), such as an extruder, thus resulting in the introduction of a polymer composition into contact with the interior mold surface (27) of the mold (24), and accordingly formation of a molded article.

27 Claims, 25 Drawing Sheets

(56) References Cited

U.S. PATENT DOCUMENTS

| | | |
|---|---|---|
| 5,783,229 A | 7/1998 | Manlove |
| 2002/0098256 A1* | 7/2002 | Polk, Jr. .................. 425/258 |
| 2003/0118682 A1* | 6/2003 | Hinzpeter et al. ............ 425/167 |
| 2003/0198705 A1* | 10/2003 | Foreman et al. ........... 425/174.4 |
| 2004/0213868 A1* | 10/2004 | Hinzpeter et al. ............. 425/167 |
| 2008/0057285 A1 | 3/2008 | Polk |
| 2008/0057286 A1 | 3/2008 | Polk et al. |

\* cited by examiner

METHOD OF FORMING A MOLDED ARTICLE BY WIRELESS CONTROL

This application claims priority of U.S. provisional application 61/107,716, filed Oct. 23, 2008.

FIELD OF THE INVENTION

The present invention relates to a method and molding system for forming a molded plastic article. In particular it relates to performing the molding operation by wireless control.

BACKGROUND OF THE INVENTION

Formation of a molded plastic article typically involves a number of operations, such as introducing plastic material (e.g., molten plastic material) into or onto a mold, forming the molded article within or on the mold (which usually involves a cooling sequence), and removing the molded article from the mold. In the case of compression molding, a compression operation is undertaken in which, for example, an upper mold half is compressed against plastic material previously introduced into or onto a lower mold half.

While the various molding operations may be conducted at the same location, this can result in production inefficiencies. For example, during the molding, cooling and de-molding operations, the apparatus used to introduce plastic material into the mold (e.g., an extruder) typically must rest idle, until the other operations are completed and the mold is cleared.

To improve production efficiencies, the various molding operations may be positioned at separate locations or stations, and one or more (typically two or more) molds are moved between the various stations. This allows for the contemporaneous performance of different operations. In one approach, two or more molds are moved back and forth along a linear line having separate mold operation stations (e.g., separate polymer injection, molding or compression, and de-molding stations). With a linear line approach, however, usually at least one operation must be duplicated, typically at or near the terminal ends of the linear line, which can result in increased equipment costs. For example, a de-molding station may have to be located at both ends of the linear line, with a separate compression molding station interposed between each terminal de-molding station and a single centrally located polymer introduction station.

In another approach, a rotary arm system having a mold at the end of each arm may be employed. With each registered turn of the rotary arm system, each mold is moved from one station to the next. Rotary arm molding systems are not, however, particularly well suited for use with molding processes that require one or more molds to be moved at different linear velocities. With rotary arm molding systems, which are typically rigid, as one arm moves, so do all the other arms. For example, in a compression molding process, the lower mold may have to be moved reciprocally and/or at variable linear velocities while plastic material is introduced therein (e.g., to achieve a substantially even distribution of plastic material over the interior mold surface). Linear movement of the molds during the other operations, such as the compression molding operation, is typically undesirable. In addition, the formation of large molded articles requires the construction of a large, costly and often heavy rotary arm system, which can be difficult to operate.

There is a need then to develop new methods and systems for forming molded plastic articles. In particular, it would be desirable that such newly developed methods and systems allow for the contemporaneous performance of separate and preferably different molding related operations, coupled with a minimum of operational and equipment duplication, and improved production efficiencies.

SUMMARY OF THE INVENTION

This need is met by the present invention, which provides a method of forming a molded article comprising: providing a molding system comprising, a primary controller adapted to engage in wireless communications, at least one carriage, each carriage being self-propelled and comprising a mold having an interior mold surface, a propulsion system comprising a drive motor drivingly coupled to a drive mechanism, a carriage controller operationally coupled to the propulsion system, and a carriage location indicator coupled to the carriage controller, the carriage controller being adapted to wirelessly communicate with the primary controller, a polymer introduction station comprising a polymer introduction apparatus, a polymer introduction controller operationally coupled to the polymer introduction apparatus, and the primary controller being controllably coupled to the polymer introduction controller, and a molded article removal station, wherein the primary controller is remotely located relative to each carriage, the polymer introduction station, and the molded article removal station, each carriage is reversibly positionable between the polymer introduction station and the molded article removal station, the primary controller is adapted to communicate wirelessly and controllably with each carriage controller, and the primary controller is free of a physical connection to each carriage; determining substantially continuously a location of each carriage by means of the carriage location indicator of each carriage; transmitting substantially continuously the location of each carriage from the carriage location indicator to the carriage controller of each carriage, and communicating substantially continuously and wirelessly the location of each carriage from the carriage controller of each carriage to the primary controller; communicating wirelessly a polymer introduction station position directive from the primary controller to the carriage controller, and providing operational polymer introduction station position instructions from the carriage controller to the propulsion system and correspondingly controlling movement of the carriage, thereby positioning the carriage at the polymer introduction station; communicating a polymer introduction directive from the primary controller to the polymer introduction controller, and providing operational polymer introduction instructions from the polymer introduction controller to the polymer introduction apparatus, thereby causing a polymer composition to be introduced from the polymer introduction apparatus into contact with the interior mold surface of the mold, thereby forming the molded article; communicating wirelessly a molded article removal station position directive from the primary controller to the carriage controller, and providing operational molded article removal station position instructions from the carriage controller to the propulsion system and correspondingly controlling movement of the carriage, thereby positioning the carriage at the molded article removal station; and removing the molded article from the mold of the carriage at the molded article removal station.

In accordance with the present invention, there is further provided a molding system as described above, wherein, the primary controller is remotely located relative to each carriage, the polymer introduction station, and the molded article removal station, each carriage is reversibly positionable between the polymer introduction station and the molded article removal station, the primary controller is adapted to communicate wirelessly and controllably with each carriage controller, and the primary controller is free of a physical connection to each carriage, further wherein operation of the molding system comprises, substantially continuous determination of a location of each carriage by means of the carriage location indicator of each carriage, substantially continuous transmission of the location of each carriage from the carriage location indicator to the carriage controller of each carriage, and substantially continuous wireless communication of the location of each carriage from the carriage controller of each carriage to the primary controller, wireless communication of a polymer introduction station position directive from the primary controller to the carriage controller, and operational polymer introduction station position instructions provided from the carriage controller to the propulsion system and correspondingly movement of the carriage being controlled, the carriage thereby being positioned at the polymer introduction station, communication of a polymer introduction directive from the primary controller to the polymer introduction controller, and operational polymer introduction instructions provided from the polymer introduction controller to the polymer introduction apparatus, a polymer composition resultantly being introduced from the polymer introduction apparatus into contact with the interior mold surface of the mold, a molded article thereby being resultantly formed, and wireless communication of a molded article removal station position directive from the primary controller to the carriage controller, and operational molded article removal station position instructions provided from the carriage controller to the propulsion system and correspondingly movement of the carriage being controlled, the carriage thereby being positioned at the molded article removal station where the molded article is removed from the mold.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred (though non-limiting) embodiments of the invention are illustrated and described.

As used herein and in the claims, terms of orientation and position, such as, "upper", "lower", "inner", "outer", "right", "left", "vertical", "horizontal", "top", "bottom", and similar terms, are used to describe the invention as oriented and depicted in the drawings. Unless otherwise indicated, the use of such terms is not intended to represent a limitation upon the scope of the invention, in that the invention may adopt alternative positions and orientations.

Unless otherwise indicated, all numbers or expressions, such as those expressing structural dimensions, quantities of ingredients, etc., as used in the specification and claims are understood as modified in all instances by the term "about."

BRIEF DESCRIPTION OF THE DRAWINGS

In FIGS. 1 through 26, like reference numerals designate the same components and structural features, unless otherwise indicated.

DETAILED DESCRIPTION OF THE INVENTION

Figure 1:
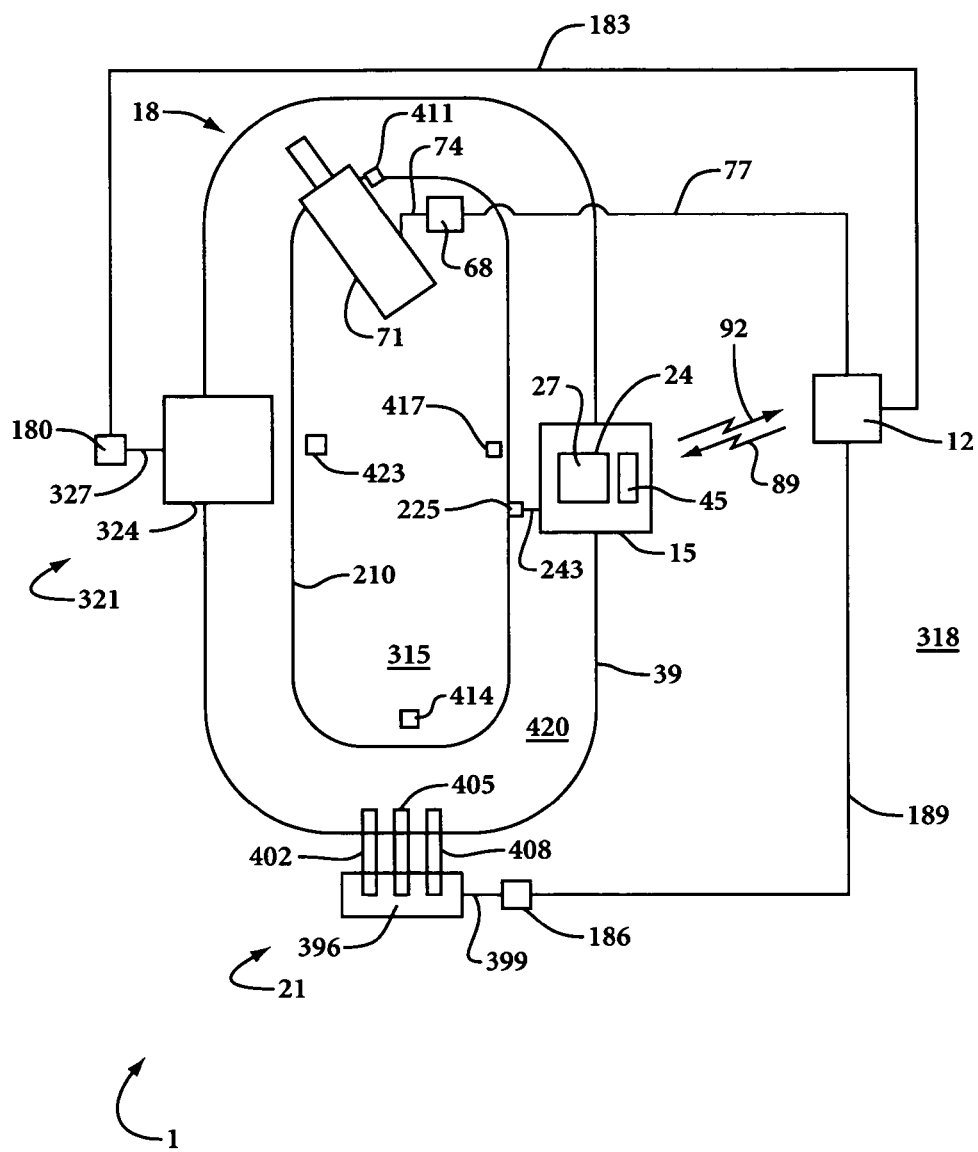
FIG. 1 is a top plan schematic representation of a molding system according to the present invention.

With reference to FIG. 1, the method of the present invention involves providing a molding system 1 that includes a primary controller 12 that is adapted to engage in wireless communications. The molding system also includes at least one carriage 15, a polymer introduction station 18 and a molded article removal station 21. The primary controller is remotely located relative to each carriage, and each station (e.g., the polymer introduction station, optional compression molding station, and the molded article removal station) of the molding system.

Each carriage (e.g., carriage 15) of the molding system is self-propelled and includes a mold 24 having an interior mold surface 27. The mold that is supported and transported by the carriage may be selected from art-recognized molds, including, for example, injection molds, compression molds and/or thermoforming molds. In the case of injection molding, the injection mold that resides on the carriage typically has a substantially enclosed interior mold space (defined by two or more reversibly positionable and abutting mold portions) into which a thermoplastic or thermosetting plastic composition is injected. With compression molding, the compression mold typically includes a lower mold portion that resides on the carriage, and onto which plastic material is deposited, and which is then transported on the carriage to a compression molding station where an upper mold portion is compressively contacted with the previously deposited plastic material. With thermoforming processes, a thermoforming mold resides on the carriage, and a heated thermoplastic sheet is intimately contacted with the mold surface thereof.

Figure 4:
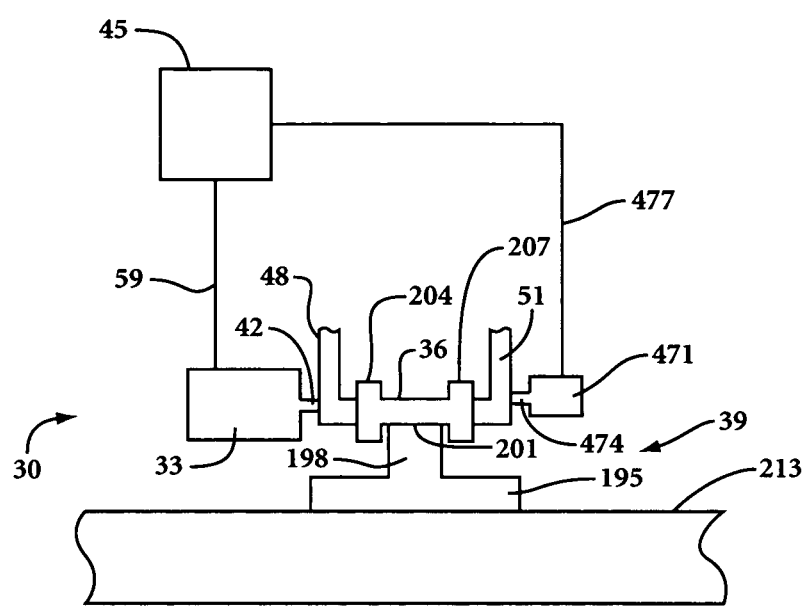
FIG. 4 is an elevational schematic representation of the propulsion system of a carriage according to the present invention.

With reference to FIG. 4, each carriage further includes a propulsion system 30 that includes a drive motor 33 that is coupled drivingly to a drive mechanism 36. The propulsion system allows each carriage to be reversibly and independently positionable between the various stations of the molding system (e.g., the polymer introduction station, the optional compression molding station and the molded article removal station). The drive mechanism may be selected from known drive mechanisms, such as wheels (e.g., smooth wheels and toothed wheels) and/or tracks that may engage drivingly and directly with the ground or floor, or another element, such as a guide track. For reference and as depicted in the drawings, drive mechanism 36 is in the form of a substantially smooth wheel that engages frictionally, rotationally and drivingly with a guide track 39, as will be discussed in further detail herein. The drive motor may be drivingly coupled to the drive mechanism by any suitable means, such as by means of a chain, a belt or a drive shaft. For example, drive motor 33 is drivingly coupled to drive mechanism 36 by means of a drive shaft 42.

The drive mechanism may be connected to the carriage by suitable means. For example, drive mechanism 36 is coupled to carriage 15 by a first upwardly extending support 48 and a second support upwardly extending support 51. The first and second drive mechanism supports (e.g., 48, 51) may be attached to a plate (not shown) that engages rotationally with the underside of the carriage. Drive motor 33 is also typically fixedly attached to the carriage. For example, drive motor 33 is attached to the underside 53 of carriage 15 by means of an upwardly extending support 56. See FIGS. 4 and 8.

Each carriage of the molding system may optionally and independently further include a steering mechanism (not shown), which may be selected from art-recognized steering mechanisms. The steering mechanism may be part of and/or separate from the propulsion system and in particular part the drive mechanism of the carriage. For example, drive mechanism 36 may be controllably rotatable about its vertical axis, thereby both driving and steering the carriage. Alternatively, or in addition thereto, the carriage may include one or more wheels, separate from drive mechanism 36, that are each controllably rotatable about their vertical axes. In an embodiment, the drive mechanism of the carriage is in the form of two separate and substantially parallel tracks that are each separately driven (e.g., by means of a transmission). To steer or turn the carriage: one track may be stopped while the other track continues to be driven; or each track may be driven in a direction opposite of the other track.

Carriage 15 also includes a carriage controller 45 (in FIG. 4) that is adapted to wirelessly communicate with primary controller 12. The carriage controller is operationally coupled to the propulsion system of the carriage. As used herein and in the claims the term "operationally coupled" and similar terms, such as operational coupling, means a secondary controller (e.g., the carriage controller) that is coupled to a device (e.g., the carriage propulsion system) so as to control the operation of that device. As used herein, the term "secondary controller" and similar terms means a controller that is other than the primary controller, and which controls the operations of a portion (e.g., a carriage or station) of the molding system. With the molding system of the present invention, secondary controllers include, but are not limited to, the carriage controllers, the polymer introduction controller, the optional compression mold controller, and the optional molded article removal station controller.

The operational coupling between a secondary controller and the device (the operation of which is governed by the secondary controller) may be a wireless coupling (e.g., involving wireless communication), or a physical (or direct) coupling. Physical couplings in the present invention may be selected from mechanical couplings and/or electrical couplings, and are more typically selected from electrical couplings. Physical couplings that may be used in the method and systems of the present invention are typically selected from hard-wired couplings, such as metal cables (e.g., comprising aluminum and/or copper cables) and/or fiber-optic cables, and may be more particularly selected from ethernet cables, device net cables and/or serial cables. Typically, in the present invention, the operational coupling between a secondary controller, such as a carriage controller or a station controller, and a particular device is a physical coupling, and in particular a hard-wired coupling. Operational instructions and/or data, in analog and/or digital form, may be passed or transmitted through an operational coupling. More particularly, a plurality of signals and/or data, in digital and/or analog form, may be contemporaneously transmitted through a single operational coupling (e.g., physical or wireless operational coupling) in accordance with art-recognized methods, such as multiplexing.

With reference to FIG. 4, carriage controller 45 is operationally coupled to propulsion system 30 by means of physical coupling 59. In particular, carriage controller 45 is operationally coupled to drive motor 33 by means of physical coupling 59. Carriage controller 45 may control the operation of drive motor 33, and correspondingly propulsion system 30, by means of analog and/or digital signals delivered through physical coupling 59. In addition, carriage controller 45 may receive analog and/or digital signals from drive motor 33 through the same physical coupling 59.

Figure 5:
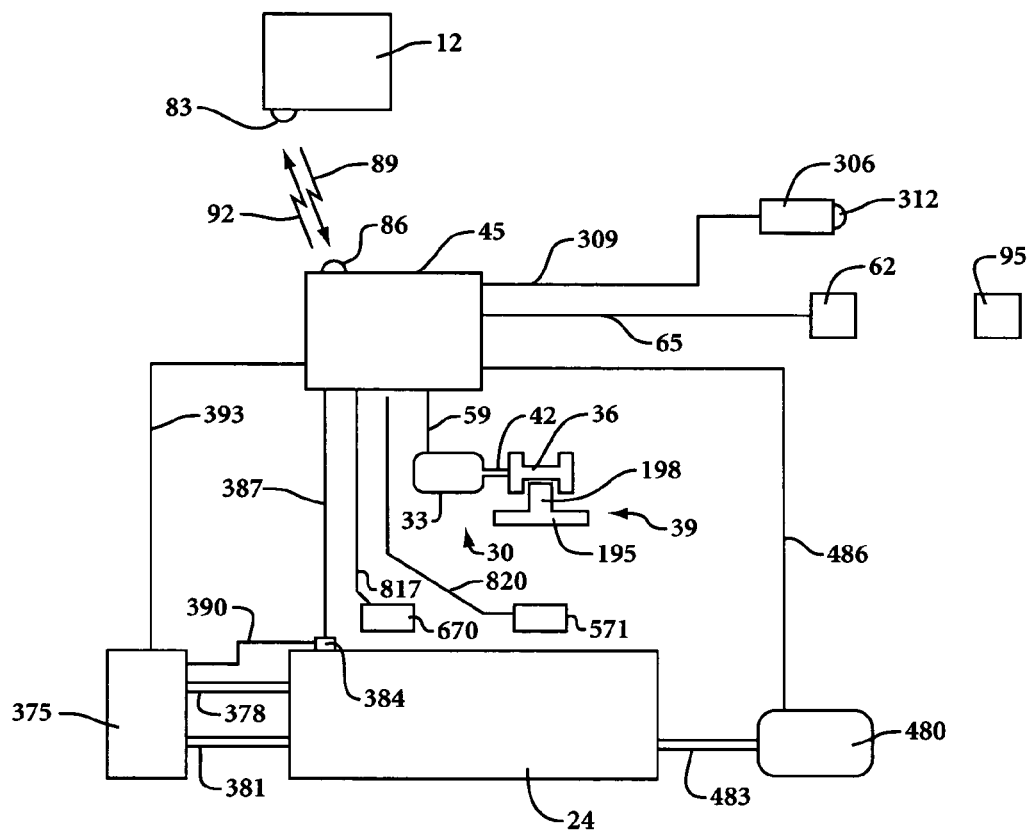
FIG. 5 is a representative schematic of a carriage controller coupled to various elements of a carriage of the molding system according to the present invention.

The carriage also includes a carriage location indicator that is coupled to the carriage controller. The carriage location indicator, as will be discussed in further detail herein, determines, either alone or in combination with elements separate from the carriage (e.g., a separate position indicator or a station position indicator), the location of the carriage as the carriage moves amongst and between the various stations of the molding system. The location of the carriage is transmitted: from the carriage location indicator to the carriage controller; and then wirelessly from the carriage controller to the primary controller. The coupling between the carriage controller and the carriage location indicator may be a wireless or physical coupling, and more typically is a physical coupling. With reference to FIG. 5, carriage control system 3 includes a carriage location indicator 62 that is coupled to carriage controller 45 by means of physical coupling 65. The nature of the communications between carriage controller 45 and carriage location indicator 62 typically involves data transfer from indicator 62 to carriage controller 45, and does not typically involve the transfer of operational instructions from carriage controller 45 to carriage location indicator 62. As such, the coupling between the carriage controller and the carriage location indicator is primarily a data transfer coupling rather than an operational coupling.

The molding system of the present invention further includes a polymer introduction station. With reference to FIG. 1, polymer introduction station 18 includes a polymer introduction controller 68 that is operationally coupled to a polymer introduction apparatus 71. The operational coupling between polymer introduction controller 68 and polymer introduction apparatus 71 may be a wireless or physical coupling, and more typically is a physical coupling, such as physical coupling 74. Polymer introduction controller 68 controls the operation of polymer introduction apparatus 71 by means of physical coupling 74. Primary controller 12 is controllably coupled to polymer introduction controller 68. The controllable coupling between primary controller 12 and polymer introduction controller 68 may be a wireless or physical coupling, and more typically is a physical coupling, such as physical coupling 77.

The polymer introduction apparatus may be selected from such apparatuses as are known to the skilled artisan, such as, single screw extruders, co- or counter-rotating twin screw extruders, internal mixers or compounders, such as a BANBURY mixer, and combinations thereof. Typically, the polymer introduction apparatus is an extruder, and in particular a single screw extruder having a plurality of variably configured screw flights and temperature controlled zones.

As used herein and in the claims, the term "controllably coupled" and similar terms, such as control coupling, means a coupling between the primary controller and a secondary controller (e.g., a carriage controller or station controller) of the molding system. The primary controller provides directives to the various secondary controllers by means of the control couplings. As used herein and in the claims, the term "directive(s)" means one or more instructions provided from the primary controller to a secondary controller. In the method and apparatus of the present invention, the primary controller overseas and keeps track of all operations within the molding system, and at particular times (depending on the status of the molding system) provides directives to the secondary controllers, which then causes the secondary controllers to provide operational instructions to the various devices to which they are operationally coupled.

The primary controller is a processor based controller having at least one processor that includes a plurality of control programs, which may be described as a primary programmable controller comprising a plurality of control programs. The secondary controllers may each independently be processor based or non-processor based controllers. Processor based secondary controllers have at least one processor that includes one or more operational computer programs (e.g., open and/or closed-loop computer programs or software), and may be described in each case as a secondary programmable controller comprising at least one operational program. Non-processor based secondary controllers are typically free of a processor unit, and include instead analog and/or digital circuitry. More typically, the secondary controllers are processor based controllers. When a directive is communicated from the primary controller to a secondary controller, one or more programs (in the case of a processor based secondary controller) or circuits (in the cased of a non-processor based secondary controller) of the secondary controller are activated. The operational programs or circuitry of the secondary controller may operate sequentially and/or concurrently (e.g., in a cascade fashion and/or in concert), upon receipt of a directive from the primary controller. The directives from the primary controller may have a relatively simple format and in effect act as on-off or go/no-go instructions. Alternatively, the directives from the primary controller may have a more complex format, including for example a plurality of instructions.

In an embodiment of the present invention, the primary controller and each of the secondary controllers are processor based controllers. More particularly, the primary controller is a primary programmable controller comprising a plurality of control programs; and each of the secondary controllers are independently a secondary programmable controller comprising at least one operational program, for example, the carriage controller being a carriage programmable controller comprising at least one operational program, and the polymer introduction controller being a polymer introduction programmable controller comprising at least one operational program.

Figure 3:
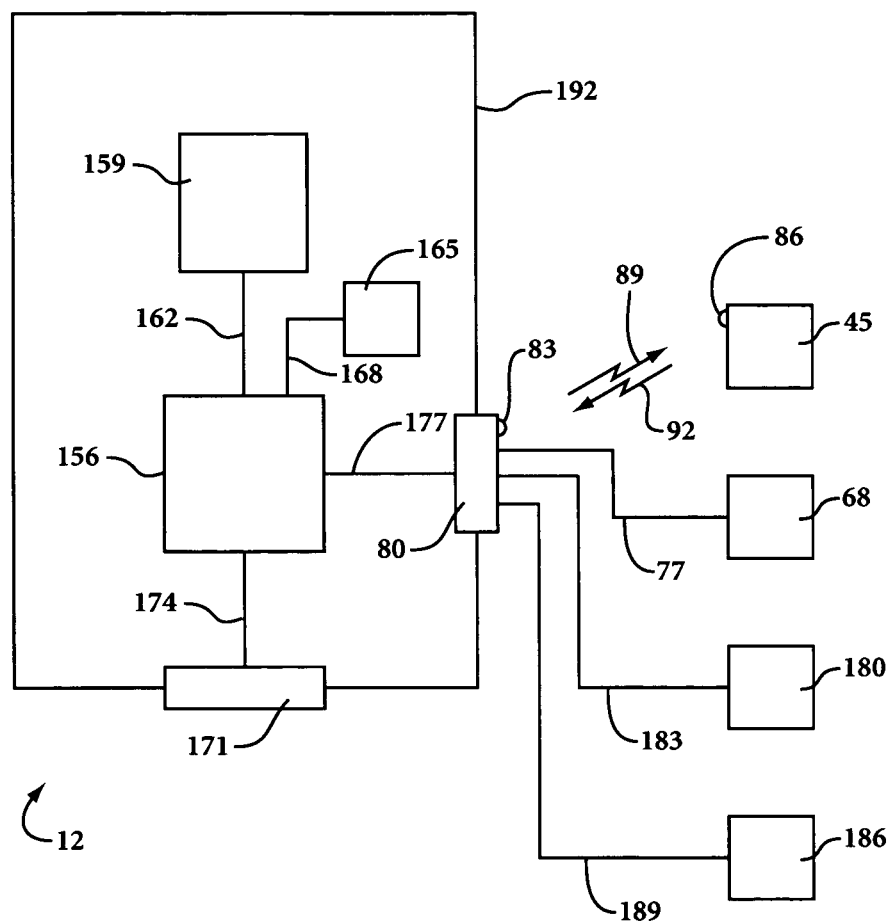
FIG. 3 is a schematic representation of the primary controller, which is coupled to various secondary controllers of the molding system of the present invention.

The various components of a processor based (or programmable) controller, such as the primary controller may be more particularly described with reference to FIG. 3. Primary controller 12, as depicted in FIG. 3, includes a primary central processor unit 156, which typically contains, or is operative upon, a plurality of control programs (e.g., computer programs designed to direct and control the operations of the various stations of the molding system). Typically, the computer program or programs of the primary controller are selected from ladder logic computer programs, such as RSLogix 5000, which is commercially available from Rockwell Automation. Primary central processor unit 156 is typically coupled to a primary database unit 159 by means of a primary database coupling 162. Primary database unit 159 typically includes a plurality of databases (e.g., $DB_i$ through $DB_n$ as illustrated) into which data is stored and/or retrieved by primary central processor unit 156 via database coupling

162. Primary controller 12 may optionally further include a primary memory unit 165 that is coupled to primary central processor unit 156 by means of primary memory coupling 168. Optional primary memory unit 165 may be used to store additional information, such as data, databases and/or one or more computer programs. In an alternative configuration, primary database unit 159 and primary memory unit 165 are combined and together form a substantially unitary database/memory unit.

A primary user interface unit 171 also typically forms a part of primary controller 12, and is coupled to primary central processor unit 156 by means of primary user interface coupling 174. Primary user interface unit 171 typically includes a keyboard unit and a visual monitor unit (not shown). Primary user interface unit 171 allows a human user to interface with primary programmable controller 12 and in particular primary central processor unit 156 thereof (e.g., enter and/or retrieve data, enter commands, enter programs, and/or monitor the status of the molding system, including any station thereof). Primary controller 12 may optionally include one or more data transfer ports (not shown) coupled to primary central processor unit 156, which allow for the transfer of data and/or programs into and/or out of primary central processor unit 156. In an embodiment, the data transfer ports are selected from universal serial bus (or USB) ports, into which the adapter of a USB cable or flash (or stick) memory device is received.

Primary controller 12 also typically includes a primary input-output unit 80 that is coupled to primary central processor unit 156 by primary input-output coupling 177. Primary input-output unit 80 is the principal unit by which primary processor unit 156 provides directives to and optionally receives data from the various secondary controllers of the molding system by means of wireless and/or physical control couplings. Primary input-output unit 80 is controllably coupled to: polymer introduction controller 68 by means of physical control coupling 77; to optional compression mold controller 180 by means of physical control coupling 183; and to optional molded article removal station controller 186 by means of physical control coupling 189. Primary input-output unit 80 further includes a wireless communication node 83 (e.g., a radio frequency transceiver), that provides for wireless communication (e.g., a wireless control coupling) with a wireless communication node 86 of carriage controller 45, as represented by arrows 89 and 92.

The various units of the primary controller may be substantially contained within a single housing unit 192. Typically primary central processor unit 156, primary database unit 159 and optional primary auxiliary memory unit 165 are contained within housing unit 192, and primary user interface unit 171 and/or primary input-output unit 80, or portions thereof, may optionally be located outside of housing 192.

The secondary processor based (or programmable) controllers of the molding system of the present invention may each independently include a secondary central processor unit, secondary database unit, secondary optional auxiliary memory unit, secondary user interface unit and secondary input-output unit as configured in accordance and described above with reference to the primary controller 12 of FIG. 3.

Each secondary programmable controller typically includes: a secondary input-output unit that is controllably coupled to the primary input-output unit of the primary controller; and at least one further secondary input-output unit that is operationally coupled to one or more devices that are under the control of or communicate with the secondary programmable controller. A particular secondary input-output unit may be directly coupled (i.e., other than indirectly coupled through the primary controller) to the secondary input-output unit of another secondary programmable controller (e.g., for purposes of data transfer). More typically, each secondary programmable controller is free of being directly coupled to any other secondary programmable controller. More particularly, the secondary input-output unit of any given secondary programmable controller is free of being directly coupled to the secondary input-output unit of any other secondary programmable controller.

While the primary and secondary programmable controllers may be similarly configured, for example as described with reference to FIG. 3, the primary programmable controller generally has greater memory capacity and processor speed than each secondary programmable controller. For example, with the molding system and method of the present invention, the primary programmable controller typically handles between 3000 and 6000 (e.g., 4000) inputs and outputs, while each secondary programmable controller typically handles between 100 and 400 (e.g., 200) inputs and outputs.

In addition to operating under the direction of the primary controller, one or more of the secondary controllers may operate, in part, separately from the primary controller. For example, a secondary controller may control the temperature of a device to which it is controllably coupled (e.g., via one or more feed-back loops), without direction from the primary controller. The polymer introduction controller, for example, may maintain the barrel of the extruder to which it is operationally coupled at a base threshold (or holding) temperature when polymer material is not being introduced into contact with the interior mold surface of the mold.

The primary controller may also receive data from a secondary controller through a control coupling. The primary controller may be controllably coupled to a secondary controller by means of wireless couplings or physical couplings. In a particular embodiment of the molding system and method of the present invention, the primary controller is controllably coupled to each carriage controller by means of a wireless control coupling, and the primary controller is controllably coupled to all other secondary controllers (e.g., the polymer introduction controller, optional compression mold controller, and optional molded article removal station controller) by means of separate physical control couplings. As with the operational couplings, directives and/or data, in analog and/or digital form, may be passed or transmitted through a control coupling. More particularly, a plurality of directives, signals and/or data, in digital and/or analog form, may be contemporaneously transmitted through a single control coupling (physical or wireless control coupling) in accordance with art-recognized methods, such as multiplexing.

The primary controller is remote from and free of a physical connection to each carriage, and is adapted to communicate wirelessly and controllably with each carriage controller. Correspondingly, each carriage controller is adapted to communicate wirelessly with the primary controller. The primary controller and each carriage controller may each be adapted to engage in wireless communication by known means. For example, the primary controller and each carriage controller may each include an input-output unit that further includes a wireless communication node. Wireless communications between the primary controller and each carriage controller may be selected from known wireless communication means, for example, microwave means, infrared means, optical means (e.g., lasers) and radio frequency means. Typically, wireless communications between the primary controller and each carriage controller are achieved by radio frequency means. The use of radio frequency devices allows for wireless communications to be achieved in the absence of line-of-sight (so called non-line-of-sight communications). For example, the use of radio frequencies in the 900 MHz range (e.g., 900 to 928 MHz) provides for wireless communications without the need for the devices being positioned in line-of-sight of each other.

In addition, to minimize interference with, and correspondingly improve safety of, the primary controller's control of each carriage controller (e.g., inadvertent activation or deactivation of a carriage controller) the wireless communications from the primary controller may be encoded. For example a digital radio frequency (e.g., FM) coding algorithm may be employed, in accordance with art-recognized methods.

In the case of radio frequency wireless communication, the primary controller and each carriage controller may each independently include a separate transmitter and a separate receiver, or a single transceiver unit. Typically, one or more transceivers are used.

For further illustration, and with reference to FIG. 3, primary controller 12 includes an input-output unit 80 that further includes a wireless communication node 83 (e.g., a radio frequency transceiver). Carriage controller 45 also includes a wireless communication node 86 (e.g., a radio frequency transceiver). Wireless communications between node 83 of input-output unit 80 of primary controller 12 and node 86 of carriage controller 45 are graphically depicted by arrows 89 and 92. Wireless communication node 83 may be attached directly to input-output unit 80 of primary controller 12. Alternatively, wireless communication node 83 may be remotely and physically attached to input-output unit 80 (e.g., by means of a coaxial cable, not shown). Similarly, wireless communication node 86 may be attached directly to carriage controller 45, or remotely and physically attached thereto (e.g., by means of a coaxial cable, not shown). The use of physically remote connections, such as coaxial cables, for the wireless communication nodes may be desirable, for example, if the controller (primary or secondary) to which the node is attached is effectively shielded (e.g., shielded from penetration by radio frequency radiation). Shielding of the primary controller and/or the carriage controller may result, for example, from structures interposed there-between (e.g., structural support beams) and/or equipment (e.g., the mold and/or heat exchanger on the carriage).

In the method of the present invention, the location of each carriage is determined substantially continuously by means of the carriage location indicator of each carriage. With reference to FIG. 5, carriage location indicator 62 may determine the location of the carriage alone, or in combination (e.g., by interacting) with elements separate from the carriage, such as a separate position indicator 95, which may be a station position indicator or a further (i.e., non-station) position indicator, as will be discussed in further detail herein. In an embodiment, the carriage location indicator, which includes a processor having a triangulation algorithm, interacts sequentially or substantially contemporaneously with two or more separate and stationary position indicators (e.g., by means of reflected laser light or reflected non-optical electromagnetic radiation), and thereby determines the position of the carriage by means of triangulation. For each carriage (e.g., 15), the position thereof is in each case then transmitted substantially continuously from the carriage location indicator (e.g., 62) to the carriage controller (e.g., 45), for example by means of a wireless or physical coupling. In an embodiment, the position of the carriage (e.g., 15) is transmitted from carriage location indicator 62 to carriage controller 45 by means of (e.g., through) physical coupling 65. See FIGS. 1 and 5.

The location of each carriage is then communicated substantially continuously and wirelessly from each carriage controller to the primary controller. For example, the location of carriage 15 may be communicated, from wireless communication node 86 of carriage controller 45 to wireless communication node 83 of primary controller 12, wirelessly as represented by arrow 92 (FIG. 5).

With the location of each carriage thus wirelessly communicated to the primary controller, the primary controller then, in the method of the present invention, wirelessly communicates a polymer introduction station position directive to at least one, and more typically a single, carriage controller. The primary controller typically includes a processor (e.g., primary processor 156) that includes a plurality of computer programs. The primary processor is typically linked to a primary memory unit (e.g., 165) and/or primary database unit (e.g., 159) into which the carriage locations are introduced and stored (at least temporarily). The carriage location information is transferred to or accessed by the primary processor, processed by one or more programs within the primary processor, and thus it is determined to which carriage controller the polymer introduction station position directive is wirelessly communicated by the primary controller.

The carriage controller, which is in receipt of the wirelessly communicated polymer introduction station position directive, then provides operational polymer introduction station position instructions to the propulsion system of the carriage. For example, and with reference to FIG. 4, operational polymer introduction station position instructions may be transmitted from carriage controller 45 through physical coupling 59 to drive motor 33, which drivingly turns drive mechanism 36 by means of drive shaft 42. Correspondingly, the movement of the carriage is so controlled, thus positioning the carriage at the polymer introduction station (e.g., 18).

As the carriages move between and amongst the various stations of the molding system in the method of the present invention, the steps of: determining the location of each carriage via the carriage location indicators; transmitting the carriage location to the carriage controller; and wirelessly communicating the location of each carriage to the primary controller, are performed regularly (e.g., at predetermined intervals) and in particular substantially continuously. As such, when the carriage is positioned at the polymer introduction station, the location thereof is accordingly determined by the carriage location indicator, transmitted to the carriage controller, and then wirelessly communicated from the carriage controller to the primary controller.

With the carriage positioned at the polymer introduction station, a polymer introduction directive is then communicated from the primary controller to the polymer introduction controller. The polymer introduction directive may be communicated by means of a wireless coupling or a physical coupling. Typically, the polymer introduction directive is communicated from the primary controller (e.g., 12) to the polymer introduction controller (e.g., 68) by means of a physical coupling, such as physical coupling 77 (FIG. 1). The polymer introduction controller 68 then provides operational polymer introduction instructions to the polymer introduction apparatus (e.g., 71) by means of a wireless or physical coupling, and more typically a physical coupling (e.g., 74, FIG. 1). With operational polymer introduction instructions so provided to the polymer introduction apparatus, a polymer composition is thus introduced into contact with the interior mold surface (e.g., 27) of the mold (e.g., 24), and a molded article is resultantly formed. Depending on the particular molding operation involved (e.g., compression molding or thermoforming), additional molding steps, such as compression and/or vacuum steps, may be required to so form the molded article, as will be discussed in further detail herein.

The operational polymer introduction instructions provided by the polymer introduction controller to the polymer introduction apparatus, may involve a plurality of separate operational instructions provided to separate components of and/or associated with the polymer introduction apparatus. For purposes of illustration, and with reference to FIG. 6, polymer introduction control system 4 includes an extruder 71 having a first end 98, a terminal (or extrudate) end 101, a motor 104 located at first end 98, and a feed port 107 positioned downstream from but near first end 98 and motor 104. Additional feed ports (not shown), such as injection ports (e.g., liquid and/or gas injection ports) may be located along barrel 110 up-stream and/or down-stream relative to feed port 107. Motor 104 rotates and optionally longitudinally reciprocates the screw or screws, which reside within the barrel 110 of extruder 71. Terminal end 101 of extruder 71 is in fluid communication with a die 113 (e.g., a sheet die) by means of an interposed conduit 117.

Figure 6:
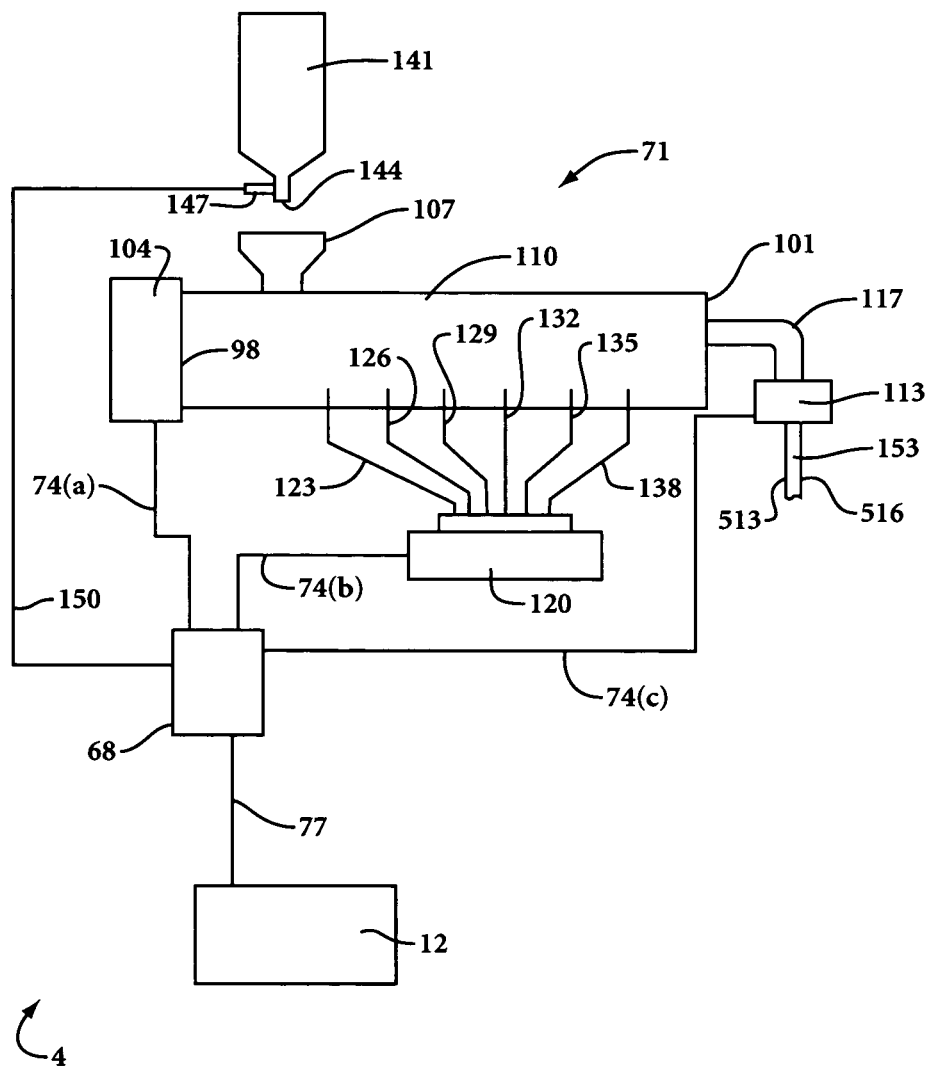
FIG. 6 is a representative schematic of a polymer introduction station, in which the polymer introduction controller thereof is coupled to various elements of the polymer introduction station of the molding system according to the present invention.

Extruders used in the method and apparatus of the present invention typically include one or more temperature controlled (e.g., heated) zones along the length of the barrel. The temperature of the extruder zones may be controlled by a heat exchange fluid, such as an oil, or more typically one or more electric heating coils. As depicted in FIG. 6, extruder 71 has six separate temperature controlled zones, each of which is electrically coupled to a temperature controller 120 by means of electrical couplings 123, 126, 129, 132, 135 and 138, that are each in electrical contact with a separate electric heating coil (not shown) around barrel 110. Temperature controller 120 is typically an electric power unit that transmits electricity along the electrical couplings (e.g., 123) to the electric heating coils. Electric power may be provided directly to the barrel heating coils by means of the electrical couplings (e.g., 123-138), or by separate power cables (not shown). If electric power is provided to the barrel heating coils of the extruder by separate power cables, the electrical couplings (e.g., 123-138) may serve more so to activate and deactivate the heating coils.

Extruder 71 has associated therewith a polymer feed material bin 141 having an exit port 144 at a lower end thereof, that is reversibly closeable by means of a valve 147, such as a gate (or sluice) valve, or a butterfly valve. Exit port 144 is positioned so as to deliver the contents of bin 141 into feed port 107 of extruder 71 (e.g., being located vertically above the feed port). Alternatively, polymer feed material may be transferred from exit port 144 to feed port 107 by means of a conduit (not shown) in fluid communication there-between (e.g., by means of a stream of high velocity air passed there-through). The plastic feed material contained within bin 141 may, for example, be a thermoplastic feed material in granular or pelletized form. Additional feed material bins (not shown) may also be positioned so as to introduce additional feed materials (e.g., glass fibers and/or other plastic materials) into feed port 107.

Polymer introduction controller 68 is operationally coupled to: extruder motor 104 by operational physical coupling 74(a); temperature controller 120 by operational physical coupling 74(b); and die 113 (which may be a sheet die) by operational physical coupling 74(c). In addition, polymer introduction controller 68 is operationally coupled to valve 147 of polymer feed material bin 141 by operational physical coupling 150.

Referring again to FIG. 1, with a carriage (e.g., 15) positioned at the polymer introduction station (e.g., 18), a polymer introduction directive is communicated from primary controller 12 to polymer introduction controller 68 by means of control coupling 77. Polymer introduction controller 68 then provides operational instructions, concurrently and/or sequentially, to the various elements or units of the polymer introduction station to which it is controllably coupled. For example, in FIG. 6 polymer introduction controller 68 may provide operational instructions to valve 147 of polymer feed bin 141 via operational coupling 150, thereby causing valve 147 to open and deliver a pre-determined amount of polymer feed material into feed port 107 of extruder 71 (and then subsequently instructing valve 147 to close). Polymer introduction controller 68 also provides operational drive instructions to extruder motor 104 via operational coupling 74(a), causing motor 104 to rotate the screw or screws within barrel 110 of extruder 71. Motor 104 is typically connected to the screw or screws by means of an interposed transmission (not shown). Operational temperature control instructions are provided from controller 68 to temperature control unit 120 via operational coupling 74(b), and temperature control unit 120 correspondingly separately controls the temperature of the various zones of barrel 110 by means of electrical couplings 123, 126, 129, 132, 135 and 138.

Still in FIG. 6, temperature data from the various barrel zones may be transmitted back to polymer introduction controller 68 by means of operational physical coupling 74(b) and incorporated into a feed-back loop of an extruder temperature control program within controller 68. Extruder temperature data may optionally be communicated from polymer introduction controller 68 through control coupling 77 to primary controller 12, where it may be stored in an extruder operation database contained within primary controller 12.

Polymer material and any additives are forwarded downstream from feed port 107 through barrel 110 where it is melted and mixed and then to terminal end 101 where the melt blended polymer material exits the barrel and passes through conduit 117 and into die 113. The melt blended polymer material emerges from die 113 in the form of an extrudate 153, which may be in the form of a sheet, stream or tube of extrudate, depending on the type and configuration of die 113. Die 113 may be fitted with one or more gates (not shown in FIG. 6) that serve to control the flow of melt blended polymer material there-through and correspondingly the shape (including width and/or thickness) and amount (e.g., rate of flow) of extrudate 153 emerging therefrom. Polymer introduction controller 68 may optionally provide operational instructions to die 113 by means of operational physical coupling 74(c), so as to control one or more gates (not shown) of die 113 and correspondingly the shape of extrude 153 emerging there-from. The position of the gates of the die may be controlled more particularly by one or more linear actuators (not shown). In the case of compression or thermoforming operations it may be desirable to modify the shape of extrudate 153 as carriage 15 and correspondingly mold portion 24 are moved in time and space (along the x-, y- and/or z-axes) there-beneath.

Polymer introduction controller 68 may substantially autonomously (relative to primary controller 12) control die 113 and the shape of extrudate 153 during the polymer introduction step. Alternatively, as the primary controller tracks and optionally directly controls the position of the carriage in the polymer introduction station during the polymer introduction step (e.g., as the carriage and/or mold are re-positioned along the x-, y- and/or z-axes), primary controller 12 may more directly control die 113, by providing one or more die gate directives via control coupling 77 to polymer introduction controller 68, which then processes the die gate control directives (e.g., in a die gate control program), and then transfers die gate operational instructions via control coupling 74(c) to die 113.

With the polymer composition introduced into contact with the interior mold surface of the mold, and the molded article correspondingly formed, a molded article removal station position directive is wirelessly communicated from the primary controller to the carriage controller. The carriage controller then provides operational molded article removal station position instructions to the carriage propulsion system, so as to position the carriage and the mold containing the molded article at the molded article removal station (e.g., 21, FIG. 1). Similarly as with the polymer introduction station position directive and related operational polymer introduction station position instructions, the molded article removal station position directive may be wirelessly communicated from wireless communication node 83 of primary controller 12 to wireless communication node 86 of carriage controller 45 (e.g., as illustrated by arrow 89, FIG. 5). Carriage controller 45 then provides operational instructions to drive motor 33 via physical coupling 59, and drive motor 33 drivingly turns drive mechanism 36 by means of drive shaft 42, so as to position carriage 15 at molded article removal station 21. See FIGS. 4 and 5.

While it is possible to remove the molded article from the mold in (or at) the polymer introduction station, positioning the carriage to a molded article removal station that is remote from the polymer introduction station, is an important aspect of the method of the present invention for reasons including, for example, improved process efficiencies. Moving the carriage away from the polymer introduction station and to the molded article removal station, in particular, allows for a separate carriage to be moved into the polymer introduction station and formation of another molded article to be concurrently undertaken. In addition, while the carriage is moved from the polymer introduction station to the molded article removal station, additional operations may be performed relative to the mold and the molded article, such as cooling the mold and correspondingly the molded article. When the molded article is formed from a thermoplastic polymer composition, cooling the molded article to a temperature that is below the melting temperature and preferably below the glass transition temperature of the thermoplastic composition is typically desirable as it allows for solidification of the thermoplastic composition and formation of the molded article. With a thermosetting or thermoplastic composition, cooling of the mold provides a molded article having a cooler temperature that may be more safely handled by plant personnel.

The temperature of the molded article may be reduced as the carriage moves from the polymer introduction station to the molded article removal station by controlling: the temperature of the mold (e.g., by means of a heat exchanger that is in fluid communication with the mold); and the forward velocity of the carriage. In an embodiment, for example, the forward velocity of the carriage is reduced as it moves from the polymer introduction station to the molded article removal station, so as to allow for additional cooling of the mold and molded article prior to the molded article removal step. The mold temperature and the forward velocity of the carriage (between the polymer introduction and molded article removal stations) may be controlled by the carriage controller under a particular program or sub-routine that operates: in response to mold temperature data (e.g., as drawn from a mold temperature feedback loop); and without additional directives provided by and being received from the primary controller.

More typically, as the carriage moves from the polymer introduction station to the molded article removal station, the primary controller more directly controls both the mold temperature and the carriage forward velocity by providing a combination of orchestrated mold temperature directives and carriage forward velocity directives to the carriage controller. The carriage controller then correspondingly provides: mold temperature operational instructions to, for example, a mold heat exchanger; and carriage forward velocity operational instructions to the carriage propulsion system. More direct control of the mold temperature and carriage forward velocity by the primary controller, between the polymer introduction and molded article removal stations, is advantageous since in addition to mold temperature data, the primary controller is also in receipt of and acts in response to the status of the whole molding system (e.g., the position and status of other carriages within the molding system). For example, if a carriage is broke-down in the molding system, the primary controller may provide mold temperature directives that result in slower cooling of the mold, and at the same time carriage forward velocity directives that result in the carriage moving more slowly to the molded article removal station.

With reference to FIG. 5, carriage control system 3 includes a mold temperature control apparatus 375, which is a heat exchanger that provides heat exchange fluid to and from mold 24 through heat exchange feed conduit 378 and heat exchange return conduit 381. Conduits 378 and 381 provide coupling of temperature control apparatus 375 to mold 24. Mold 24 typically includes a plurality of heat exchange conduits (not shown) that reside beneath (or behind) interior mold surface 27, through which the heat exchange fluid passes so as to elevate and/or lower the temperature of interior mold surface 27 and any polymer feed material or molded article in contact therewith. Mold 24 includes at least one mold temperature sensor 384, that is coupled to carriage controller 45 by physical coupling 387, and optionally further coupled to temperature control apparatus 375 by physical coupling 390. Carriage controller 45 is operationally coupled to temperature control apparatus 375 by physical coupling 393.

With the mold and mold temperature apparatus so configured, the method of the present invention further includes, transmitting (e.g., substantially continuously) mold temperature values from each mold temperature sensor (e.g. 384) to carriage controller 45 through physical coupling 387. Mold temperature values may optionally be further transmitted from mold temperature sensor 384 to temperature control apparatus 375 through physical coupling 390. Transmitting mold temperature values to the mold temperature control apparatus may be desirable if the temperature control apparatus includes its own processor, which allows for feed-back loop temperature control of the mold that is separate from the carriage controller. In addition, or alternatively, transmitting mold temperature values to the mold temperature control apparatus allows for transmission of mold temperature values to carriage controller 45 through physical coupling 393, which may be advantageous if physical coupling 387 fails.

Transmission of mold temperature values to the carriage controller allows the carriage controller to process the temperature values and formulate appropriate operational mold temperature reduction instructions that are communicated to the mold temperature control apparatus, in response to the mold temperature reduction directive wirelessly received from the primary controller. The carriage controller may also wirelessly communicate the mold temperature values to the primary controller, which may store them in a database and/or process them so as to formulate an appropriate mold temperature reduction directive to be wirelessly communicated to the carriage controller.

After the polymer composition has been introduced into contact with interior mold surface 27 of mold 24, and prior to removing the molded article from the mold (at the molded article removal station), primary controller 12 wirelessly communicates a mold temperature reduction directive to carriage controller 45 (e.g., via primary controller wireless communication node 83 to carriage controller wireless communication node 86, as represented by arrow 89). The mold temperature reduction directive is wirelessly communicated from the primary controller to the carriage controller after introduction of the polymer material into contact with the interior mold surface, and more typically after at least partial formation of the molded article (e.g., by injection molding, compression molding or thermoforming). In addition, the mold temperature reduction directive is more typically wirelessly communicated, from the primary controller to the carriage controller, prior to positioning the carriage at the molded article removal station (e.g., as the carriage moves from the polymer introduction station to the molded article removal station).

In receipt of the mold temperature reduction directive, carriage controller 45, then provides operational mold temperature reduction instructions to mold temperature control apparatus 375, through physical coupling 393. Temperature control apparatus 375 then circulates heat exchange fluid through mold 24 through heat exchange conduits 378 and 381, and thereby reduces the temperature of mold 24. More particularly, the temperature of interior mold surface 27 is reduced, and accordingly so is the temperature of the polymer composition/molded article in contact therewith.

With the carriage positioned at the molded article removal station (e.g., station 21), the molded article may be removed from the mold. The molded article may be removed manually or by mechanical means (e.g., a robotic apparatus, as will be discussed further herein). The molded article may be subjected to post-molding operations, such as trimming, painting and/or aperture formation (e.g., by drilling and/or punching) within the molded article removal station (e.g., prior to during or after de-molding), or at a location that is: separate from the molded article removal station; and at the same time either remote from or part of the molding system. Some post-molding operations, such as trimming, may be performed at least in part within the molded article removal station and/or at a post-molding station within the molding system (e.g., interposed between the molded article removal station and the polymer introduction station). More typically, however, post-molding operations, if any, are performed at a location that is remote from both the molded article removal station and the molding system, so as to allow the carriage to be promptly re-positioned, in particular to the polymer introduction station.

Each carriage may move independently between and amongst the various stations of the molding system with the assistance of, or in the absence of, a guide path. In the absence of a guide path, a particular carriage may follow a different path as it moves from one station to another station (e.g., from the polymer introduction station to the molded article removal station) relative to a previous cycle through (or transit of) the molding system. For example, depending on the status of the molding system (e.g., the location and operational condition of all carriages), the primary controller may direct a particular carriage to take a different path, than that which it took in the previous cycle or transit, to the next station. For purposes of further illustration, if for example a carriage becomes immobilized (e.g., due to an inoperative propulsion system) it may represent an obstruction in the molding system, in which case the primary controller may direct the other carriages to take alternative paths so as to avoid the immobilized carriage.

In an embodiment of the present invention, the molding system further includes a guide path that is in the form of a substantially looped (e.g., cyclic, closed loop or closed circuit) guide path. The various stations, such as the polymer introduction station and the molded article removal station, are each positioned separately along the looped guide path. In addition, each carriage is separately and independently moveable along and directionally guided by the guide path. The looped guide path may have (or trace out relative to a top-plan view) any suitable shape selected, for example, from, circular shapes, oval shapes, polygonal shapes (e.g., triangles, rectangles, squares, pentagons, hexagons, heptagons, octagons, etc., and combinations thereof), irregular shapes, and combinations thereof.

As used herein and in the claims with regard to the guide path and similar terms, such as guide track, the term "looped" means a guide path along which the carriages move or transit in a cyclic and repetitive fashion, and the beginning and end of which may be designated as occupying the same point or position (on or along the guide path). In addition, the looped guide path (or guide track) may be further described as being a closed loop guide path. The looped guide path may optionally include one or more spurs or extensions connected thereto, that allow one or more carriages to move onto and/or off of the looped guide path. For example, if a carriage requires maintenance or refitting (e.g., replacing the mold), it may be moved off of the looped guide path onto a spur where such maintenance or refitting may be undertaken. After completion of the off-loop task, such as refitting and/or maintenance, the carriage may then be moved from the spur back onto the looped guide path.

The guide path may directionally guide each carriage: by indirect means, in which case the guide path is an indirect guide path; or by direct means, in which case the guide path is a direct guide path. With an indirect guide path, the carriage and the guide path are substantially free of physical contact there-between. With a direct guide path, there is physical contact (intermittent or substantially constant) between the carriage and the direct guide path.

An indirect guide path typically provides directional guidance to each carriage by remote sensing means selected, for example, from: magnetic means; electromagnetic radiation means, such as visible light (or optical) means (e.g., laser light), infrared means and radio frequency means; and combinations thereof. In the case of an indirect guide path, the guide path typically acts as an emitter (e.g., a magnetic field emitter, or an electromagnetic radiation emitter), and each carriage includes a guide path receiver or sensor that receives or senses and optionally processes that which is emitted by the indirect guide path. The guide path receiver/sensor is coupled (physically or wirelessly coupled) to the carriage controller, and substantially continuously transmits the position of the carriage, relative to the guide path, to the carriage controller. The carriage controller (e.g., 45) receives the carriage-guide path position information, optionally processes or further processes it (e.g., via one or more computer programs), and provides operational guide path position instructions to the carriage propulsion system (e.g., via a physical coupling), so as to maintain movement of the carriage along the indirect guide path. The indirect guide path may occupy any suitable position, such as underneath, beside or above each of the carriages. In the case of an indirect guide path, the carriage location indicator and the guide path receiver/sensor may be one and the same.

For purposes of further illustrating the operation of an indirect guide path, and with reference to FIG. 5, carriage location indicator 62 represents a guide path receiver/sensor 62 and separate position indicator 95 represents a portion of an indirect guide path 95, in each case for purposes of this discussion. Indirect guide path 95, which may be for example a magnetic strip or series of aligned permanent magnetic plates, acts as an emitter (e.g., a magnetic field emitter) and guide path receiver/sensor 62 receives or senses, and optionally processes, that which is emitted by indirect guide path 95. Guide path receiver/sensor 62 transmits carriage-guide path position information (in digital or analogue format) to carriage controller 45 by means of physical coupling 65. Carriage controller 45 receives, and optionally processes or further processes, the carriage-guide path position information, and provides operational guide path position instructions to the carriage propulsion system 30 by means of physical coupling 59, thereby maintaining the carriage in proximity to and moving along the indirect guide path. The carriage may include a steering mechanism (not shown), which may be integral with or separate from the carriage propulsion system, as discussed previously herein. The operational guide path position instructions provided by the carriage controller, typically further include operational instructions being provided to the steering mechanism (if present).

A direct guide path typically provides directional guidance to each carriage by direct physical interaction (or contact) with each carriage. For example, the direct guide path may engage in direct physical interaction with the drive mechanism and/or steering mechanism of each carriage. In an embodiment of the present invention, the guide path is a direct guide path, and in particular a guide track, which is further particularly a looped guide track. The drive mechanism of each carriage engages drivingly with the guide track. In this particular embodiment, each carriage is also directionally guided by the driving engagement between the drive mechanism and the guide track. The guide track may be in the form of a slotted guide track having a base having an elongated slot into which is received the drive mechanism and/or the steering mechanism of the carriage. Typically, the guide track is in the form of a rail having a vertical member extending upwardly from a base thereof.

With reference to FIGS. 1, 2, 4 and 5, guide track 39, which is positioned beneath each carriage, is in the form of an elongated looped rail, that includes a base 195 (FIG. 4) having an elongated vertical member 198 extending upwardly therefrom. Guide track 39 may be a substantially continuous unitary guide track, or more typically includes a plurality of track segments arranged and joined end-to-end (e.g., by clamps and/or welds) that together form guide track 39. At least a portion of drive mechanism 36 engages drivingly (e.g., frictionally) with a portion (e.g., an upper portion 201) of vertical member 198 of guide track 39, as drive mechanism 36 is turned by drive motor 33 via drive shaft 42 in response to operational instructions from carriage controller 45.

To assist with guidance of the carriage by guide track 39, drive mechanism 36 may include laterally opposed vertically extending flanges 204 and 207 that minimize or prevent the drive mechanism from slipping off of guide track 39 by abutting the sides of vertical member 198, for example as the carriage moves around a bend of looped guide track 39. Alternatively or in addition to laterally opposed vertically extending flanges, the drive mechanism may include: extensions, such as teeth or gears, that are received within aligned recesses within the guide track; and/or recesses into which extensions, such as teeth, extending upwardly from the guide track are received (neither of which are shown in the drawings). The molding system may include two or more substantially parallel guide tracks. In a particular embodiment, the molding system includes a single guide track, such as guide track 39 as depicted in the drawings.

Each carriage of the molding system may include its own power source for purposes of powering the various components of the carriage, such as the propulsion system, carriage controller and mold heat exchanger. For example, each carriage may include an electric power generator that provides operational power to all components of the carriage. The electric power generator may be energized by an internal combustion motor or engine powered by a fuel selected from, for example, natural gas, propane, diesel fuel, bio-diesel fuel, ethanol and/or gasoline. The drive motor of the propulsion system of the carriage may be an electric drive motor that is powered by means of the electric power generator, or a separate internal combustion drive motor.

Each carriage, more typically, is electrically powered by an electric power source that is separate from each carriage. In an embodiment, the molding system further includes an electric power strip that is in the form of a looped electric power strip. The term "looped" as used herein and the claims with regard to the electric power strip, has the same meaning as described previously herein with regard to the guide path and guide track. In addition to being separate from each carriage, the electric power strip is also separate from the guide path and guide track of the molding system. The electric power strip is electrically coupled to each carriage (e.g., by means of one or more electric cables) and accordingly thereby provides electric power to each carriage. Each carriage may include an electric power distribution unit that is electrically coupled to and energized by the electric power strip, and separately electrically coupled to and separately energizes each component of the carriage (e.g., the carriage controller, propulsion system and optional mold heat exchanger).

Figure 2:
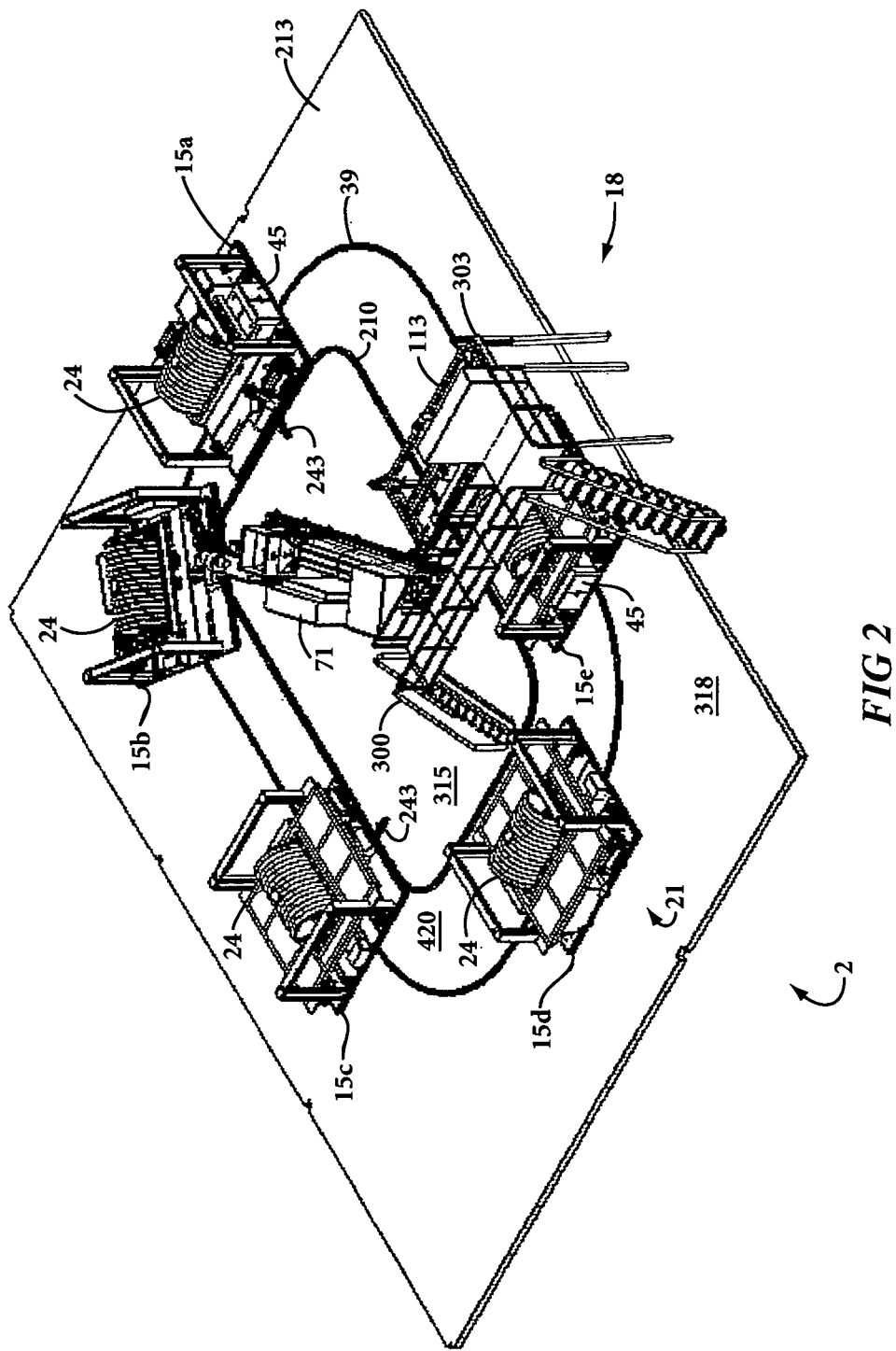
FIG. 2 is a perspective view of a molding system according to the present invention that includes a plurality of carriages.
Figure 7:
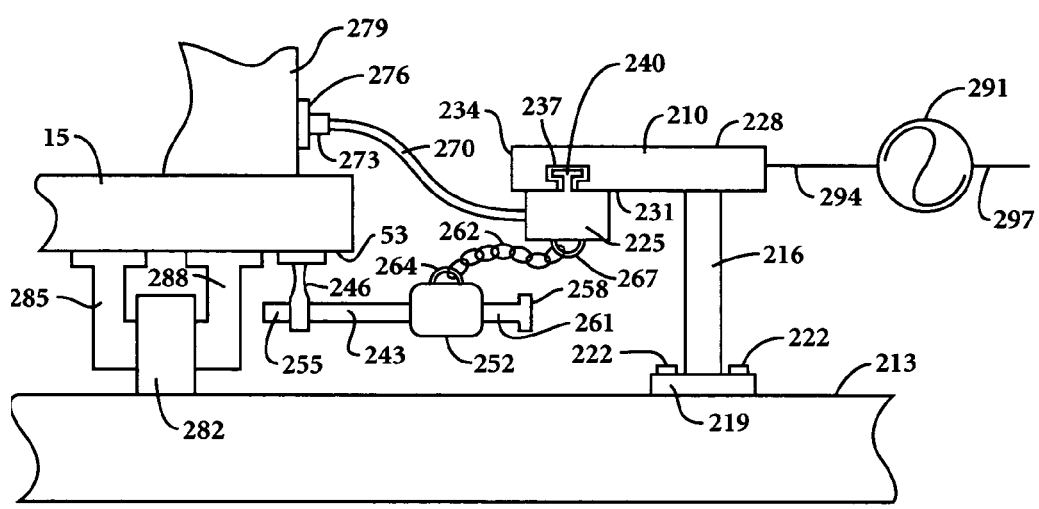
FIG. 7 is an elevational schematic representation of a moveable electric power coupling between a carriage and an elevated power strip, of the molding system according to the present invention.

With reference to FIGS. 1 and 2, the molding system includes an electric power strip 210 that is in the form of a looped electric power strip. The electric power strip may have any suitable position relative to the guide path or guide track, provided an electrical coupling is maintained between the power strip and each carriage. For example, the electric power strip may be located laterally within, laterally outside of, vertically below and/or vertically above the looped guide path or guide track. As depicted in the drawings, electric power strip 210 is positioned laterally within looped guide track 39. Positioning the looped electric power strip laterally within the looped guide track is desirable for reasons including, but not limited to safety, as it minimizes the likelihood of inadvertent contact between the power strip and individuals who may be working around the molding system. For example, looped guide track 39 and the carriages 15 moving there-around, act in effect as a barrier between individuals working around the molding system (e.g., servicing various elements and stations thereof) and electric power strip 210. In addition to being positioned laterally within guide track 39, electric power strip 210 may also be positioned vertically above or higher than guide track 39 (FIG. 7). The electric power strip may be a substantially unitary power strip, or more typically comprises a plurality of power strip segments that are connected (physically and electrically) end-to-end and together form a substantially continuous electric power strip.

In a particular embodiment of the present invention, the electric power strip includes a power box, for each carriage, that is electrically and moveably (e.g., slidingly) connected to the electric power strip, and which includes a power cable. Each carriage and the power box associated there-with together form a carriage-power box pair. Each carriage-power box pair may comprise one or more power boxes that are each electrically coupled to the carriage thereof. More typically, each carriage-power box pair comprises a single power box.

For each carriage-power box pair, the power cable of the power box is electrically connected and provides electrical power to the carriage thereof. While the power cable itself may also serve to pull the power box (e.g., slidingly) along the electric power strip, thereby maintaining the power box and carriage in electrical contact, such a tensioned arrangement may undesirably result in degradation of the power cable (e.g., fraying or breakage thereof) and loss of electrical contact between the carriage and power box. Alternatively, the carriage-power box pair may include a separate non-electrical (or electrically insulated) coupling that serves to pull the power box along the power strip, and which endures the stresses (e.g., tensional and/or torsional) associated with such pulling, thus substantially relieving the power cable of exposure to such stresses.

In an embodiment, the carriage-power box pair includes a physical coupling that is free of electric power transfer and which comprises a pull rod that extends outward from the carriage and towards the power box. The pull rod is typically elongated and includes a cylinder that is slidingly and reversibly moveable along the pull rod. The cylinder, of the pull rod, and the power box are connected together by means of a cylinder-power box physical connection that is free of electrical power transfer. As the carriage moves along the guide track, the combination of the pull rod, cylinder and cylinder-power box physical connection serves to pull the power box along the electric power strip. As the power box is so pulled along, the electrical connection between the power box and the power strip is maintained, and correspondingly the power cable remains electrically connected to the carriage.

With reference to FIG. 7, and for purposes of further illustration, power strip 210 is elevated above floor 213 and also guide track 39 (not shown in FIG. 7) by a vertical support 216 that extends vertically upward from a base plate 219 that is secured to floor 213 by sufficient means, such as bolts 222. Vertical support 216 is connected at its lower end to base plate 219, and at its upper end to power strip 210. Electric power strip 210, vertical support 216 and base plate 219 may be separate elements that are connected together (e.g., by fasteners and/or welds), or may together form a substantially unitary structure, that in either case may collectively be referred to as an electric power strip assembly.

Power box 225 may be moveably (e.g., slidingly) and electrically connected to any suitable portion of power strip 210, such as upper surface 228, lower surface 231 or forward surface 234 thereof. In an embodiment, power box 225 is moveably and electrically connected to lower surface 231 of power strip 210, which minimizes inadvertent contact of the power strip's electrical contacts with foreign materials or objects, which may foul or result in an electrical short of the contacts.

The electrical contacts may be recessed within or extend outward from the electrical power strip. Typically, the electrical contacts reside within one or more elongated recesses of the power strip. Lower surface 231 includes an elongated recess 237 in which the electrical contacts (not visible) of power strip 210 reside. The elongated recess or recesses in which the electrical contacts of the power strip reside, may have any suitable shape or configuration (e.g., cross sectional shape), such as circular, oval, polygonal (e.g., triangular, square or rectangular), irregular, or combinations thereof. In an embodiment, elongated recess 237 has a T-shape, the smaller dimensioned (or narrower) portion or aperture of which resides on or is in communication with lower surface 231, and the wider dimensioned portion (i.e., the lateral or T-portion) of which resides recessed within power strip 210.

Power box 225 includes an extension 240 that is slidingly and retainingly received within recess 237 of power strip 210. At least a portion of extension 240 is electrically conductive and maintains electrical contact between the electrical contacts recessed within recess 237 of power strip 210 and power box 225. Extension 240 may be snap-fittingly (and slidingly) received within recess 237. In an embodiment, extension 240 has a T-shape that substantially matches and is received within T-shaped recess 237. For example, the narrower dimensioned portion of extension 240 resides within the narrower dimensioned portion of recess 237, and the wider dimensioned portion (i.e., the lateral or T-portion) of extension 240 resides within wider dimensioned portion (i.e., the lateral or T-portion) of recess 237. As such, T-shaped extension 240 is slidingly retained within substantially matched T-shaped recess 237, and electrical contact between power box 225 and power strip 210 is maintained.

Electrical power strip 210 may include two or more spaced and parallel electrical contact containing recesses (such as recess 237), into which are separately received two or more electrically conductive extensions (such as extension 240) of power box 225. For purposes of clarity, a single recess 237 and a single extension 240 are depicted in the drawings.

Carriage 15 also includes a pull rod 243 that extends laterally outward from the carriage towards power box 225 (and electric power strip 210). Pull rod 243 and power box 225 do not abut each other. A first end 255 of pull rod 243 is connected to carriage 15 by a retainer 246 that extends downwardly from the underside 53 of the carriage. Pull rod 243 includes a cylinder 252 that is slidingly and reversibly moveable along (longitudinally along) the pull rod. Cylinder 252 has a longitudinal aperture extending there-through (not shown) through which pull rod 243 is received. Pull rod 243 may include a flange 258 at or near a second end 261 of the pull rod. Second end 261 of pull rod 243 is opposite from first end 255 thereof, and extends towards and is closer to power box 225 (relative to first end 255). Flange 258 prevents cylinder 252 from being pulled off (or falling off) second end 261 of pull rod 243.

Power box 225 and sliding cylinder 252, of pull rod 243, are connected together by a cylinder-power box physical connection 262. Cylinder-power box physical connection 262 is free of electric power transfer, i.e., it does not transfer electric power from power box 225 to sliding cylinder 252, pull rod 243 or carriage 15 (or between any of those components). The cylinder-power box physical connection may be fabricated from any suitable material, provided it is strong enough to pull power box 225 along power strip 210 without breaking (as carriage 15 moves along the guide track). For example, the cylinder-power box physical connection may be fabricated from metals, polymers (e.g., nylon polymers), or non-synthetic materials (e.g., hemp), and may have any suitable form, such as a strap, rope or twine, or chain. In an embodiment, the cylinder-power box physical connection (e.g., 262) is in the form of a chain fabricated from metal (e.g., as depicted in FIG. 7). One end of cylinder-power box physical connection 262 is attached to a bracket 264 of sliding cylinder 252, and the other end is attached to a bracket 267 of power box 225.

Still on FIG. 7 electrical power box 225 also includes a power cable 270 that provides electrical power from power box 225 to carriage 15. The power cable may be wired (e.g., spliced) directly to the carriage, or may be include a plug that is reversibly received within an electrical receptacle of the carriage. Typically, the power cable is wired directly into the power box. In an embodiment, and as depicted in FIG. 7, power cable 270 has a plug 273 at a terminal end thereof that is received within an electrical receptacle 276 of an electric power distribution unit 279 of and located on carriage 15. Electric power distribution unit 279 is separately electrically coupled to and separate electrically energizes each component of the carriage (e.g., carriage controller 45, propulsion system 30, and optional mold heat exchanger 375), by additional electrical connections (not shown).

As depicted in FIG. 7, carriage 15 also includes a support wheel 282 that engages rollingly and supportingly with floor 213. The carriage typically includes at least three (e.g., four) support wheels that are typically positioned so as to provide sufficient support and stability to the carriage as it moves amongst and between the various stations of the molding system. The support wheels are separate from the propulsion system of and do not propel or drive the carriage. The support wheels may have any suitable shape, such as ball shapes or disk shapes. The support wheels may be attached to the carriage by art-recognize means. For example, support wheel 282 is attached to underside 53 of carriage 15 by a first upwardly extending support 285 and a second upwardly extending support 288. The first and second support wheel supports (e.g., 285, 288) may be attached to a plate (not shown) that engages rotationally with underside 53 of the carriage 15.

The electrical power strip is typically electrically connected to a separate electric power source, such as an intra-facility power source, that is electrically connected to a separate municipal or regional power grid. For example, power strip 210 is electrically connected to intra-facility electric power source 291 by electrical coupling 294. Intra-facility electric power source 291 is electrically connected to an external electric power grid (not shown) by electric coupling 297.

While the molding system of the present invention may include one or more carriages, it more typically includes at least two carriages. When the molding system includes a guide path or guide track and two or more carriages, the carriages move in series along the guide path or guide track. With reference to FIG. 2, the molding system 2 includes a plurality of carriages, and in particular five separate carriages 15a, 15b, 15c, 15d and 15e that move counter-clockwise and in series along guide track 39. Each of carriages 15a through 15e has a mold 24 thereon, which may be used as a thermoforming mold. Molding system 2 also includes a vertically elevated platform 300 under which the carriages pass, that allows individuals to move between an interior area 315 within looped power strip 210 and an exterior area 318 outside of or beyond guide track 39, while at the same time avoiding interaction with or being struck by a moving carriage, and avoiding contact with power strip 210.

Molding system 2 of FIG. 2 also includes a die 113, e.g., a sheet die, (partially visible) that is elevated above guide track 39 by a die support structure 303. The carriages 15a through 15e each pass under die 113, and an extrude (not shown), e.g., in the form of a heated thermoplastic sheet, is gravitationally deposited on the mold surfaces thereof. In FIG. 2, the conduit (e.g., conduit 117 of FIG. 6) providing fluid communication between the terminal end of extruder 71 and die 113 is not shown.

With one or more, and in particular two or more, carriages moving between and amongst the various stations of the molding system, collisions between a carriage and another object, such as an individual, piece of equipment or another carriage, may result in damage to the carriage and/or the other object. If a carriage is rendered inoperable due to a collision, the whole molding system could be shut down until the inoperable carriage is either repaired or removed from the molding system. Such a total system shut down resulting from an inoperable carriage is more likely to occur with a molding system in which the carriages move in series along a looped guide path or track.

In an embodiment of this invention, each carriage includes a forward collision detector that is coupled (wirelessly or more typically physically coupled) to the carriage controller. The forward collision detector detects or senses an imminent collision of the carriage with a separate object that is forward of the carriage. Equivalently, the forward collision detector detects or senses an imminent collision between the carriage and a separate object that is forward of the carriage. The forward collision detector then transmits (in digital or analogue form) the imminent collision to the carriage controller, by means of a wireless or more typically a physical coupling. The carriage controller, being in receipt of the imminent collision signal, provides operational emergency stop instructions (in analogue or more typically digital form) to the propulsion system of the carriage. Forward motion of the carriage is accordingly stopped, and the imminent collision is thus avoided (in the case of a substantially stationary forward object), or the impact and severity of the imminent collision is reduced (when the separate object is itself moving toward the front of the carriage). The operational emergency stop instructions provided by the carriage controller to the carriage propulsion system may result, for example, in a total shut down of the propulsion system, disengagement of the drive motor from the drive mechanism (e.g., by means of disengaging an interposed transmission), reverse turning of the drive mechanism, a breaking action being applied to the drive mechanism, or any combination thereof.

The emergency stop instructions from the carriage controller to the carriage propulsion system may also include rearward motion instructions, which result in the carriage propulsion system moving the carriage back from the imminent collision. When the emergency stop instructions include rearward motion instructions, the carriage is usually moved backward over a relatively short distance (e.g., 1 meter or less), and then all motion (rearward and forward motion) of the carriage is stopped. Typically, the emergency stop instructions provided by the carriage controller do not include rearward motion instructions, and their transmission to the carriage propulsion system results in all motion (forward and rearward) of the carriage being stopped.

With reference to FIG. 5, carriage control system 3 includes a forward collision detector 306 that is coupled to carriage controller 45 by physical coupling 309. Forward collision detector 306 also includes a collision sensor 312. Forward collision detector 306 may be mounted on any suitable portion (e.g., an upper portion, on the sides or on the front) of the carriage, provided the collision detector is able to detect an imminent collision forward of the carriage.

Collision sensor 312 may be selected from physical contact sensors, optical sensors, infrared sensors, radar sensors and combinations thereof. A physical contact sensor typically includes an extension, such as a rod, that extends outward from detector 306 and has a contact portion forward of detector 306 and a rear portion that contacts a switch (e.g., a spring loaded switch) within detector 306. Upon contact of the forward contact portion of the extension with a separate object forward of the carriage, the rear portion of the extension is pressed against the switch, which generates or results in a collision signal within detector 306 that is transmitted to carriage controller 45 through physical coupling 309.

More typically the collision sensor is a remote collision sensor, rather than a physical contact collision sensor. The remote collision sensor typically includes, as is known to the skilled artisan, a transceiver that emits electromagnetic radiation, which is reflected off of a separate object forward of the carriage and back at and detected by the transceiver of the remote collision sensor. Alternatively, the remote collision sensor may comprise a separate transmitter and receiver. The remote collision sensor (e.g., 312) transmits the received/reflected collision signal, and more typically a series of sequential collision signals, to a processor within the collision detector (e.g., 306). The collision detector processes the signals from the remote collision sensor so as to determine (e.g., via an algorithm or program) whether a collision is imminent. If a collision is imminent, the collision detector then transmits an imminent collision signal (in analogue or digital form), to the carriage controller 45 through physical coupling 309. Alternatively, some or all of the signal processing may be performed by the processor of the carriage controller, in which case the carriage controller would be in receipt of a partially processed or raw (unprocessed) signal stream from the collision detector.

The remote collision sensor typically emits (and correspondingly receives reflectively) electromagnetic radiation selected from optical radiation (e.g., incoherent visible light and coherent laser light), infrared radiation, radar/microwave radiation, or any combination thereof. Accordingly, as used herein and in the claims, the collision sensor may be selected from optical sensors, infrared sensors and/or radar sensors, as described above. An example of a remote collision detector that may be used with the carriage and in the method of the present invention is a OptoShield OS3101 Laser Light Safety Scanner, commercially available from Omron Scientific Technologies, Inc.

With two or more carriages moving in series around the looped guide path or track, when the forward motion of one carriage is stopped due to an imminent collision with a separate object forward of that carriage, it typically is prudent to timely stop movement of all the other carriages. In an embodiment, with the forward motion of a particular carriage stopped due to an imminent forward collision, the carriage controller of the stopped carriage wirelessly communicates the imminent collision (of the carriage with the separate object) to the primary controller. In receipt of the imminent collision signal, the primary controller then wirelessly communicates a carriage emergency stop directive to the carriage controller of each (and all) of the carriages operating in the molding system. The carriage controller of each carriage then provides operational emergency stop instructions to its respective carriage propulsion system. The forward motion of all carriages operating in the molding system is thereby stopped and halted.

An imminent collision system shut down alarm (e.g., visual and/or auditory) may optionally be activated by the primary controller, so as to alert one or more human operators to investigate the reason for the emergency system shut down. The human operator(s) may then take corrective action (e.g., by removing the separate object that caused the imminent collision signals and resulting system shut down), and manually reset and/or restart operation of the molding system (e.g., by use of primary controller user interface 171, FIG. 3)

In an embodiment of the present invention, the molding system is configured to perform compression molding operations, and includes a compression molding station. In a particular embodiment, the molding system comprises a looped guide path or track (e.g., 39), and the compression molding station is interposed between the polymer introduction station and the molded article removal station. In the compression molding embodiment, the mold that is transported on or by each carriage is a first mold portion, and the compression molding station includes a second mold portion, having an interior mold surface, that is held within a reversibly positionable press. The compression molding station includes a compression mold controller that is operationally coupled (e.g., wirelessly or more typically physically coupled) to the press. The primary controller is controllably coupled (e.g., wirelessly or more typically physically coupled) to the compression mold controller.

Figure 8:
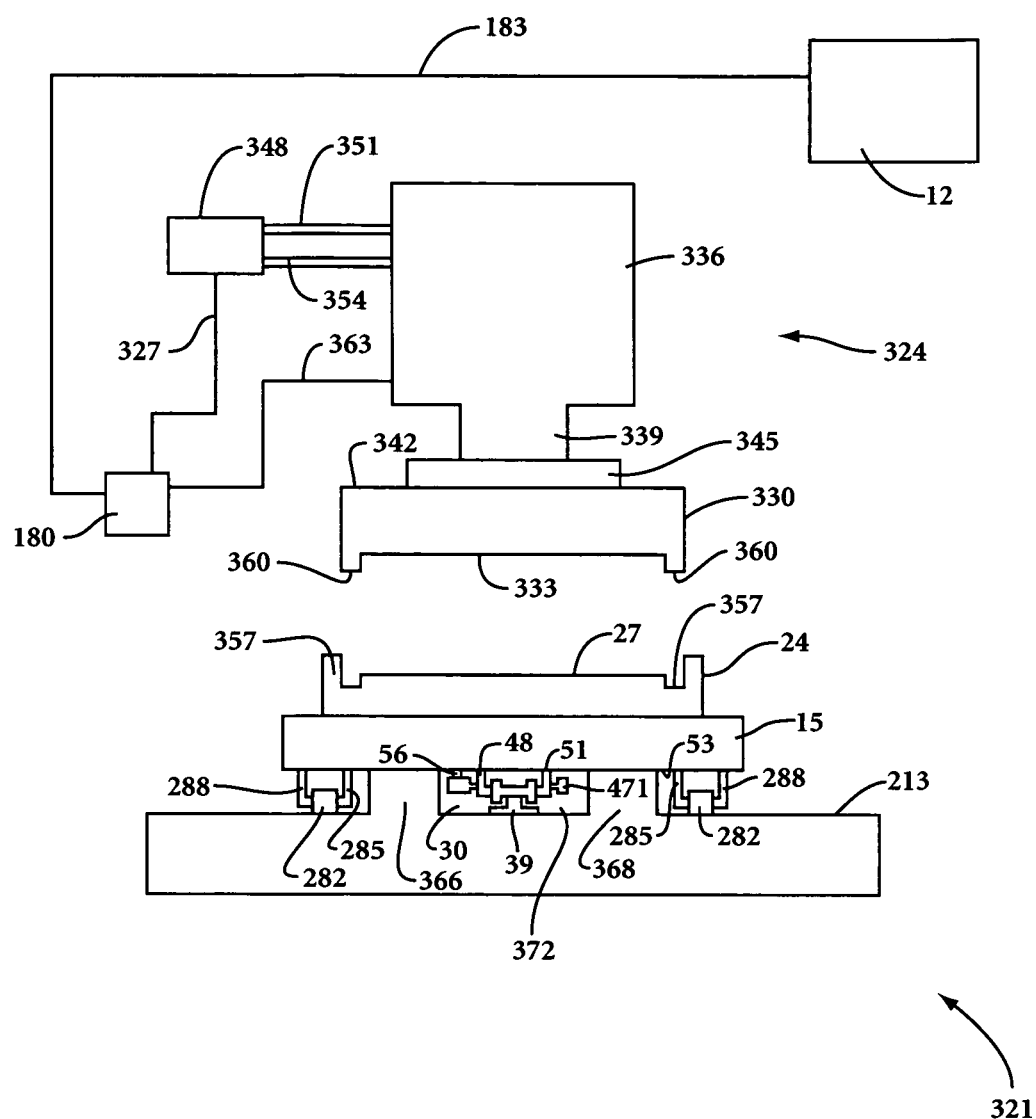
FIG. 8 is an elevational schematic representation of a compression molding station of the molding system according to the present invention.

For purposes of further illustration, the compression molding embodiment of the present invention will be non-limitedly described with reference to FIGS. 1 and 8 of the drawings. Compression molding station 321 includes a press 324 that is operationally coupled to compression mold controller 180 by physical coupling 327. Press 324 includes a second mold portion 330 having an interior surface 333. Press 324 is positioned so as to vertically reposition interior surface 333 of second mold portion 330 downward relative to interior surface 27 of first mold portion 24. Alternatively, depending on the orientation of first mold portion 24, press 324 may be positioned so as to reversibly position second mold portion 330 along any suitable axis (e.g., laterally or vertically upward).

The polymer composition (e.g., a thermoplastic polymer composition) is introduced gravitationally onto interior mold surface 27 of first mold portion 24 at polymer introduction station 18, by polymer introduction apparatus 71, which may be an extruder the terminal extrudate portion of which is positioned vertically above the first mold portion. During gravitational introduction of the polymer composition: carriage 15 and/or first mold portion 24 may be moved laterally (along the x- and/or y-axes) and/or vertically (along the z-axis); and optionally the flow rate of polymer material out of polymer introduction apparatus 71 may be modified (e.g., increased and/or decreased), so as to control the amount of polymer material deposited on various portions of interior surface 27 of first mold portion 24.

Spatial positioning control of the first mold portion, and volumetric control of the polymer introduction apparatus output, during the gravitational deposition of polymer material onto the interior surface of the first mold portion, may result in the formation of a pre-molded article having a shape (or pre-shape) that is substantially similar to that of the final molded article (e.g., a near-net-shape pre-molded article or lay-down of polymeric material). The formation a near-net-shape pre-molded article typically results in a reduction in the amount of compressive force and compression time required to compressively form the final compression molded article. For example, with the compression molding embodiment of the present invention coupled with the formation of a near-net-shape pre-molded article, the compressive force between the second mold portion and the first mold portion is typically from 80 to 150 pounds per square inch (psi) (5.6 to 10.5 $Kg/cm^2$), e.g., 100 pounds per square inch (psi) (7 $Kg/cm^2$), compared to what otherwise would typically be from 800 to 1500 psi (56 to 105 $Kg/cm^2$), e.g., 1000 psi (70 $Kg/cm^2$), in the absence of the formation of a near-net-shape pre-molded article. The formation of a near-net-shape pre-molded article also typically minimizes the amount of polymer feed material waste resulting from excess polymer material being introduced onto the first mold portion.

During the polymer introduction step, spatial control of the first mold portion (via spatial control of the carriage and/or mold), and volumetric control of the polymer introduction apparatus output may each be handled: respectively by the carriage controller (e.g., 45) and the polymer introduction controller (e.g., 68) alone; the primary controller (e.g., 12) acting through the carriage controller and polymer introduction controller; or a combination thereof. Typically, with the carriage positioned in polymer introduction station 18, primary controller 12 provides one or more polymer introduction directives to polymer introduction controller 68 (via physical coupling 77), and one or more carriage and/or mold spatial positioning directives wirelessly to carriage controller 45. Spatial positioning of the first mold portion may be achieved by movement: of the carriage itself; and/or a spatially positionable platform (not shown) on the carriage, on which the first mold portion rests. In receipt of their respective primary controller directives, carriage controller 45 and polymer introduction controller 68 then each provide operational instructions respectively to the carriage propulsion system 30 and/or spatially positionable platform, and the polymer introduction apparatus. With the operational instructions or stream of operational instructions so provided, a combination of orchestrated spatial control of the first mold portion, and volumetric control of the polymer introduction apparatus output during the polymer introduction step is achieved, and correspondingly the formation of a near-net-shape pre-molded article may also be achieved.

With the compression molding embodiment, after introduction of the polymer composition onto interior mold surface 27 of first mold portion 24, primary controller 12 wirelessly communicates a compression molding station position directive to carriage controller 45. Carriage controller 45 then provides operational compression molding station position instructions (e.g., through physical coupling 59) to carriage propulsion system 30 so as to control movement of carriage 15, and thereby position carriage 15 at compression molding station 321.

With carriage 15 positioned in/at compression molding station 321, primary controller 12 then communicates (e.g., through physical coupling 183) a compression molding directive to compression mold controller 180. Compression mold controller 180 accordingly provides operational compression molding instructions (e.g., through physical coupling 327) to press 324, so as to cause interior surface 333 of second mold portion 330 to compressively contact the polymer material previously introduced onto interior mold surface 27. The compressive forces applied during the compression molding step may be substantially constant or variable (e.g., being ramped up continuously, and/or stepped up in successive plateaus). Compressive contact between interior surface 333 of second mold portion 330 and the polymeric material previously deposited on interior surface 27 of first mold portion 24 results in formation of the molded article.

Typically, press 324 includes a piston 336 that reversibly drives or extends a drive arm (or member) 339 that is connected to an upper (or exterior) surface 342 of second mold portion 330 by a force transfer plate 345. Force transfer plate 345 may be adapted to allow for relatively quick and easy replacement of second mold portions (e.g., for formation of different molded articles). Press 324 may be pneumatically or more typically hydraulically driven. In an embodiment, press 324 includes a hydraulic pressure generating unit 348 that is in fluid communication with piston 336 by a first hydraulic conduit 351 and a second hydraulic conduit 354, that provide hydraulic fluid to and from piston 336. Polymer introduction controller 180 provides operational control instructions to hydraulic pressure unit 348 via physical coupling 327. Hydraulic pressure unit 348 then introduces hydraulic fluid at elevated pressure into piston 336, which results in drive arm 339 and second mold portion 330 being driven downward against the previously deposited polymeric material (on interior surface 27 of first mold portion 24). The press may have alternative art-recognized configurations and be operated in accordance with alternative art-recognized methods.

To control the amount of pressure applied within the press during the compression molding process, the press, second mold portion and/or first mold portion may include one or more pressure sensors, such as a pressure transducer, that is coupled to the compression mold controller through a feedback loop. In an embodiment, piston 336 of press 324 includes a pressure transducer (not shown) that provides pressure data/signals to compression mold controller 180 through physical coupling 363. Compression mold controller 180 processes the pressure data (e.g., by means of a pressure control program or algorithm) and provides additional operational pressure control instructions as appropriate to hydraulic pressure unit 348 through physical coupling 327, so as to control the pressure applied to the previously deposited polymer material within press 324.

During the compression molding step, elements of the carriage, and in particular the support wheels and/or propulsion system thereof, may be damaged if compressive forces are transferred there-through during the compression molding step. Accordingly, the carriage and/or compression molding station are typically adapted to prevent damage to the carriage during the compression molding step. In an embodiment, compression molding station 321 includes laterally spaced and substantially parallel elongated supports 366 and 369 that extend upwardly from floor 213, and together define an elongated channel 372 through which guide track 39 extends. During the compression molding step, elongated support 366 and 369 abut underside 53 of carriage 15, and the compressive forces exerted by press 324 are transferred into floor 213 through supports 366 and 369, rather than through support wheels 282 and/or carriage propulsion system 30. The elongated compression molding station supports 366 and 369 may be reversibly extendable up out of floor 213 (e.g., by hydraulic means, not shown), so as to engage underside 53 of carriage 15 during the compression molding step. Alternatively, or in addition thereto, carriage 15 may include means of lowering a platform (not shown) on which mold 24 rests, down onto elongated supports 366 and 369. For example, mold 24 may be supported by a platform (not shown) that is supported by pistons (not shown) or reversibly inflatable pillows (not shown). Retraction of the pistons or deflation of the pillows results in portions of the mold support platform dropping vertically through openings in the bottom of carriage 15 and into abutment with the upwardly extending supports 366 and 369.

The first and second mold portions are typically configured so as to include mating and/or interlocking portions that serve to define a substantially sealed interior mold volume, in which the molded article is formed. For example, first mold portion 24 has an annular groove 357 that is dimensioned to sealingly receive an annular ring 360 of second mold portion 330. Optionally one or more seals (e.g., elastomeric seals) may be located within annular groove 357 and/or extending outward from a surface of annular ring 360, in accordance with art-recognized methods. The sealing receipt of annular ring 360 within annular groove 357 results in formation of an interior mold volume (defined by mold interior surfaces 333 and 27) in which the molded article is formed. The first and/or second mold portions (24, 330) may be provided with vents (not shown) that allow gasses, such as entrapped air, to escape from the sealed mold interior during the compression molding process, as is known to the skilled artisan.

When the compression sequence or step has been completed, compression mold controller 180 provides further operational compression molding (i.e., mold opening) instructions to press 324 through physical coupling 327. The further operational compression molding instructions result in separation of interior surface 333 of second mold portion 330 from the molded article (not shown) that has been compressively formed between the first (24) and second (330) mold portions. For example, compression mold controller 180 provides further operational instructions through physical coupling 327 to hydraulic pressure unit 348, which acts, for example through conduits 351 and 354, so as to cause retraction of drive arm 339 up into or within piston 336, and separation of second mold portion 330 from first mold portion 24. With the first and second mold portions separated, the carriage, with the molded article in/on the first mold portion thereof, may be repositioned to the molded article removal station (e.g., 21).

With completion of the polymer introduction, molding and optional compression molding steps, the carriage is repositioned (under directive of the primary controller and resulting operational instructions of the carriage controller) to the molded article removal station. The molded article may be removed manually and/or mechanically (e.g., robotically) from the mold. In an embodiment, the molded article removal station includes a molded article removal station controller that is operationally coupled (e.g., wirelessly and more typically physically) to a robotic molded article removal apparatus. The primary controller is controllably coupled (e.g., wirelessly and more typically physically) to the molded article removal station controller. With the carriage, including mold and molded article thereon, positioned in and with the molded article removal station so configured, the method of the present invention further includes communicating a molded article removal directive from the primary controller to the molded article removal station controller. In receipt of the molded article removal directive, the molded article removal station controller then provides operational molded article removal instructions to the robotic molded article removal apparatus, which then removes the molded article from the mold. With the molded article removed from the mold, the carriage may be positioned (under directive of the primary controller, and resulting operational instructions of the carriage controller) to the polymer introduction station, and thus the mold formation cycle and method repeated.

With reference to FIG. 1, molded article removal station 21 includes molded article removal station controller 186 that is operationally coupled to robotic molded article removal apparatus 396 through physical coupling 399. Primary controller 12 is controllably coupled to molded article removal station controller 186 through physical coupling 189. Robotic molded article removal apparatus 396 may be selected from known robotic apparatae, and typically includes a plurality of vertically repositionable arms (e.g., 402, 405 and 408) that extend out over guide track 39 and accordingly mold 24 when carriage 15 passes there-under. The vertically repositionable arms typically further include means of retaining the molded article (e.g., suction cups and/or clamps, not shown).

With carriage 15 and mold 24 positioned within molded article removal station 21 and beneath the arms of robotic apparatus 396, primary controller 12 communicates a molded article removal directive to molded article removal station controller 186 through physical coupling 189. Molded article removal station controller 186 then provides operational molded article removal instructions to robotic molded article removal apparatus 396, which lowers arms 402, 405 and 408 downward onto the molded article (residing on mold 24). With the molded article retained by the robotic arms, robotic removal apparatus 396 then raises the robotic arms vertically upward, thus removing the molded article from mold 24. The carriage may then move out from underneath the vertically raised and robotically retained molded article. Alternatively or in addition thereto, robotic apparatus 396 may be reversibly rotatable about its vertical axis, and rotate so as to move the raised and robotically retained molded article away from carriage 15 and guide track 39. The molded article may then be removed (manually and/or further mechanically) from robotic molded article removal apparatus 396. For example the molded article may be released from the robotic arms onto a belt (not shown) which carries the molded article away from the molding system for post-molding operations.

When the molding system includes a looped guide path, such as a looped guide track, the step of determining substantially continuously the location of each carriage, may be achieved by providing each station of the molding system and at least one further non-station position along the loop with separate position indicators, that each interact with each carriage location indicator as the carriage passes thereby. As each carriage location indicator independently interacts with each of the station and non-station position indicators, the location of the carriage is thus determined and wirelessly transmitted from the carriage controller to the primary controller.

In an embodiment of the present invention, and with reference to FIG. 1: polymer introduction station 18 further includes a polymer introduction station position indication 411; molded article removal station 21 further includes a molded article removal station position indicator 414; and the molding system includes at least one further (non-station) position indicator 417. In FIG. 1, the station and non-station position indicators are depicted as residing within interior area 315 (i.e., within looped power strip 210). The station and non-station position indicators may be positioned in any convenient location, provided the carriage location indicators are able to interact with them (e.g., in locations where they are not obstructed). For example, the station and non-station position indicators may each independently be positioned within interior area 315, interposed area 420 (between looped power strip 210 and guide track 39), and/or exterior area 318 (outside of or beyond guide track 39). Each further (or non-station) position indicator (e.g., 417) is separate from: each carriage 15, each station (e.g., polymer introduction station 18 and molded article removal station 21); and each other further/non-station position indicator, if present.

The molding system may include a plurality of (e.g., 2 or more) further/non-station position indicators at various locations around or relative to the looped guide path (e.g., looped guide track 39). If the molding system includes additional stations (in addition to the polymer introduction and molded article removal stations), each additional station may include its own station position indicator. For example, as depicted in FIG. 1, compression molding station 321 further includes a compression molding station position indicator 423.

As each carriage moves around the looped guide path (e.g., guide track 39), each carriage location indicator (e.g., carriage location indicator 62 of FIG. 5) independently interacts with at least one of polymer introduction station position indicator 411, molded article removal station position indicator 414 and at least one further/non-station position indicator (e.g., 417). As each carriage location indicator (e.g., 62) interacts with each station and non-station position indicator, the location of each carriage is determined, transmitted to carriage controller 45 (e.g., via physical coupling 65), and then wirelessly communicated from carriage controller 45 to primary controller 12 (e.g., via wireless communication nodes 86 and 83).

The carriage location indicator may be adapted so as to interact with each of the polymer introduction station position indicator, the molded article removal station position indicator, and each further/non-station position indicator by suitable interaction means. The interaction means typically involves one or both of the carriage location indicator, and the station and non-station position indicators, acting as an emitter (e.g., of light) or physical contact point, and one or both thereof acting as a receiver or sensor of that which is emitted or physically contacted. In an embodiment, such suitable interaction means are selected independently from: physically tripped switch means; magnetic means; electromagnetic radiation means, such as visible light (or optical) means (e.g., laser light), infrared means and radio frequency means; and combinations thereof.

Figure 11:
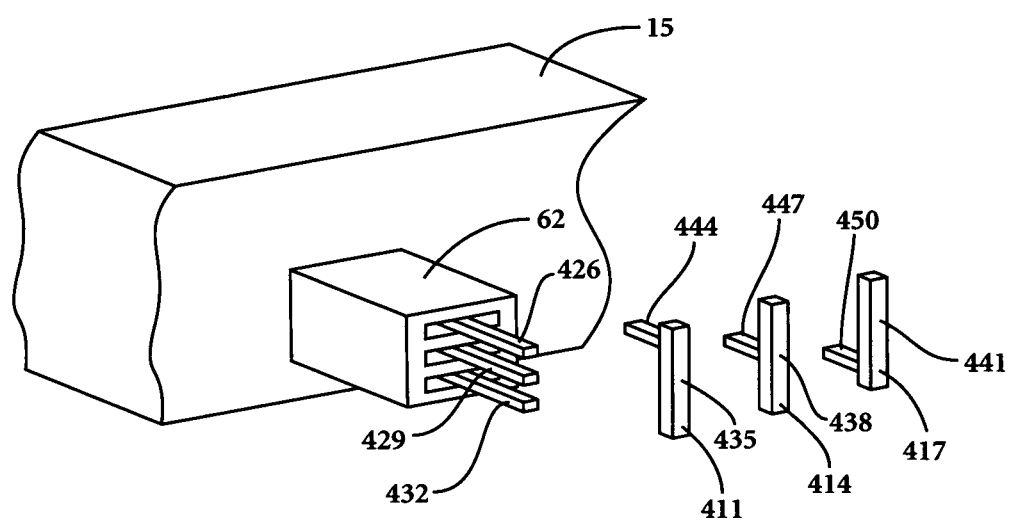
FIG. 11 is a representative schematic perspective view of a carriage location indicator system in which the interaction means thereof includes physically tripped switch means.

With physically tripped switch means, the carriage location indicator typically includes one or more electrical switches or contacts that are physically tripped (or electrically activated) by physical contact with the station and non-station position indicators as the carriage passes thereby. For purposes of illustration, and with reference to FIG. 11, carriage location indicator 62 includes three laterally extending and vertically aligned electrical switches from top to bottom, 426, 429 and 432 (with switch 429 being vertically interposed between top switch 426 and bottom switch 432). Polymer introduction station position indicator 411, molded article removal station position indicator 414, and further/non-station position indicator 417 each include an upwardly extending column (435, 438 and 441 respectively) having a lateral projection (444, 447 and 450 respectively) extending outward therefrom and towards (or in the direction of) the vertically aligned electrical switches of carriage location indicator 62. The lateral projections are vertically positioned so as to physically contact and trip a correspondingly vertically aligned electrical switch of carriage location indicator 62. For example, lateral projection 444 of polymer introduction station position indicator 411 is vertically positioned so as to physically trip switch 426 as carriage 15 passes thereby. With switch 426 so tripped, the location of carriage 15 at polymer introduction station 18 is established/confirmed and transmitted from carriage location indicator 62 to carriage controller 45 (e.g., via physical coupling 65), then wirelessly transmitted from carriage controller 45 to primary controller 12. Similarly, the location of carriage 15 at/relative to molded article removal station position indicator 414 and non-station position indicator 417 are established/confirmed by lateral projection 447 tripping switch 429, and lateral projection 450 tripping switch 432, respectively. The relative positioning of the switches and projections may be selected from any suitable relative orientation. For example, the switches may extend vertically downward (and be positioned laterally relative to each other), and the projections may extend vertically upward (and be positioned laterally relative to each other).

In the case of magnetic interaction means, the carriage location indicator typically includes one or more magnetic field detectors, such as a magnetometer, and each station and non-station position indicator includes a magnetic field emitter, such as a permanent magnet. The permanent magnets of the station and non-station position indicators may be selected so as to emit magnetic fields of different strengths that are each distinguishably detectable by the magnetic field detector(s) of the carriage location indicator. As the carriage passes a particular station or non-station position indicator, the magnetic field detector of the carriage location indicator interacts with and distinguishably detects the particular magnetic field emitted by the permanent magnet of that indicator, and thus the location of the carriage at that particular station/non-station is established/confirmed and transmitted from carriage location indicator 62 to carriage controller 45 (e.g., via physical coupling 65), then wirelessly transmitted from carriage controller 45 to primary controller 12.

The interaction between the carriage location indicator and the station and non-station position indicators may also be selected from electromagnetic radiation interaction means. Suitable electromagnetic radiation interaction means include, but are not limited to, visible light (or optical) means (e.g., laser light), infrared means and radio frequency means. The electromagnetic radiation of the electromagnetic radiation interaction means is more typically selected from visible light, and in particular laser light, and/or infrared light. In the case of electromagnetic radiation interaction means, typically the carriage location indicator acts as both an emitter and receptor/detector of electromagnetic radiation, and the station or non-station position indicators act as reflectors of the electromagnetic radiation emitted by the carriage location indicator. Alternatively, each station or non-station position indicator may act as an electromagnetic radiation emitter, and the carriage location indicator acts as a receiver and distinguishing detector of the so emitted electromagnetic radiation.

Figure 12:
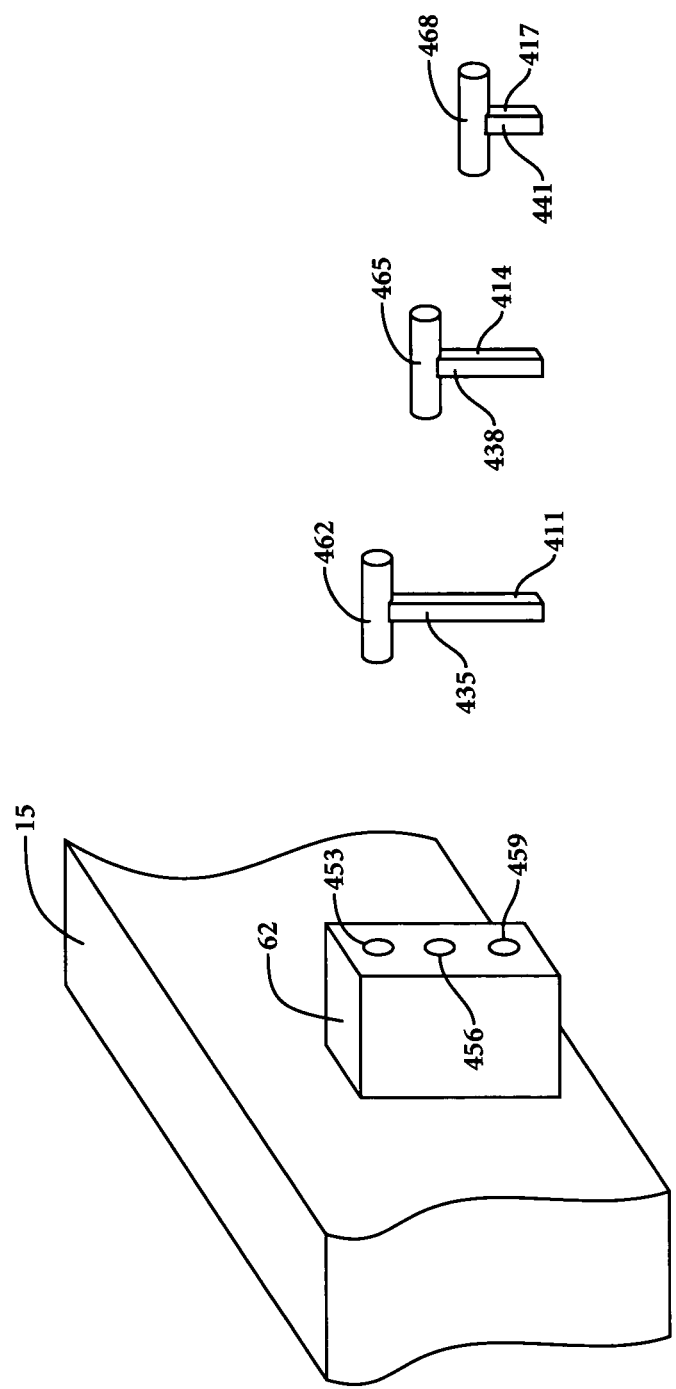
FIG. 12 is a representative schematic perspective view of a carriage location indicator system in which the interaction means thereof includes optical means.

For purposes of illustration, and with reference to FIG. 12, carriage location indicator 62 includes three separate and vertically aligned combined laser light emitters and detectors from top to bottom, 453, 456 and 459 (with emitter-detector 456 being vertically interposed between top emitter-detector 453 and bottom emitter-detector 459). The upwardly extending columns (435, 438 and 441) of the respective polymer introduction station position indicator 411, molded article removal station position indicator 414, and further/non-station position indicator 417 each include a laser light reflector (462, 465 and 468, respectively). The laser light reflectors are each vertically positioned so as to reflect laser light emitted by a particular emitter-detector, back at that particular emitter-detector. For example, reflector 462 is vertically positioned so as to reflect laser light emitted by emitter-detector 453, back at emitter-detector 453, as carriage 15 passes thereby. With the reflected laser light so received and detected by emitter-detector 453, the location of carriage 15 at polymer introduction station 18 is established/confirmed and transmitted from carriage location indicator 62 to carriage controller 45 (e.g., via physical coupling 65), then wirelessly transmitted from carriage controller 45 to primary controller 12. Similarly, the location of carriage 15 at/relative to molded article removal station position indicator 414 and non-station position indicator 417 are each established/confirmed by, laser light emissions, reflections, receptions and detections between emitter-detector 456 and reflector 465, and emitter-detector 459 and reflector 468.

In an embodiment, the carriage location indicator of each carriage is independently a carriage location indicator barcode reader, and each station and non-station position indicator is a station/non-station position indicator barcode. The location of each carriage is determined, with this particular embodiment, by the carriage location indicator barcode reader interacting with (i.e., reading) at least one of the station/non-station position indicator barcodes. With the station or non-station position indicator barcode so detected and read by the carriage location indicator barcode reader, the location of the carriage at or relative to that particular station/non-station position is established/confirmed and transmitted from carriage location indicator barcode reader 62 to carriage controller 45 (e.g., via physical coupling 65), then wirelessly transmitted from carriage controller 45 to primary controller 12.

In a particular embodiment: the polymer introduction station position indicator is a polymer introduction station position indicator barcode; the molded article removal station position indicator is a molded article removal station position indicator barcode; each further/non-station position indicator is independently a further/non-station position indicator barcode; and each carriage location indicator is independently a carriage location indicator barcode reader. The step of continuously determining the location of each carriage involves, each carriage location indicator barcode reader independently reading at least one of: the polymer introduction station position indicator barcode; the molded article removal station position indicator barcode; and at least one further/non-station position indicator barcode.

The barcode reader of the carriage location indicator barcode reader may be selected from art-recognized barcode readers, which typically emit incoherent visible light (e.g., red light from a light emitting diode, LED) or more typically coherent laser light, that is reflected off of the barcode and back at the barcode reader. The barcodes of the station and non-station position indicator barcodes may be selected from art-recognized barcodes, such as 1-dimensional and/or 2-dimensional barcodes. The barcodes of the station and non-station position indicator barcodes typically, at a minimum, provide an alpha-numeric value that correlates to that particular station or non-station position within the molding system (e.g., as may be stored in a database of, and crosschecked by, the primary controller).

Optionally, the barcodes of the station and non-station position indicator barcodes may include and provide information in addition to position identification (e.g., extra-position information), such as station component information (e.g., equipment types and configurations in operation at that station). For example, compression molding station position indicator barcode 423, of compression molding station 321, may provide information concerning the type of second mold portion 330 retained within the press 324 (FIGS. 1 and 8). With the compression molding station position indicator barcode 423 read by carriage location indicator barcode reader 62, the position and extra-position (e.g., mold 330 identification) information provided thereby is transmitted to carriage controller 42 and then wirelessly communicated to primary controller 12. In receipt of both the position and extra-position information, primary controller 12 may then determine whether the first mold portion 24 of carriage 15 and the second mold portion 330 of compression molding station 321 are properly matched. If the first and second mold portions are not properly matched, primary controller 12 may: direct carriage 15 to move on to another compression molding station (not shown in the drawings); or direct compression molding station 321 to forgo compression molding, and emit an alarm requiring a human operator to inspect the compression molding station and address the detected mold mismatch.

In an embodiment of the method of the present invention, the location of the carriage is determined by measuring substantially continuously the distance the carriage has traveled around/along the looped guide path, relative to a selected zero or start point on the looped guide path. More particularly, the carriage location indicator includes a linear distance traveled measuring apparatus (or device), and the looped guide path has a total looped guide path linear distance. A zero linear distance start point on the looped guide path is selected. Relative to the zero linear distance start point, the linear distance traveled by the carriage is measured substantially continuously by the linear distance traveled measuring device. The so measured linear distance traveled by the carriage is then compared substantially continuously (typically by the carriage controller) to the total looped guide path distance, and the location of the carriage on the looped guide path is thereby determined. Each station of the molding system is typically assigned a particular linear distance, relative to the zero start point and the total looped guide path linear distance, along the looped guide path. As such, the location of the carriage along the looped guide path is coordinated with regard to the position of a particular station on the same looped guide path.

The linear distance traveled measuring apparatus/device may be selected from art-recognized devices, such as commercially available contact and non-contact linear encoders. Non-contact linear encoders typically include a magnetic head that determines linear distance traveled relative to a magnetic strip (e.g., positioned on the floor and following the looped guide path). A contact linear encoder typically includes a disk that is directly or indirectly coupled to the looped guide path, and each rotation of the disk is equivalent to a calibrated linear distance traveled. For example, and with reference to FIG. 4, propulsion system 30 further includes a linear distance traveled measuring apparatus 471 (which is more particularly a contact linear encoder), that is rotationally coupled to drive mechanism 36 by a shaft 474. As drive mechanism 36 moves along guide track 39, rotation thereof is transferred via shaft 474 to linear distance traveled measuring apparatus 471, which measures the linear distance traveled by carriage 15 (relative to the zero start point). The linear distance traveled by carriage 15 is then transmitted substantially continuously from linear distance traveled measuring apparatus 471 to carriage controller 45 through physical coupling 477. Carriage controller 45 compares the linear distance traveled by the carriage to the total looped guide path/track linear distance, and thereby determines the location of carriage 15 on the looped guide path (e.g., looped guide track 39).

The zero linear distance start point may be selected from any point along the looped guide path. For example, the zero linear distance start point may correspond to a station or non-station position along the looped guide path. The linear distance traveled measuring apparatus may be configured so as to zero itself (or reset itself to zero) upon reaching a linear distance traveled that is equivalent to the total looped guide path linear distance. If, however, the drive mechanism (e.g., 36), to which the linear distance traveled measuring apparatus is rotationally coupled, slips as it moves along the guide path (e.g., guide track 39), the linear distance traveled by the carriage and correspondingly the reset zero start point will be incorrect, and the determined location of the carriage on the looped guide path will not correspond to its actual location.

To more accurately set the zero start point, the molding system may further include a zero linear distance start point position indicator (not shown) that is separate from each carriage and located at a set point along the looped guide path. The zero linear distance start point position indicator interacts with a zero start point detector (not shown) on the carriage, e.g., by interaction means selected independently from: physically tripped switch means; magnetic means; electromagnetic radiation means, such as visible light (or optical) means (e.g., laser light), infrared means and radio frequency means; and combinations thereof (substantially in accordance with the description provided previously herein with regard to the carriage location indicator). As the carriage passes the zero linear distance start point position indicator, the zero start point detector is activated or tripped, and transmits a zero reset signal via an electrical coupling to the linear distance traveled measuring apparatus/device, thereby resetting the linear distance traveled measuring device (e.g., 471) to zero.

In an embodiment of the present invention, the mold that is transported on each carriage is a sheet mold, and the interior mold surface thereof has a contour and a plurality of perforations. The polymer introduction apparatus includes a sheet die that forms an extruded sheet having a thermoformable temperature that is introduced gravitationally onto (into contact with) the interior mold surface of the sheet mold. Each carriage further includes a pressure reduction apparatus that is in fluid communication with the sheet mold and the plurality of perforations of the interior mold surface. In addition, the carriage controller is operationally coupled to the pressure reduction apparatus. With reference to FIG. 5, carriage control system 3 includes a pressure reduction apparatus 480, that is in fluid communication with mold 24 (here sheet mold 24) by means of conduit 483. Carriage controller 45 is operationally coupled to pressure reduction apparatus 480 by means of physical/electrical coupling 486.

With each carriage and the polymer introduction apparatus so configured (with a sheet mold, pressure reduction apparatus and sheet die), with a carriage positioned at the polymer introduction station, and an extruded thermoformable sheet at least partially gravitationally introduced onto (into contact with) at least a portion of the interior mold surface of the sheet mold, the method of the present invention further includes wirelessly communicating a pressure reduction apparatus control directive from the primary controller to the carriage controller. Being in receipt of the pressure reduction apparatus control directive, the carriage controller then provides operational pressure reduction apparatus instructions (e.g., via physical coupling 486) to the pressure reduction apparatus (e.g., 480). The pressure reduction apparatus, being so operationally instructed, then draws reduced pressure through the plurality of perforations of the interior mold surface, which results in the extruded thermoformable sheet being drawn into contour matching contact with the interior mold surface of the sheet mold, and thereby forming the molded article (or sheet molded article).

With the sheet molding embodiment, while the extruded sheet is gravitationally introduced onto the interior mold surface of the sheet mold, the method of the present invention may further include communicating wirelessly one or more carriage forward velocity directives from the primary controller to the carriage controller. While in receipt of the forward velocity directive(s), the carriage controller provides operational carriage forward velocity instructions to the propulsion system of the carriage. The forward velocity of the carriage is thus controlled while the extruded thermoformable sheet is gravitationally introduced onto the interior mold surface of the sheet mold. Controlling the forward velocity of the carriage also correspondingly results in controlling the thickness of the extruded sheet as it is gravitationally introduced onto the interior mold surface of the sheet mold. For example, if the carriage is moved at a greater velocity beneath the sheet die, the extruded sheet will in effect be stretched thinner over the interior mold surface. Contrarily, if the carriage is moved at a lower velocity beneath the sheet die, the extruded sheet will be less so stretched and will resultantly be thicker over the interior mold surface. The forward velocity of the carriage may be adjusted continuously and/or in steps while the carriage moves beneath the sheet die (e.g., if different extruded sheet thickness over different portions of the interior mold surface are desired).

Alternatively or in addition to controlling the forward velocity of the carriage as it passes the sheet mold under the sheet die, the thickness of the extruded thermoformable sheet emerging from the sheet die may also be controlled. As discussed previously herein the die/sheet die, may be fitted with one or more gates that serve to control the flow of melt blended polymer material there-through and correspondingly the shape (including width and/or thickness) and amount (e.g., rate of flow) of the extruded thermoformable sheet emerging therefrom. In a further embodiment, an extruded thermoformable sheet thickness directive is wirelessly communicated from the primary controller to the polymer introduction controller. The polymer introduction controller (e.g., 68) then provides operational extruded sheet thickness instructions to the sheet die, e.g., by means of operational physical coupling 74(c) (FIG. 6). The operational extruded sheet thickness instructions serve to control the positioning of one or more gates across the sheet slot of the sheet die. The thickness of the extruded thermoformable sheet is thus controlled while the extruded sheet is gravitationally introduced onto the interior mold surface of the sheet mold.

Figure 9:
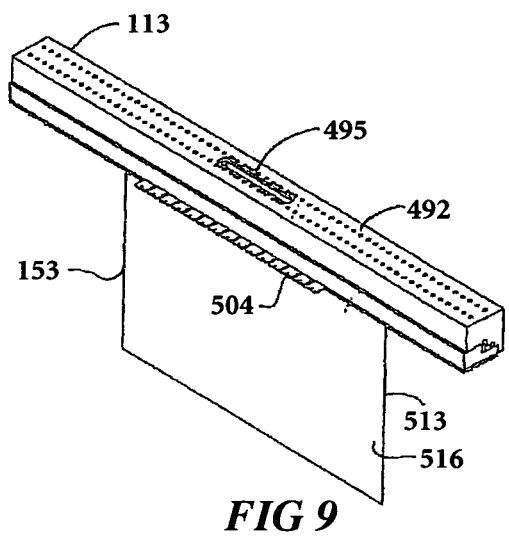
FIG. 9 is a representative perspective view of a sheet die having a heated thermoplastic sheet emerging from the elongated slot thereof.
Figure 10:
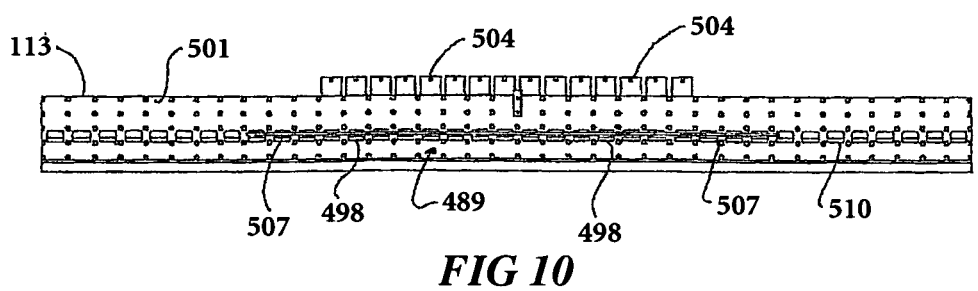
FIG. 10 is a plan view of the bottom of the sheet die of FIG. 9, showing the effective elongated slot thereof.

The sheet die may include a substantially continuous sheet slot, and/or a plurality of laterally aligned and neighboring openings that together effectively form a sheet slot. For purposes of further illustration, and with reference to FIGS. 9 and 10, sheet die 113 is depicted having heated thermoplastic sheet 153 (equivalently extruded thermoformable sheet 153) emerging from the elongated sheet slot 489 thereof. Heated thermoplastic sheet 153 has a first surface 513 and a second surface 516. The top 492 of sheet die 113 has an opening 495 into which the heated thermoplastic composition is received (e.g., from terminal end 101 of polymer introduction apparatus (extruder) 71 via conduit 117 of FIG. 6). Opening 495 is in fluid communication with at least one interior channel (not shown) that provides fluid communication with the plurality of openings 498/elongated sheet slot 489 in the bottom 501 of sheet die 113. Elongated sheet slot 489 is located on the bottom 501 of sheet die 113, and is formed by the plurality of laterally aligned openings 498 through which the molten thermoplastic material emerges and forms heated thermoplastic sheet 153 (the molten thermoplastic material emerging from each opening 498 merging continuously together with the molten thermoplastic material of each neighboring opening 498 so as to form the heated thermoplastic sheet). At least some of the plurality of laterally aligned openings 498 each have a reversibly and controllably closeable gate 504 associated therewith. Each gate 504 may be independently controllably and reversibly moved, by separate actuators (not shown), across each opening 498 associated therewith, so as to control the amount of molten thermoplastic material passing through each opening 498, and accordingly the thickness, width and shape of the heated thermoplastic sheet (e.g., 153) emerging from the effective elongated sheet slot formed by the adjacent and laterally aligned openings 498. Some of the laterally aligned openings (e.g., 507) in bottom 501 of sheet die 113 may not have a gate 504 associated therewith, and the molten thermoplastic composition consequently flows substantially freely therethrough. In addition, some of the laterally aligned openings (e.g., 510) in bottom 501 of sheet die 113 may be sealed and do not have any molten thermoplastic composition flowing therethrough or emerging therefrom.

Figure 13:
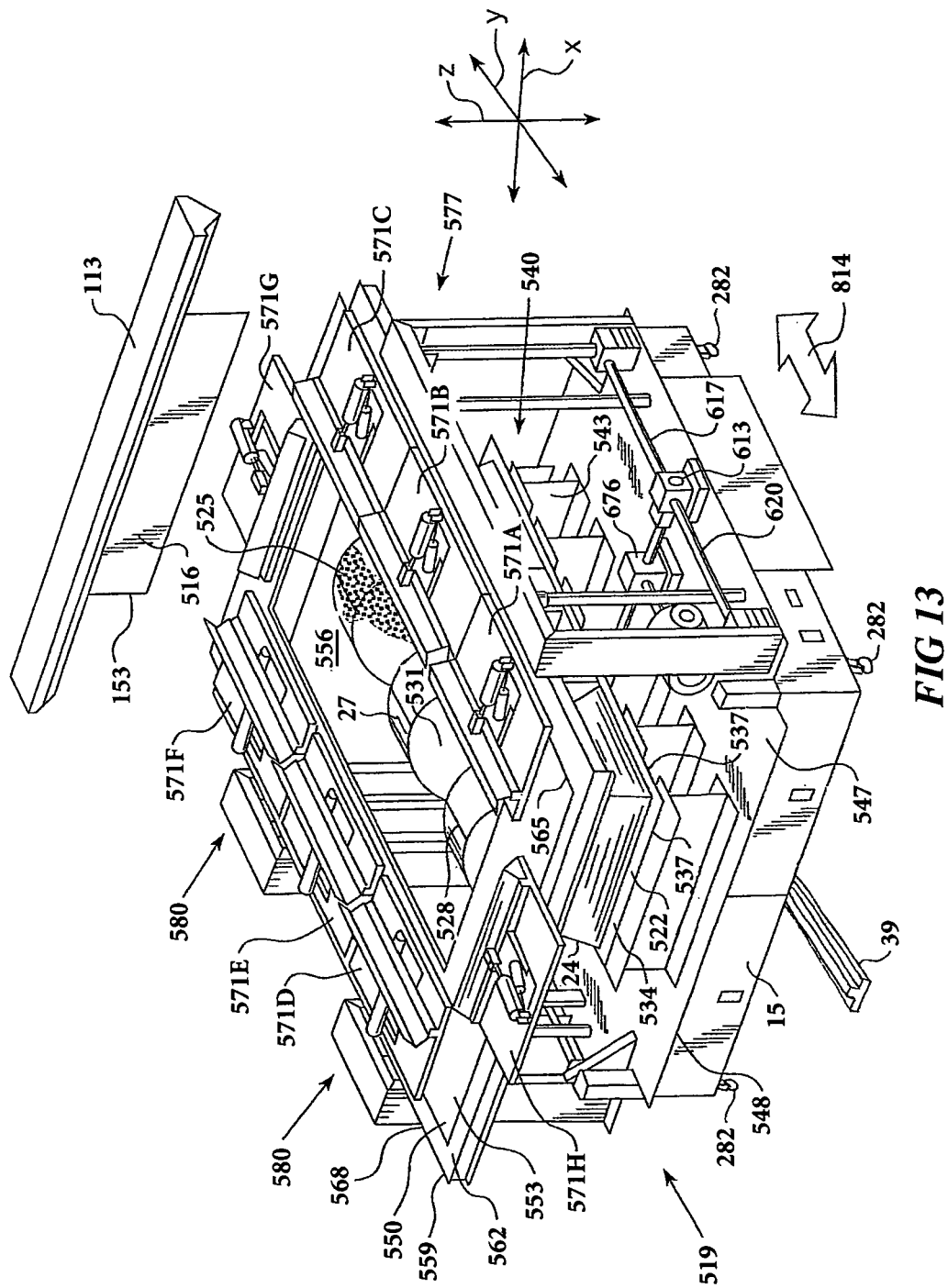
FIG. 13 is a representative perspective view of a sheet molding apparatus, that may be used in the present invention, with a heated thermoplastic sheet emerging from the sheet die.
Figure 14:
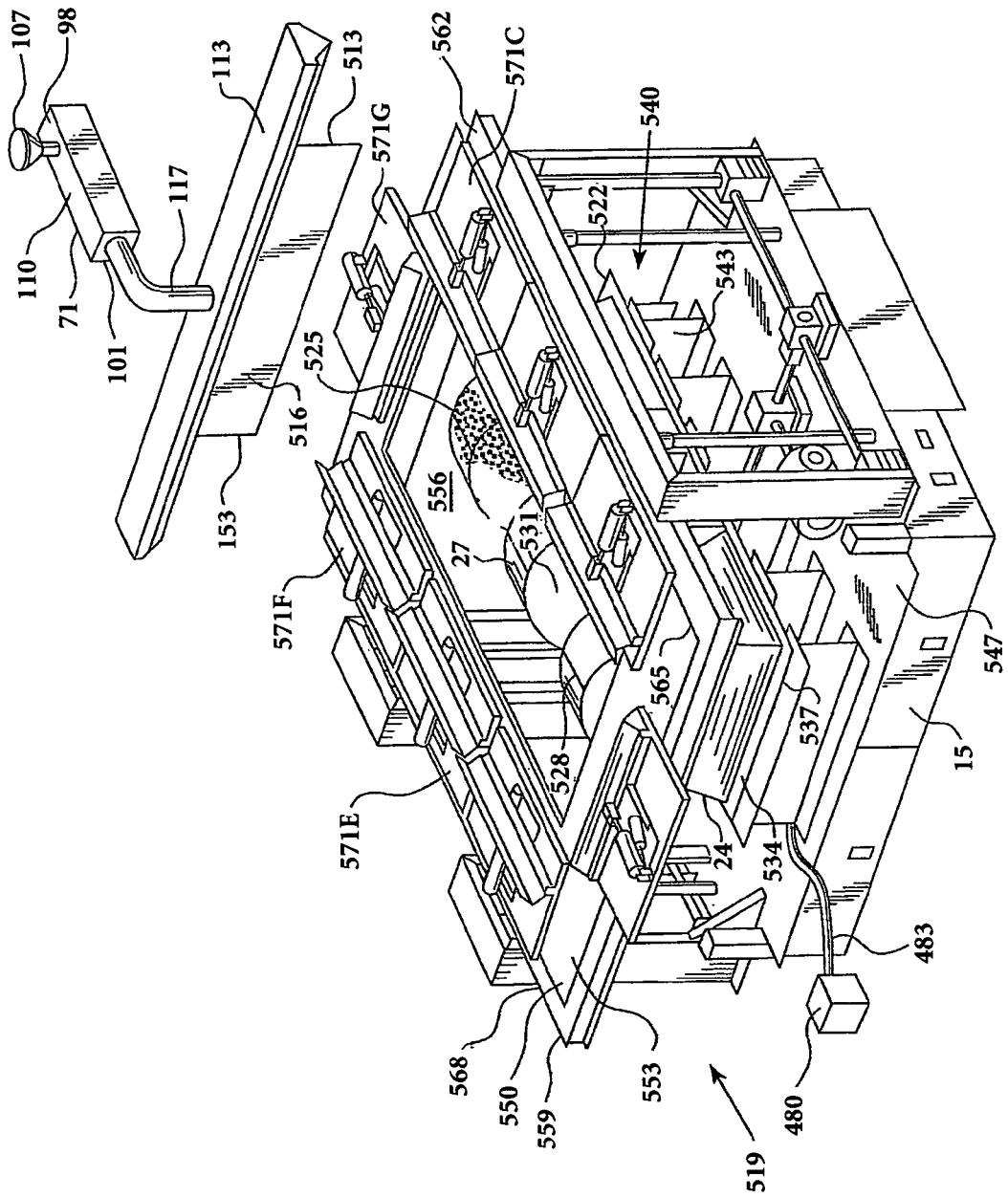
FIG. 14 is a representative perspective view of the sheet molding apparatus of FIG. 13, further including an extruder and a separate vacuum pump for the first mold portion.

The sheet molding embodiment of the present invention may be further particularly described with reference to FIGS. 13 through 26. With particular reference to FIGS. 13 and 14, a sheet molding apparatus 519 useful in the method and with the molding system of the present invention is depicted, which includes a first mold portion 24 having an interior mold surface 27 and a perimeter edge 522. Interior mold surface 27 has a contour and a plurality of perforations 525. The contour of interior mold surface 27 may include, for example, raised portions 528 and/or recessed portions 531. Interior mold surface 27 may be a substantially recessed or female interior mold surface (not shown), in which case, it resides substantially below perimeter edge 522. Alternatively, interior mold surface 27 may be a substantially raised or male interior mold surface (as depicted), in which case, a majority of interior mold surface 27 resides above perimeter edge 522. In addition, interior mold surface 27 may include relatively shallow (e.g., relative to raised portions 528 and recessed portions 531) raised and/or recessed patterns (not shown), such as grooves, for purposes of providing the surface of the molded article with texture and/or molded-in indicia.

Perimeter edge 522 typically defines the terminal extent of first mold portion 24 beyond which heated thermoplastic sheet (extruded thermoformable sheet), if any, extending there-beyond does not form a portion of the final molded article. Typically, thermoplastic sheet, if any, extending beyond perimeter edge 522 is removed (e.g., cut away) from the final molded article. Perimeter edge 522 may have any suitable shape, such as rounded, polygonal, irregular or combinations thereof. As depicted in the drawings, perimeter edge 522 is in the form of a substantially horizontal shelf having an upper surface 534 and a terminal edge 537.

For purposes of clarity, the plurality of perforations 525 are only depicted in FIGS. 13 and 14, and only over a portion of interior mold surface 27. Perforations 525 may be located over substantially the entirety of interior mold surface 27 or in zones (or clusters). Perforations 525 may be arranged substantially uniformly or non-uniformly (e.g., randomly) over interior mold surface 27. If located in zones, portions of interior mold surface 27 may be free of perforations. The plurality of perforations are typically arranged (or located) uniformly over substantially the entirety of interior mold surface 27.

The plurality of perforations are in fluid communication with at least one pressure reduction apparatus, such as a vacuum pump. Typically, first mold portion 24 has at least one interior chamber (not shown) that is in fluid communication with the plurality of perforations 525 and at least one pressure reduction apparatus, for example pressure reduction apparatus 480 by means of conduit 483, as depicted in FIG. 14. Conduit 483 may be a rigid conduit, but more typically is fabricated from a flexible material that may be reversibly coiled. Conduit 483 is depicted as passing beneath a portion of a support structure 540 upon which first mold portion 24 rests and is supported. Support structure 540 includes a plurality of beams 543 (e.g., I-beams) that extend upwardly from the upper surface 547 of top plate 548 of the underlying carriage 15. Carriage 15 includes a plurality of support wheels 282 (FIG. 13).

While depicted as being separated from first mold portion 24, pressure reduction apparatus 480 may alternatively be positioned more proximate thereto (e.g., residing on carriage 15, not so depicted). Pressure reduction apparatus 480 controllably draws reduced pressure through the plurality of perforations in interior mold surface 27. For example, the reduced pressure drawn through perforations 525 may be ramped in stages with at least one pressure plateau, or the reduced pressure may be drawn at the full capacity of pressure reduction apparatus 480 from the instant it is turned on (or activated).

To assist removing the molded article from first mold portion 24, a gas (e.g., air) may be passed out of perforations 525 at elevated pressure (i.e., at a pressure greater than ambient atmospheric pressure). To pass a gas, such as air, at elevated pressure out through perforations 525, pressure reduction apparatus 480 may be operated in reverse, and/or a separate pressure pump (not shown) may be used in fluid communication with the internal chamber and correspondingly perforations 525 of first mold portion 24. In addition, the gas passed out of perforations 525 may be cooled to a temperature less than ambient temperature (e.g., a temperature less than 25° C., such as 5° C. to 15° C.) to further assist cooling the heated thermoplastic sheet, such that it retains the contour shape of interior mold surface 27.

The plurality of perforations in interior mold surface 27 may have any suitable shape and dimension, provided they: (i) are not fouled, occluded or otherwise clogged with thermoplastic material when the molded article is removed from first mold portion 24; and (ii) do not result in undesirable surface features or defects on the final molded article (e.g., plastic nubs extending from a surface thereof). The perforations in interior mold surface 27 may have cross-sectional shapes selected from polygonal shapes (e.g., triangles, rectangles, squares, pentagons, hexagons, heptagons, octagons, etc., and combinations thereof), circles, ovals, irregular shapes, and combinations thereof. Typically, the perforations of interior mold surface 27 have substantially circular cross-sectional shapes having diameters of from 0.1 mm to 7 mm, more typically from 0.5 mm to 5 mm, and further typically from 1 mm to 3 mm. In an embodiment of the present invention, the perforations of interior mold surface 27 have substantially circular cross-sectional shapes having diameters of 1.6 mm (1/16 inch).

The sheet molding apparatus of the present invention also includes a frame 550 that surrounds at least a portion of perimeter edge 522 of first mold portion 24. Frame 550 has an upper surface 553, and includes an opening 556 that is dimensioned to allow first mold portion 24, and, in particular, perimeter edge 522 thereof to pass at least partially therethrough. Frame 550 and first mold portion 24 are reversibly vertically positionable relative to each other (e.g., along the z-axis as depicted in FIG. 13), which allows for a heated thermoplastic sheet to be brought into contact with interior mold surface 27 of first mold portion 24, as will be discussed in further detail herein. For example, first mold portion 24 and frame 550 may each independently be reversibly vertically positionable by art-recognized means, such as by pistons, scissor jacks, and/or screw jacks.

Frame 550 may be used alone. Alternatively, frame 550 may be used in conjunction with a frame support 559, which resides abuttingly beneath and provides support for frame 550. The use of a separate frame 550 and a support frame 559 is advantageous as it allows for separate frames having, for example, different sheet retainers and/or different sheet retainer configurations, to be quickly interchanged (e.g., on and off of support frame 559). Being able to quickly interchange frames with associated sheet retainers thereon, may be desirable when the sheet mold apparatus is fitted with different first mold portions having different dimensions and/or configurations. Upper surface 553 of frame 550 resides above upper surface 562 of support frame 559. Frame 550 has an outer edge 565. Frame 550 is typically dimensioned such that its outer edge 565 is inward relative to the outer edge 568 of support frame 559. Such dimensioning, allows for each sheet retainer 571 to be laterally moveable over (e.g., slidingly over) upper surface 553 of frame 550, and at the same time a rear portion 574 thereof to be laterally moveable over and separated from upper surface 562 of support frame 559, as will be discussed in further detail herein.

In an embodiment of the present invention, first mold portion 24 is substantially stationary relative to vertical positioning, and frame 550 is reversibly and controllably vertically positionable. In a particular embodiment, frame 550 is reversibly vertically positionable by means of a first screw actuator assembly 577 and a second screw actuator assembly 580, which are located on opposite sides of the frame. The screw actuator assemblies (e.g., 577 and 580) are typically positioned so as to minimize the likelihood that they will come into direct contact with the heated thermoplastic sheet as it is laid down across the sheet retainers, as will be discussed in further detail herein.

Figure 15:
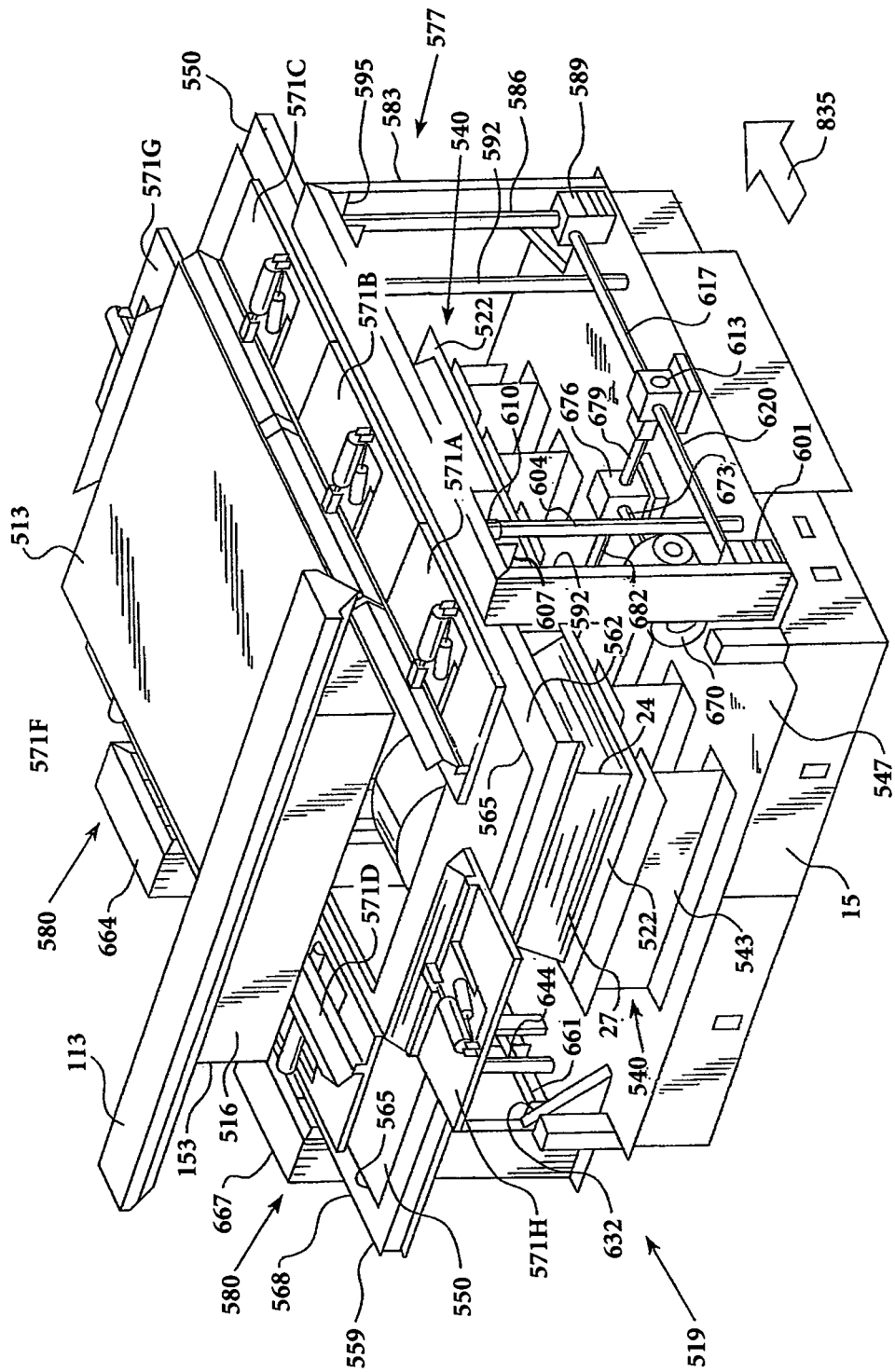
FIG. 15 is a representative perspective view of the sheet molding apparatus of FIG. 13, in which the heated thermoplastic sheet extends across a portion of the sheet retainers and over a portion of the first mold portion.

With reference to FIG. 15, screw actuator assembly 577 includes a box frame 583 that is attached to and extends upwardly from upper surface 547 of carriage 15. First screw actuator assembly 577 further includes a first screw 586 that extends vertically upwardly from a first screw transfer gear box 589, and a first guide rod 592 that extends vertically upward from upper surface 547 of carriage 15. First screw 586 engages threadingly with a first threaded eyelet 596 (visible in FIG. 17) that extends laterally outward from support frame 559. First guide rod 592 is not threaded and engages slidingly with a first non-threaded guide eyelet 595 that extends laterally outward from support frame 559. First actuator assembly 577 also includes a second screw 598 (only partially visible in the drawing figures) that extends vertically upward from a second screw transfer gear box 601, and a second guide rod 604 that extends vertically upward from upper surface 547 of carriage 15. Second screw 598 engages threadingly with a second threaded eyelet 607 that extends laterally outward from support frame 559. Second guide rod 604 is not threaded and engages slidingly with a second non-threaded guide eyelet 610 that extends laterally outward from support frame 559.

First screw actuator assembly 577 also includes a primary transfer gear box 613. Primary transfer gear box 613 has a first lateral shaft 617 that extends laterally outward therefrom and engages with first screw transfer gear box 589, and a second lateral shaft 620 that extends laterally outward therefrom and engages with second screw transfer gear box 601.

Figure 19:
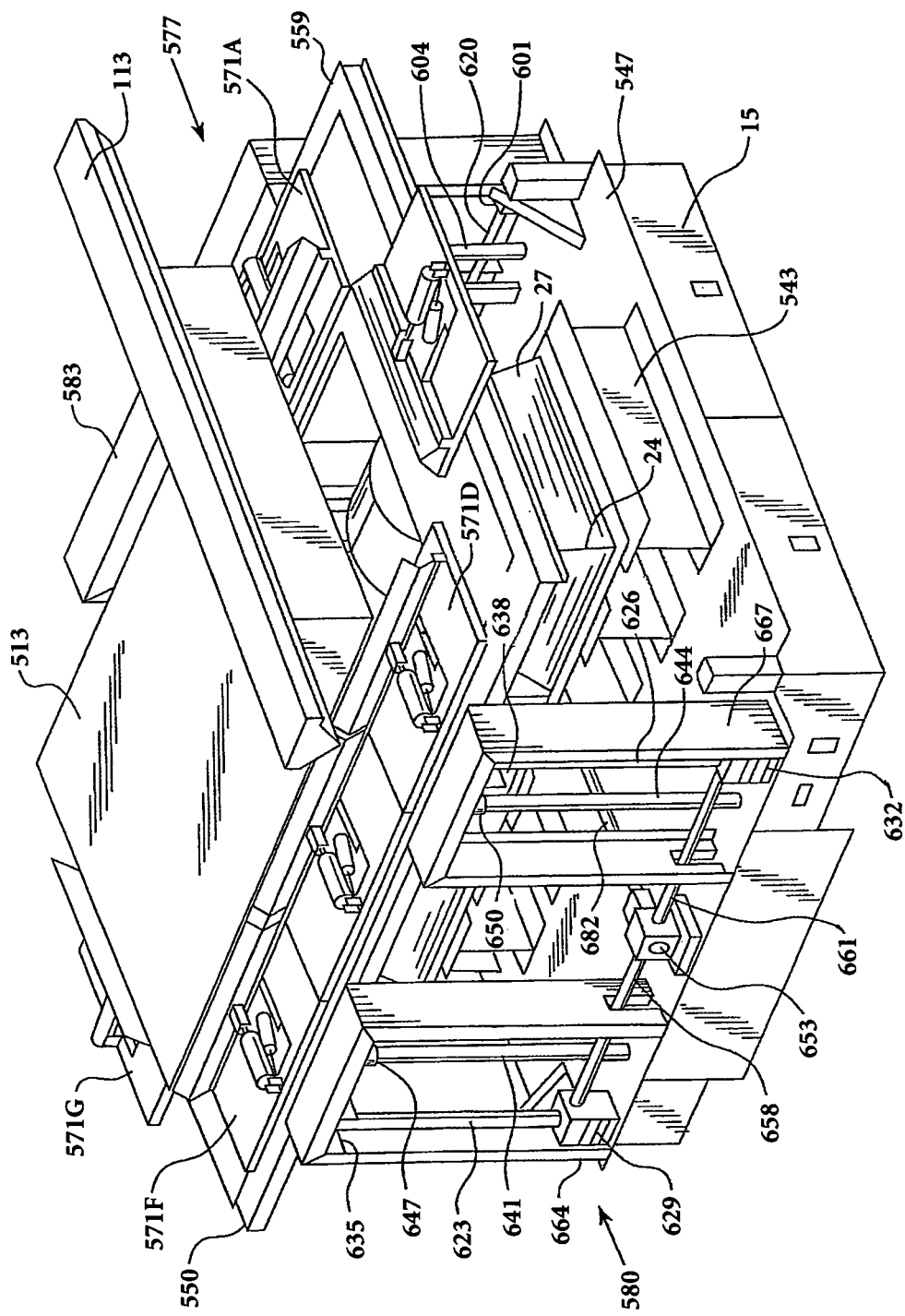
FIG. 19 is a representative alternate perspective view of the sheet molding apparatus of FIG. 15, which provides a perspective view of the second screw actuator assembly (580)

Second screw actuator assembly 580 is substantially the same as first screw actuator assembly 577. With reference to FIGS. 13, 15 and 19, second screw actuator assembly 580 includes: first 623 and second 626 screws that each extend vertically upward from respective first 629 and second 632 screw transfer gear boxes, and engage threadingly with respective first 635 and second 638 threaded eyelets; first 641 and second 644 guide rods that each extend vertically upward from the upper surface 547 of the carriage 15, and engage slidingly with respective first 647 and second 650 non-threaded eyelets; and a primary transfer gear box 653 having first 658 and second 661 lateral shafts that each engage respectively with the first 629 and second 632 screw transfer gear boxes. Rather than having a single box frame (such as box frame 583 of first screw actuator assembly 577) second screw actuator assembly 580 has two separate box frames 664 and 667. Box frame 664 contains first screw 623 and first guide rod 641, and box frame 667 contains second screw 626 and second guide rod 644 of second screw actuator assembly 580.

The first and second screw actuator assemblies may each be driven independently or in concert, and may be manually or mechanically driven. Typically, the first and second screw actuator assemblies are each mechanically driven, and more typically mechanically driven in concert. Separate motors may be used to drive each screw actuator assembly. In an embodiment and with reference to FIGS. 13 and 19, the first 577 and second 580 screw actuator assemblies are driven in concert by means of a single drive motor 670. Drive motor 670 may be selected from known motors, and is typically an electric motor. Drive motor 670 has a drive shaft 673 (only partially visible in the drawings) that extends outward therefrom and engages with a global transfer gear box 676 that has a first global lateral shaft 679 that extends outward therefrom and engages with primary transfer gear box 613 of first screw actuator assembly 577. Global transfer gear box 676 has a second global lateral shaft 682 that extends outward therefrom, passes through/under support structure 540 and engages with the primary transfer gear box 653 of second screw actuator assembly 580.

When activated and engaged, drive motor 670 turns drive shaft 673, which through global transfer gear box 676 causes the first 679 and second 682 global lateral shafts to turn. First global lateral shaft 679, through primary transfer gear box 613, causes the first 617 and second 620 shafts to turn, which through first 589 and second 601 screw transfer gear boxes causes the first 586 and second 598 screws of first screw actuator assembly 577 to turn. At the same time, second global lateral shaft 682, through primary transfer gear box 653, causes the first 658 and second 661 global lateral shafts of the second screw actuator assembly 580 to turn, which correspondingly through the first 629 and second 632 screw transfer boxes thereof cause the first 623 and second 626 screws of the second screw actuator assembly 580 to turn. The screws (586 and 598; 623 and 626) engage threadingly with their respective threaded eyelets (595 and 607; 635 and 638) and thus cause frame 550 to move vertically up or down, depending, for example, on which way drive motor 670 and drive shaft 673 are turned. Further, correspondingly, the non-threaded guide rods (592 and 604; 641 and 644) engage slidingly with their respective non-threaded eyelets (595 and 610; 647 and 650) so as to stabilize the vertical movement of frame 550. As a result of the arrangement of various shafts and transfer gear boxes, the first and second screw actuator assemblies are driven controllably in concert.

The sheet mold apparatus of the present invention also includes at least one sheet retainer 571. With reference to FIGS. 20 through 24, each sheet retainer has a clamp portion 685 that faces towards (or in the direction of) perimeter edge 522 of first mold portion 24. Clamp portion 685 includes a clamp member 688 and a clamp interior 691. Clamp member 688 is reversibly closeable. Clamp interior 691 is defined in part by clamp member 688, and more particularly at least in part by interior (or under) surface 694 of clamp member 688. Clamp interior 691 may be defined by a combination of interior surface 694 of clamp member 688 and: the portion of upper surface 553 of frame 550 residing there-under; or more typically the upper surface of a forward portion of a base plate of sheet retainer 571 residing there-under, as will be discussed in further detail herein. Each sheet retainer 571 is independently, reversibly and laterally attached to the upper surface 553 of frame 550, such that clamp portion 685 is reversibly and laterally positionable relative to perimeter edge 522 of first mold portion 24.

Figure 20:
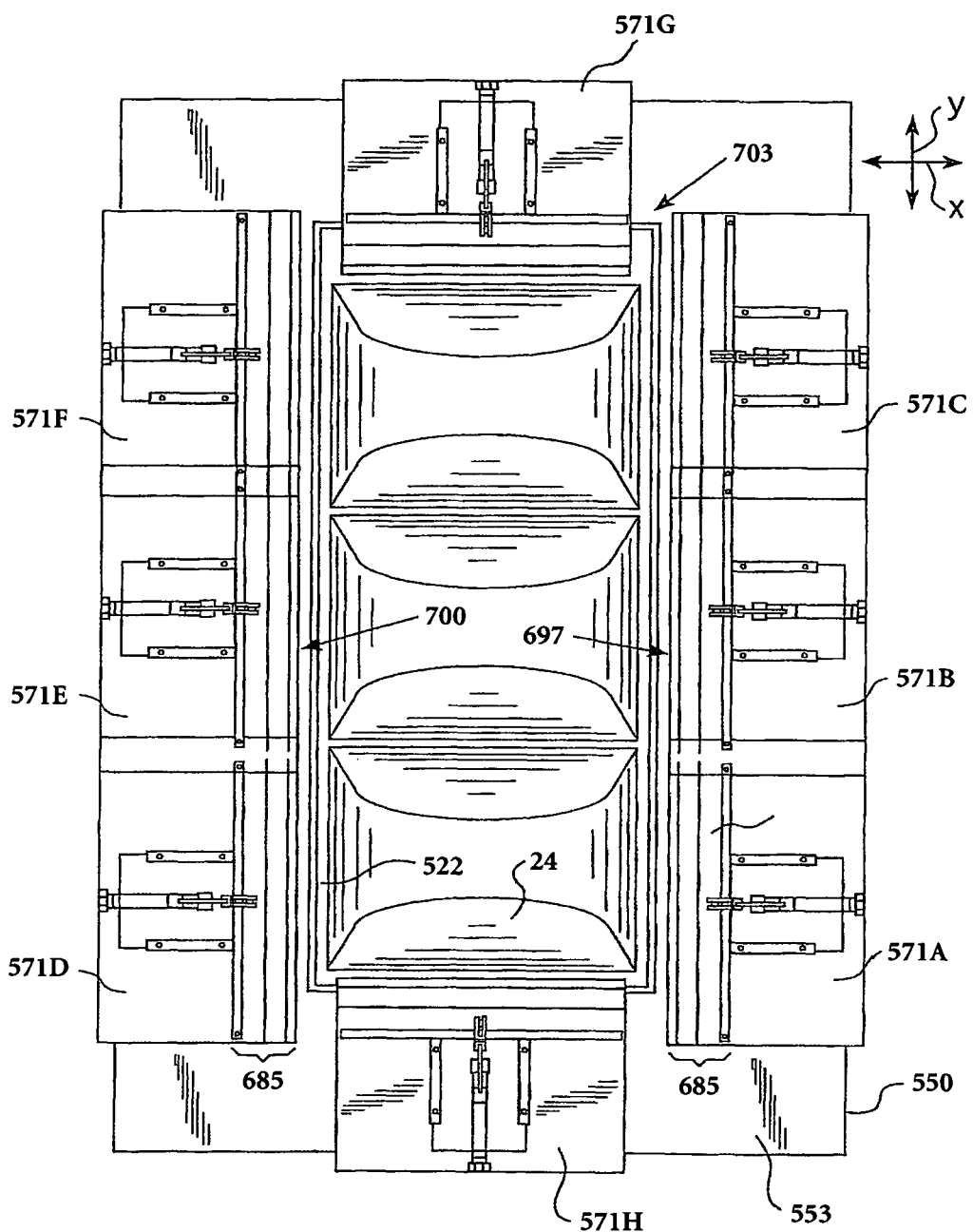
FIG. 20 is a representative top plan view of the first mold portion, frame and sheet retainers alone, with the frame positioned substantially near the bottom of its vertical drop.
Figure 21:
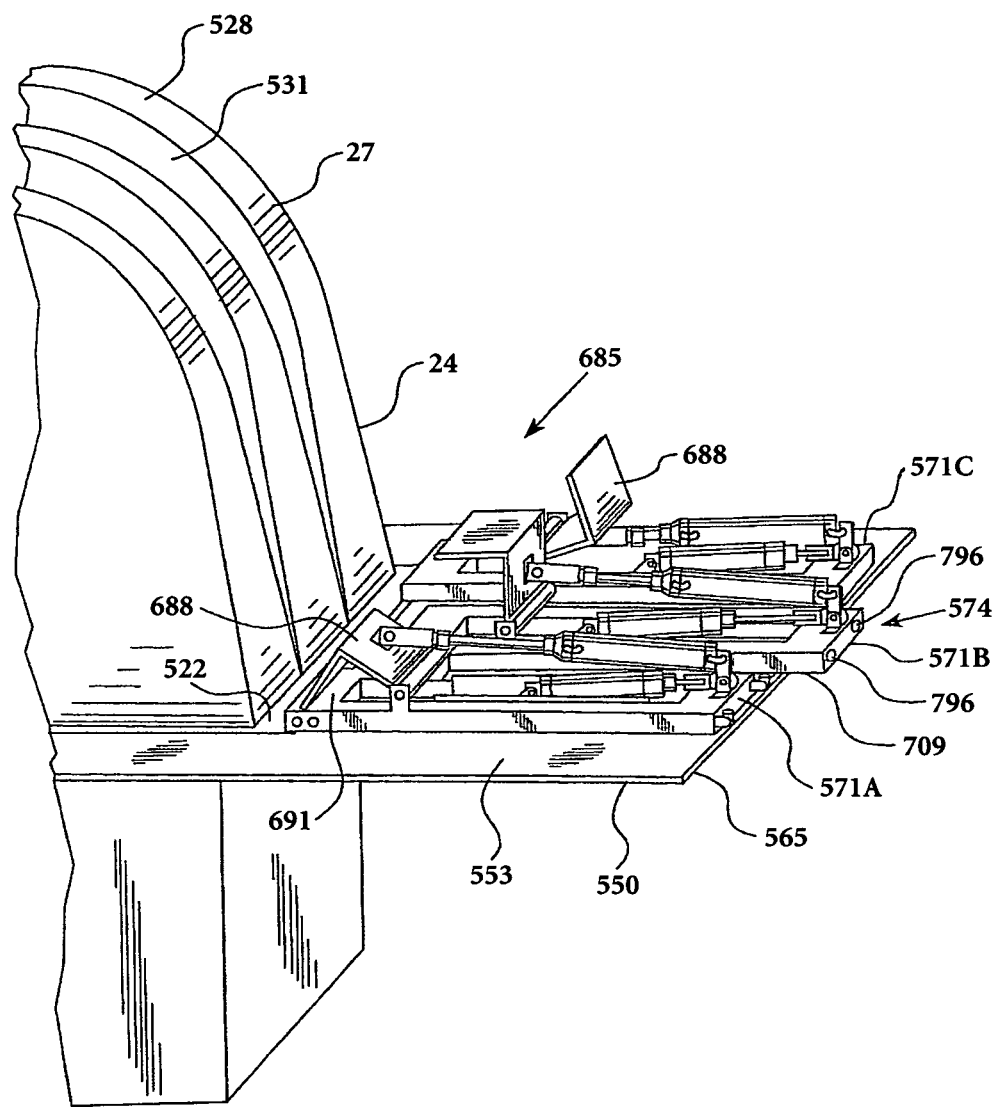
FIG. 21 is a representative partial cut-away perspective view of a first mold portion, frame and sheet retainer arrangement similar to that of FIG. 20, showing the clamp members of the sheet retainers in various stages between open and closed positions.

While the mold apparatus of the present invention includes at least one sheet retainer, it more typically includes at least two separate and independent sheet retainers (e.g., 2, 3, 4, 5, 6, 7, 8, 9, 10 or more separate and independent sheet retainers). The sheet retainers 571 may be positioned in any arrangement (e.g., symmetrically or asymmetrically) on frame 550 around opening 556, provided the clamp portion 685 of each sheet retainer faces or is oriented towards (in the direction of) perimeter edge 522 of first mold portion 24. In an embodiment, the mold apparatus includes eight sheet retainers 571A, 571B, 571C, 571D, 571E, 571F, 571G and 571H. See, for example, FIG. 20. First mold portion 24 has a generally rectangular plan view shape, and the sheet retainers are arranged symmetrically along the long sides and at the ends of the first mold portion, with: sheet retainers 571A, 571B and 571C positioned along first long side 697 of first mold portion 24; sheet retainers 571D, 571E and 571F positioned along second long side 700 of first mold portion 24; sheet retainer 571G positioned at first end 703; and sheet retainer 571H positioned at second end 706 (FIG. 20). The sheet retainers along first long side 697 (571A, 571B and 571C) are located in substantially opposing symmetrical relation relative to the sheet retainers along second long side 700 (571D, 571E and 571F). The sheet retainer 571G at first end 703 is located in substantially opposing symmetrical relation relative to the sheet retainer 571H at opposite second end 706.

Sheet retainer 571 may further include a base plate 709 having an upper surface 712, a lower surface 715 and a forward portion 718. See, in particular, FIG. 23. Clamp member 688 is hingedly attached to an upper surface 712 of forward portion 718 of base plate 709. More particularly, clamp member 688 is attached to upper surface 712 by means of a hinge member 724 that engages hingedly (or rotationally) with hinge retainers 727 and 730, which are opposingly positioned on (relative to each other) and extend upwardly from upper surface 721 of forward portion 718. Clamp portion 685 of sheet retainer 571 is defined by clamp member 688 and forward portion 718 of base plate 709. The upper surface 721 of forward portion 718 of base plate 709 and inner surface 694 of clamp member 688 together define clamp interior 691.

Figure 24:
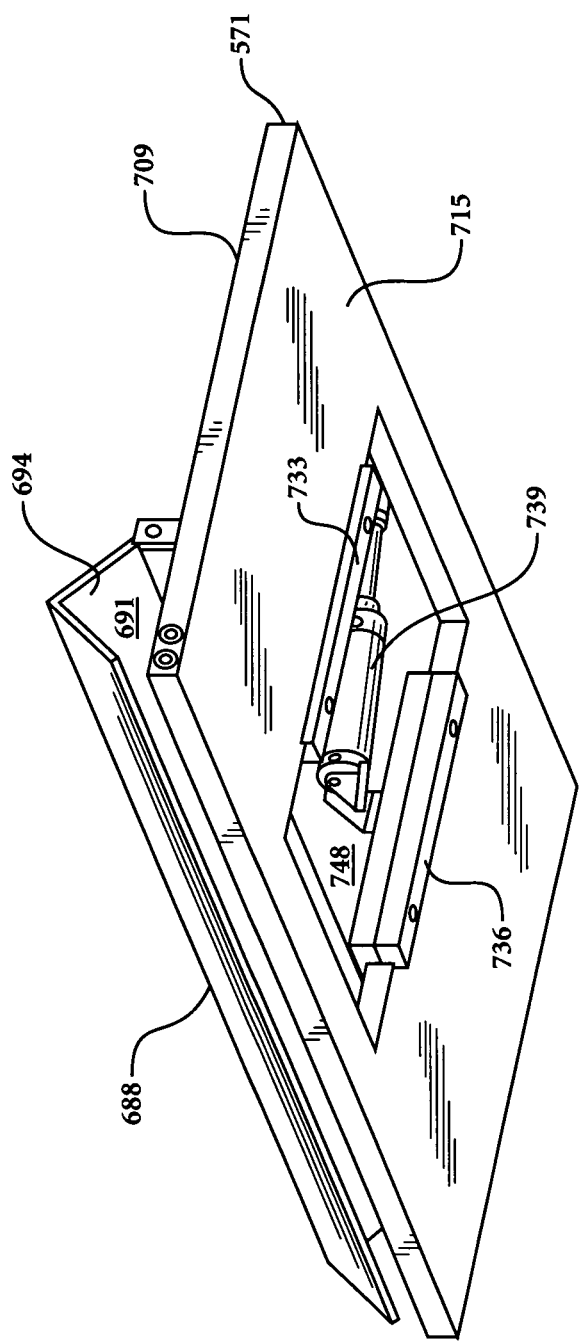
FIG. 24 is a representative perspective view towards the forward portion of the sheet retainer of FIG. 22 showing the underside of the sheet retainer.

At least a portion of lower surface 715 of base plate 709 is in sliding and abutting relationship with upper surface 553 of frame 550. In an embodiment, sheet retainer 571 further includes at least one elongated guide extending from lower surface 715 of base plate 709, which is received within a suitably dimensioned groove or slot (not shown) within upper surface 553 of frame 550. The elongated guides are oriented laterally outward from (e.g., orthogonal to) perimeter edge 522 of first mold portion 24, and provide improved control (e.g., orientation) over the reversible lateral movement of the sheet retainers with the apparatus and in the method of the present invention. With reference to FIG. 24, sheet retainer 571 has a first elongated guide 733 and a second elongated guide 736 extending outward (downward) from lower surface 715 of base plate 709, which are slidingly received within suitably dimensioned grooves or slots (not shown) within upper surface 553 of frame 550. Sliding receipt of the elongated guides (733, 736) within the grooves in upper surface 553 of frame 550, serves to maintain sheet retainer 571 in a desired orientation (e.g., clamp portion 685 facing towards perimeter edge 522 of first mold portion 24) as it is reversibly laterally repositioned in the method of the present invention.

Reversible lateral movement of each sheet retainer may be achieved manually, or more typically mechanically. Sheet retainer 571 further includes, in an embodiment and with reference to FIGS. 22 and 23, a first linear actuator 739 having a first end 742 and a second end 745. As used herein, the term "linear actuator" means a device that is reversibly linearly expandable. Linear actuators, as used with regard to the sheet retainer, may be selected from art-recognized devices, such as linear screw actuators, hydraulic linear actuators, pneumatic linear actuators and combinations thereof. Base plate 709 of sheet retainer 571 further includes a slot (or elongated hole/aperture) 748, and a rear portion 574 having an upper surface 751.

First end 742 of first linear actuator 739 is located within slot 748 and is fixedly attached to upper surface 553 of frame 550. First end 742 of first linear actuator 739 is typically pivotally attached to a bracket 754 that is attached to upper surface 553 of frame 550. Pivotal attachment between first end 742 and bracket 754 may be achieved by art-recognized means, such as a pin extending laterally through bracket 754 and a hole in first end 742. Second end 745 of first linear actuator 739 is fixedly attached to upper surface 751 of rear portion 574 of base plate 709. More typically, second end 745 of first linear actuator 739 is pivotally attached to a bracket 757 which extends upward from upper surface 751 of rear portion 574 of base plate 709. Pivotal attachment between second end 745 and bracket 757 may be achieved by art-recognized means, such as a pin 760 extending laterally through bracket 757 and a hole in second end 745.

First linear actuator 739, as depicted in the drawings, includes a cylinder 763 containing a piston (not visible) and a reversibly retractable arm 766 that is threadingly connected to second end 745. Reversible linear expansion of first linear actuator 739 provides reversible lateral movement of sheet retainer 571 relative to perimeter edge 522 of first mold portion 24. More particularly, as retractable arm 766 is extended, sheet retainer 571 is laterally (e.g., along the x-axis in the case of sheet retainer 571A, or along the y-axis in the case of sheet retainer 571G) moved away from perimeter edge 522 of first mold portion 24. Correspondingly, as retractable arm 766 is retracted within cylinder 763, sheet retainer 571 is laterally (e.g., along the x-axis in the case of sheet retainer 571A, or along the y-axis in the case of sheet retainer 571G) moved towards perimeter edge 522 of first mold portion 24. See, for example, FIG. 20.

Clamp member 688 of sheet retainer 571 may be manually or, more typically, mechanically reversibly closed/opened. Sheet retainer 571 further includes, in an embodiment and with further reference to FIGS. 22 and 23, a second linear actuator 769 having a first end 772 and a second end 775. As with the first linear actuator 739, second linear actuator 769 is reversibly linearly expandable, and may be selected from known linear actuators, such as linear screw actuators, hydraulic linear actuators, pneumatic linear actuators and combinations thereof.

First end 772 of second linear actuator 769 is pivotally attached to the exterior surface 778 of clamp member 688. More typically, first end 772 of second linear actuator 769 is pivotally attached to a bracket or extension 781 that extends outwardly from exterior surface 778 of clamp member 688. As depicted in the drawings, first end 772 of second linear actuator 769 is in the form of a bracket, into which extension 781 is received, and pivotal attachment there-between may be achieved by art-recognized methods, such as a pin attached to first end 772 and extending through a hole in extension 781 (not visible in the drawing figures). Second end 775 of second linear actuator 769 is attached to upper surface 751 of rear portion 574 of base plate 709. Typically, second end 775 is pivotally attached to a bracket (e.g., bracket 757) that extends upwardly from upper surface 751 of rear portion 574 of base plate 709. Pivotal attachment between second end 775 and bracket 757 may be achieved by art-recognized methods, such as a pin extending through bracket 757 and second end 775.

In an embodiment, second end 745 of first linear actuator 739 and second end 775 of second linear actuator 769 are both attached to the same bracket (e.g., bracket 757). In this particular embodiment, and as depicted in the drawings, second end 775 of second linear actuator is pivotally attached to an upper portion of bracket 757, and second end 745 of first linear actuator 739 is attached to a lower portion of bracket 757, beneath the attachment point of second end 775.

Second linear actuator 769, as depicted in the drawings, includes a cylinder 784 containing a piston (not visible) and a reversibly retractable/extendable arm 787 that is threadingly connected to first end 772. Reversible linear expansion of second linear actuator 769 provides reversible closing (and correspondingly, opening) of clamp member 688. In particular, as reversibly retractable arm 787 is extended, clamp member 688 is moved to or towards a closed position, and correspondingly as reversibly retractable arm 787 is retracted (within cylinder 784) clamp member 688 is moved to or towards an open position.

Figure 23:
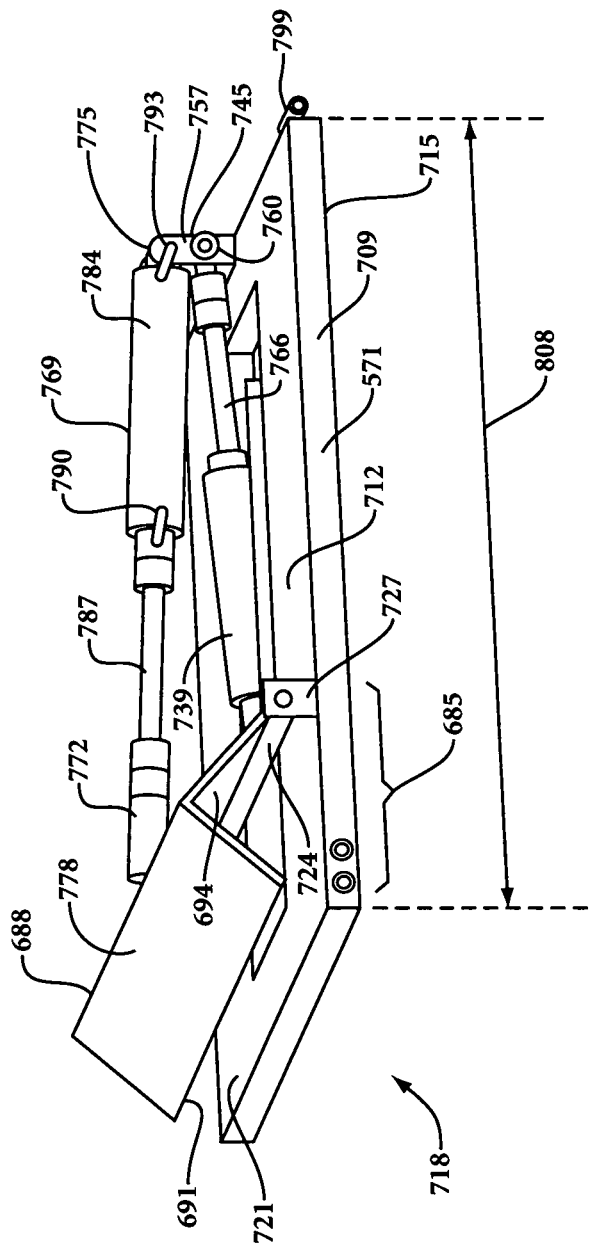
FIG. 23 is a representative perspective view towards the forward portion of the sheet retainer of FIG. 22.

In the case of hydraulic and/or pneumatically driven linear actuators, the linear actuators of the sheet retainer may be fitted with ports through which a fluid (e.g., air and/or a liquid, such as hydraulic fluid/oil) are introduced (typically, under elevated pressure) for purposes of linearly expanding and retracting the linear actuator. With reference to FIG. 23, and for purposes of illustration, second linear actuator 769 includes a first port 790 and a second port 793 through which a fluid (e.g., air and/or a liquid, such as oil) may be introduced, under elevated pressure, for purposes of linearly extending and retracting arm 787, and thereby reversibly closing and opening clamp member 688. First linear actuator 739 may be similarly fitted with such ports (not shown).

In an embodiment, and as discussed previously herein, frame 550 may reside on and be supported by an underlying frame support 559. Outer edge 565 of frame 550 is dimensioned so as to be inward relative to outer edge 568 of frame support 559. The inward positioning of outer edge 565 of frame 550 relative to outer edge 565 of frame support 559 may be selected such that reversible lateral movement of the sheet retainers results in rear portion 574 of each sheet retainer 571 moving laterally over, above and separated from upper surface 562 of support frame 559. See, for example, FIGS. 13, 20 and 21. More particularly, in this embodiment, that portion of lower surface 715 residing in (or under) rear portion 574 of base plate 709 is moved laterally over, above and separated from upper surface 562 of support frame 559. Such an arrangement may be desirable for reasons including, but not limited to, allowing lubricant to be applied to lower surface 715 of base plate 709, including for example elongated guides 733 and 736, while the sheet retainers 571 are in use (e.g., during the method of the present invention).

In the course of the sheet molding embodiment of the present invention, a portion of a heated thermoplastic sheet (e.g., extruded thermoformable sheet) is contacted with the clamp interior 691 of the clamp portion 685 of the sheet retainer 571, as will be discussed further herein. Typically, a portion of the heated thermoplastic sheet is contacted with upper surface 721 of forward portion 718 before and after clamp member 688 is clamped down and the heated sheet thus being retained within clamp interior 691. To prevent or minimize fouling of the clamp portion 685 of the sheet retainer 571 (e.g., by molten or nearly molten thermoplastic material being retained thereon), it may be desirable to provide temperature control (e.g., cooling) to at least the forward portion 718 of sheet retainer 571. In an embodiment, base plate 709 of sheet retainer 571 is provided with at least one enclosed passage 796 which extends into forward portion 718 of base plate 709. See, for example, sheet retainer 571B of FIG. 21, in which the terminal points of enclosed passage 796 are depicted in rear portion 574 of base plate 709. The enclosed channel may extend through base plate 709, or it may be in the form of a conduit (not shown) attached to the exterior surface (e.g., upper surface 712) of base plate 709.

Enclosed passage 796 is dimensioned for the receipt and passage of a heat exchange fluid therethrough. The heat exchange fluid may be selected from those known to the skilled artisan, such as water, glycols (e.g., alkylene glycols, such as ethylene glycol, propylene glycol and/or poly-alkylene glycols), alcohols (e.g., methanol, ethanol, n-propanol and/or iso-propanol), and mixtures thereof. For example, and with reference to FIG. 22, a heat exchange fluid may be drawn from the reservoir of a heat exchanger (not shown), introduced through port 799 and removed through port 802 (and returned to the reservoir of the heat exchanger). The heat exchange fluid is typically introduced into enclosed passage 796 at a reduced temperature (e.g., a temperature less than that of the heated thermoplastic sheet, such as less than or equal to room temperature, 20° C., 15° C. or 10° C.). The heat exchange fluid passes through enclosed passage 796 into forward portion 718 (not depicted in the drawings) and serves to remove heat energy therefrom, as the heat exchange fluid is removed from port 802.

The sheet retainers, and the various components thereof, such as the base plate and clamp member, may be fabricated from any suitable rigid material. For example, each sheet retainer may be fabricated from metals, thermoset plastic materials, thermoplastic materials, ceramic materials and combinations thereof. Typically the sheet retainers are fabricated from metals (e.g., steel).

Figure 22:
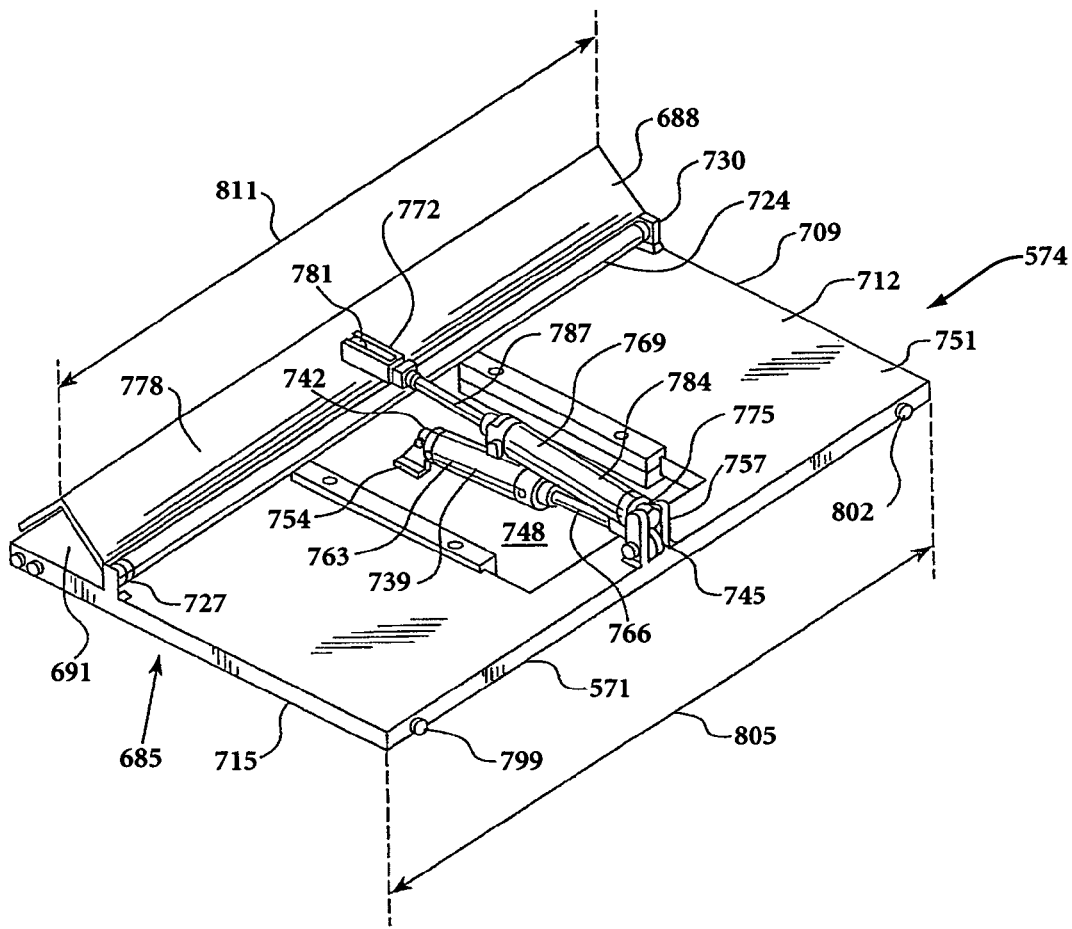
FIG. 22 is a representative perspective view towards the rear portion of a sheet retainer that may be used with the sheet molding embodiment of the present invention.

The sheet retainers may have any suitable dimension, provided they are able to retain a portion of the heated thermoplastic sheet within the clamp portion thereof. With reference to FIGS. 22 and 23, base plate 709 typically has a width 805 of from 7.62 cm to 127 cm, more typically from 15.24 cm to 101.6 cm, and further typically from 30.48 cm to 60.96 cm. In an embodiment, base plate 709 has a width 805 of 50.75 cm. Base plate 709 typically has a length 808 of from 7.62 cm to 127 cm, more typically from 15.24 cm to 101.6 cm, and further typically from 30.48 cm to 60.96 cm. In an embodiment, base plate 709 has a length 808 of 45.72 cm. Clamp member 688 typically has a width 811 of from 7.62 cm to 127 cm, more typically from 15.24 cm to 101.6 cm, and further typically from 30.48 cm to 60.96 cm. In an embodiment, clamp member 688 has a width 811 of 50.75 cm, which is substantially equivalent to the width 805 of base plate 709. Alternatively, the rear portion 574 and the forward portion 718 of base plate 709 may have different widths 805. For example, width 805 of rear portion 574 may be greater than (or less than) width 805 of forward portion 718.

Typically, first mold portion 24, frame 550 and the sheet retainers 571 are together positioned in a plane beneath sheet die 113, e.g., the plane defined by the x- and y-axes shown in FIG. 13. For purposes of reference, perimeter edge 522 lies substantially within the plane defined by the x- and y-axes of FIG. 13. As the heated thermoplastic sheet 153 is formed and drops vertically and gravitationally from sheet die 113 along the z-axis, first mold portion 24, frame 550 and each sheet retainer 571 are together reversibly positionable in the plane beneath sheet die 113, by means of carriage 15 being reversibly positionable along guide track 39, as indicated by two headed arrow 814 of FIG. 13. In addition to movement of carriage 15 along guide track 39, sheet die 113 may optionally be reversibly moveable within a plane above the plane in which first mold portion 24, frame 550 and each sheet retainer 571 resides. Sheet die 113 may be reversibly moveable by known means, such as on tracks or rails (not shown). Typically, sheet die 113 is held substantially stationary while carriage 15 moves there-beneath.

With the sheet molding embodiment of the method of the present invention, initially first mold portion 24 and frame 550 (along with sheet retainers 571) are positioned relative to each other such that upper surface 553 of frame 550 is located above perimeter edge 522 of the first mold portion. See, for example, FIGS. 13 and 14. When the first mold portion is a first male mold portion (as depicted in the drawings), the initial position of the upper surface of the frame may be, in addition to being above the perimeter edge: (i) above the upper terminus of the interior mold surface of the first male mold portion; or (ii) above the perimeter edge and below the upper terminus of the interior mold surface of the first male mold portion. As depicted in the drawing figures, the upper surface 553 of frame 550 is initially positioned above perimeter edge 522 and above the upper terminus of interior mold surface 27. In the case of a female first mold portion (that is substantially recessed below the perimeter edge), the initial position of the frame is such that the upper surface thereof is above the perimeter edge and interior mold surface of the first female mold portion.

The relative positioning of frame 550 and first mold portion 24 may be achieved in accordance with the description provide previously herein. For example, the first and second screw actuator assemblies (577, 580) may be activated (e.g., by motor 670, and the various shafts and transfer gear boxes) so as to move frame support 559 and frame 550 (and, correspondingly, sheet retainers 571) vertically upward along the z-axis, such that upper surface 553 of frame 550 resides above perimeter edge 522, and as depicted in the drawings, the upper terminus of interior surface 27 of first mold portion 24.

With reference to FIG. 5, in an embodiment, carriage controller 45 provides operational frame vertical positioning instructions to motor 670 through physical/electrical coupling 817, which results in activation of the first and second screw actuator assemblies (577, 580) and corresponding controlled vertical movement (up or down) of frame support 559, frame 550 and the sheet retainers 571 thereon. Typically, carriage controller 45 includes at least one polymer introduction station carriage control program that is activated or initiated when primary controller 12 wirelessly communicates one or more polymer introduction related directives to carriage controller 45 (e.g., relating to forward velocity control of carriage 15, vertical positioning of frame 550 and/or control of sheet retainers 571). Primary controller 12 wirelessly communicates the one or more polymer introduction related directives to carriage controller 45, when carriage 15 is positioned at polymer introduction station 18. The location of carriage 15 at polymer introduction station 18 being determined by carriage location indicator 62, which is transmitted to carriage controller 45 via physical coupling 65, and then wirelessly communicated to primary controller 12 via wireless communication nodes 86 and 83 (FIG. 5).

The clamp member 688 of each sheet retainer 571 is adjusted to an open position, in the sheet molding embodiment of the present invention. Each clamp member 688 is positioned in an open position so as to provide access to each clamp interior 691, in particular from above each sheet retainer 571. See, for example, clamp member 688 of sheet retainer 571C of FIG. 21, and the clamp members 688 of each sheet retainer 571A-571C visible in FIG. 15, all of which are in an open position. In an embodiment, arm 787 of second linear actuator 769 is retracted (e.g., within cylinder 784), which serves to draw clamp member 688 rotationally backwards on hinge member 724, thus positioning clamp member 688 in an open position.

In an embodiment, carriage controller 45 provides operational sheet retainer control instructions to one or more of sheet retainers 571 through physical/electrical coupling 820 (FIG. 5). The operational sheet retainer control instructions may be further divided into or described as: (i) operational clamp member opening/closing instructions; and (ii) operational sheet retainer lateral positioning instructions. The operational clamp member 688 opening/closing instructions result in corresponding actuation of second linear actuator 769, and the operational sheet retainer 571 lateral positioning instructions result in corresponding actuation of first linear actuator 739. Since the first and second linear actuators are typically hydraulically or pneumatically operated (as discussed previously herein), the operational sheet retainer control instructions may be more particularly provided from carriage controller 45 to one or more hydraulic/pneumatic pumps (not shown), which may further included gate controlled manifolds (not shown), that are in fluid communication with the first and second linear actuators (739, 769).

A heated thermoplastic sheet (e.g., 153) having a first surface (e.g., 513) and a second surface (e.g., 516) is formed from at least one thermoplastic composition, in the sheet molding embodiment of the present invention. The heated thermoplastic sheet has a temperature that allows it to be thermoformable (e.g., a thermoformable temperature), in particular, when: (i) contacted with and retained within the clamp interior of each sheet retainer; and (ii) contacted and drawn into intimate contoured contact with the interior mold surface of the first mold portion. While the temperature of the heated thermoplastic sheet may be equal to or greater than the melting point of the thermoplastic sheet, the temperature of the heated thermoplastic sheet is more typically equal to or greater than the softening point (or glass transition temperature) of the thermoplastic sheet, and less than the melting point of the thermoplastic sheet.

In an embodiment, the heated thermoplastic sheet has an interior portion that is interposed between the first and second surfaces of the heated thermoplastic sheet. The temperature of the heated thermoplastic sheet, in this embodiment, is substantially uniform (e.g., varying by less than or equal to 2° C. or 1° C.) through the first surface, the interior portion and the second surface thereof. In particular, the temperature is uniform when: (i) the first portion of the second surface of the heated thermoplastic sheet is contacted with the clamp interior of at least one sheet retainer, and (ii) the second portion of the second surface of said heated thermoplastic sheet is drawn against the interior mold surface of the first mold portion.

The temperature of the heated thermoplastic sheet may be determined by art-recognized methods, such as contacting thermocouples with the first and second surfaces of the heated thermoplastic sheet, and inserting a thermocouple into the interior portion of the heated thermoplastic sheet. Alternatively, or in addition thereto, remote temperature sensors, such as an infrared sensor, may be used to determine the temperature of the first and second surfaces of the heated thermoplastic sheet.

As used herein and in the claims, the term "sheet(s)" and similar terms, such as "sheet die(s)," "heated thermoplastic sheet(s)" and "extruded sheet(s)" are inclusive of the term "film(s)," and similar terms, such as "film die(s)," "heated thermoplastic film(s)" and "extruded films." Upon emerging from the sheet die, and more particularly the slot of the sheet die, the heated thermoplastic sheet (equivalently, the extruded sheet) typically has a thickness of from 0.5 mm to 25 mm, more typically from 1.5 mm to 15 mm, and further typically from 6 mm to 12 mm. In an embodiment of the present invention, upon emerging from the sheet die, the heated thermoplastic sheet has a thickness of 9 mm. During the process of extending the heated thermoplastic sheet over and bringing it into contour matching contact with the interior mold surface of the first mold portion, the thickness of the heated thermoplastic sheet is typically reduced (relative to the heated thermoplastic sheet upon emerging from the sheet die slot). The shaped thermoplastic sheet of the molded article prepared by the method of the present invention, typically has a thickness of from 0.25 mm to 12.5 mm, more typically from 0.75 mm to 8 mm, and further typically from 3 mm to 6 mm. In an embodiment of the present invention, the shaped thermoplastic sheet of the molded article prepared by the method of the present invention has an average thickness of 4.5 mm.

The heated thermoplastic sheet formed in the course of the sheet molding embodiment of the present invention may have any suitable width and length. Since the heated thermoplastic sheet is typically formed by means of a sheet die, the width thereof typically depends on and is limited by the width of the sheet die, and more particularly the width of the elongated sheet slot of the sheet die. The heated thermoplastic sheet may have a width of, for example, from 2.5 cm to 5 m, or from 31 cm to 3 m, or from 61 cm to 2 m. The heated thermoplastic sheet may have any suitable length, since it is typically formed continuously in the method of the present invention. For example, the heated thermoplastic sheet may have a length of from 31 cm to 10 m, or from 61 cm to 2 m. In a particular embodiment of the present invention, the heated thermoplastic sheet has a width of 3 m (about 10 feet), and a length of 5 m (about 16.5 feet).

The heated thermoplastic sheet 153 emerges from sheet die 113 such that the second surface 516 thereof faces (e.g., is in facing opposition to) the clamp interiors 691 of the sheet retainers 571 and interior mold surface 27 of first mold portion 24. The first surface 513 of heated thermoplastic sheet 153 faces away from (e.g., upward away from) the clamp interiors 691 of the sheet retainers 571 and interior mold surface 27.

Figure 25:
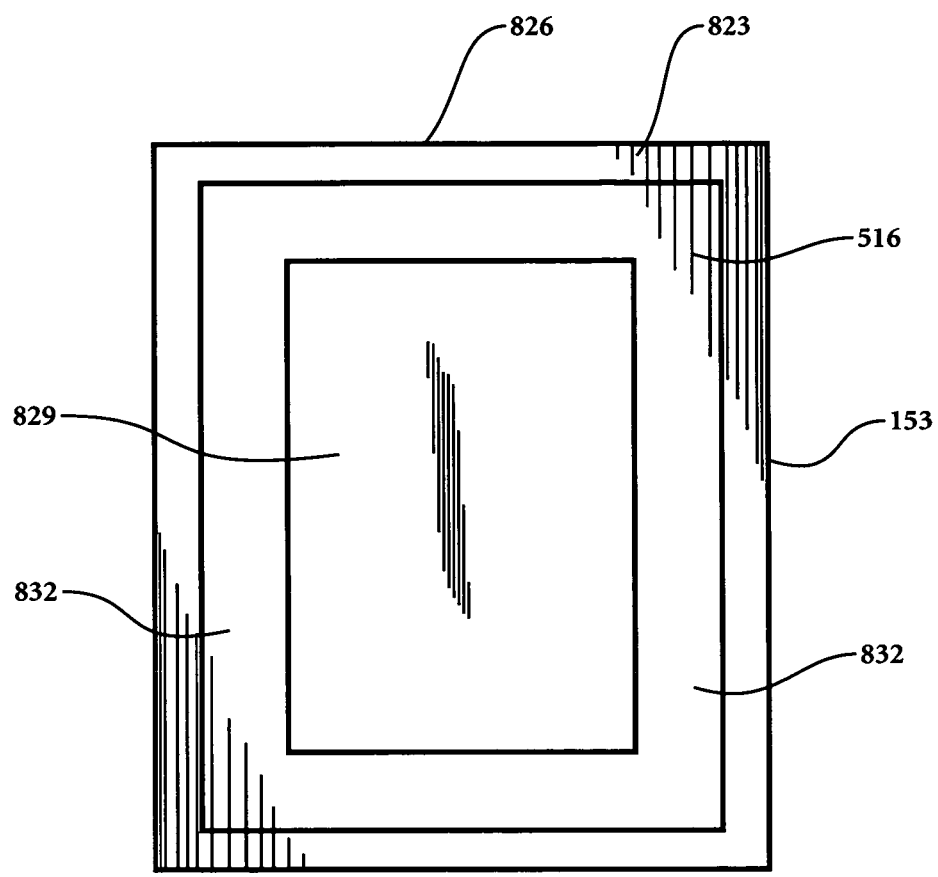
FIG. 25 is a representative plan view of the second surface of a heated thermoplastic sheet that is formed and used in the sheet molding embodiment of the present invention.

The second surface 516 of the heated thermoplastic sheet 153, and the heated thermoplastic sheet 153 itself, may be described with regard to the present invention as having a first portion, a second portion, and a third portion. For purposes of illustration, and with reference to FIG. 25, first portion 823 of second surface 516 of heated thermoplastic sheet 153 is located generally near or towards the terminal edges 826 of sheet 153. Second portion 829 of second surface 516 is located generally in a central area of heated thermoplastic sheet 153. Third portion 832 of second surface 516 is located generally in an area between (e.g., interposed between) first portion 823 and second portion 829 of heated thermoplastic sheet 153. The first surface 513 also may be similarly described as having first 823, second 829 and third 832 portions that are on the opposite side (i.e., on first surface 513) relative to second surface 516 of heated thermoplastic sheet 153. In addition, the heated thermoplastic sheet 153 may be described more generally as having first 823, second 829 and third 832 portions corresponding to those portions as depicted in FIG. 25.

A first portion (e.g., 823) of the second surface 516 of the heated thermoplastic sheet is contacted with the clamp interior 691 of the clamp portion 685 of at least one sheet retainer 571, in the method of the present invention. Typically, as the heated thermoplastic sheet 153 is formed, it is sequentially contacted with the clamp interiors 691 of successively arranged sheet retainers 571. For example, as the heated thermoplastic sheet 153 emerges and extends downward from sheet die 113, frame 550, sheet retainers 571 and first mold portion 24 are moved laterally (e.g., along the y-axis, FIG. 13) in a plane beneath sheet die 113 (as described previously herein), e.g., in the direction of arrow 835 of FIG. 15. With reference to FIGS. 13 and 15, as heated thermoplastic sheet 153 is formed and frame 550 and first mold portion 24 are moved laterally there-under, the first portion 823 of second surface 516 of heated thermoplastic sheet 153 is brought successively into contact with the clamp interior of sheet retainers 571 in the following sequential order: sheet retainer 571G; sheet retainers 571C and 571F; then sheet retainers 571B and 571E; sheet retainers 571A and 571D; and finally sheet retainer 571H.

In the method of the present invention, the clamp member 688 is next moved to a closed position so as to clamp and retain the first portion of the heated thermoplastic sheet received within the clamp interior 691. More particularly, a portion of clamp member 688 is brought into abutting and clamping/retaining relationship with first portion 823 of first surface 513 of heated thermoplastic sheet 153, while at the same time first portion 823 of second surface 516 of sheet 153 is retainingly abutted against upper surface 721 of forward portion 718 of base plate 709 of sheet retainer 571. Typically, the first portion 823 of the heated thermoplastic sheet 153 is clamped/retained between at least a portion of interior surface 694 of clamp member 688 and upper surface 721 of forward portion 718 of base plate 709 of the sheet retainer.

The clamp members of the sheet retainers may all be moved in unison to the closed position after the heated thermoplastic sheet has been contacted with the clamp interior of all the sheet retainers. For example, the clamp members 688 of sheet retainers 571A-571H may be moved to a closed position in unison. Alternatively, the clamp members of the sheet retainers may be sequentially moved to the closed position as the first portion of the second surface of the heated thermoplastic sheet is brought into successive contact with the clamp interiors of the sheet retainers. For example, the clamp members 688 of each sheet retainer 571 being moved to a closed position in the following sequential order: sheet retainer 571G; sheet retainers 571C and 571F; then sheet retainers 571B and 571E; sheet retainers 571A and 571D; and finally sheet retainer 571H.

Figure 16:
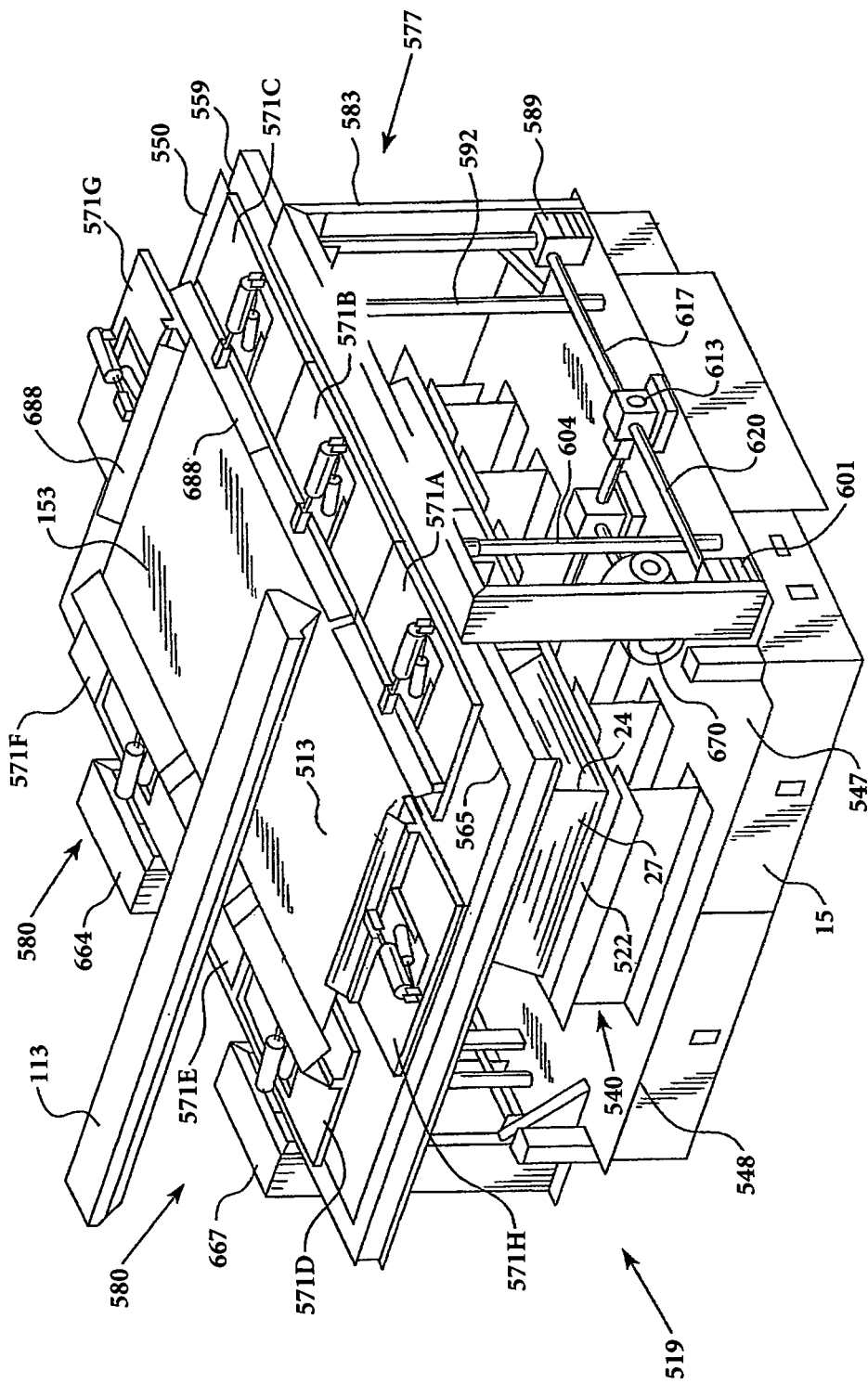
FIG. 16 is a representative perspective view of the sheet molding apparatus of FIG. 15, in which the heated thermoplastic sheet has been separated from the sheet die and is retained within the clamp portions of each sheet retainer.

In an embodiment, arm 787 of second linear actuator 769 is extended (e.g., out of cylinder 784), which serves to move clamp member 688 rotationally forward on hinge member 724, thus positioning clamp member 688 in a closed position. See for example, clamp member 688 of sheet retainer 571A of FIG. 21, which is in a closed position. With reference to FIG. 16, the clamp members 571 of all eight sheet retainers 571A-571H are in a closed position, with the first portion of the heated thermoplastic sheet 153 clamped and retained within the clamp interior 691 of each sheet retainer. In addition, in FIG. 16, the heated thermoplastic sheet 153 that is retained within the sheet retainers of frame 550, has been separated from sheet die 113. While not depicted in FIG. 16, a portion of heated thermoplastic sheet 153 may still be emerging from sheet die 113, but separated from the heated thermoplastic sheet 153 retained within the sheet retainers 571.

Figure 17:
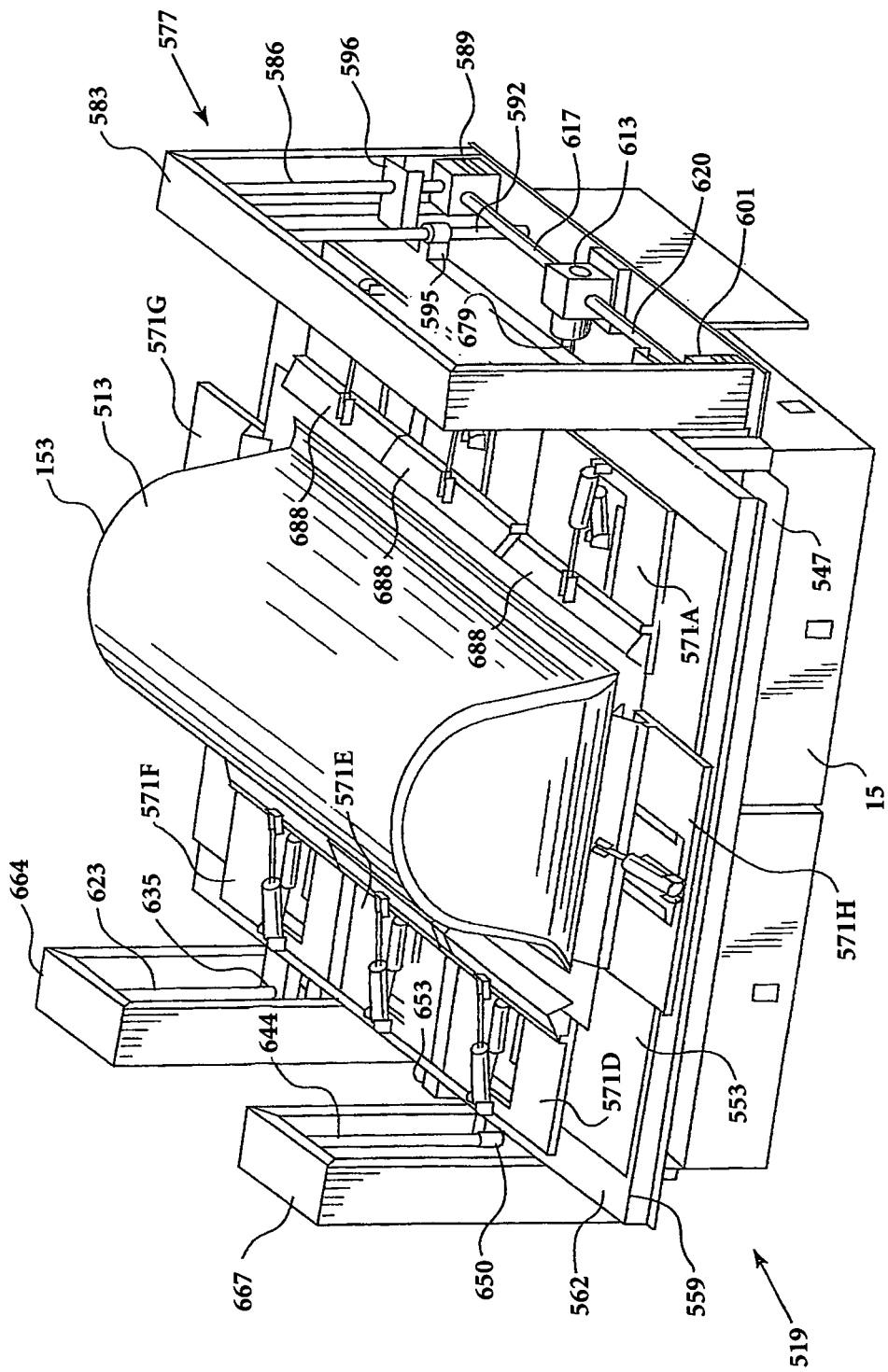
FIG. 17 is a representative perspective view of the sheet molding apparatus of FIG. 16, in which the frame has been moved vertically downward with the heated thermoplastic sheet retained within the clamp portions of each sheet retainer.
Figure 18:
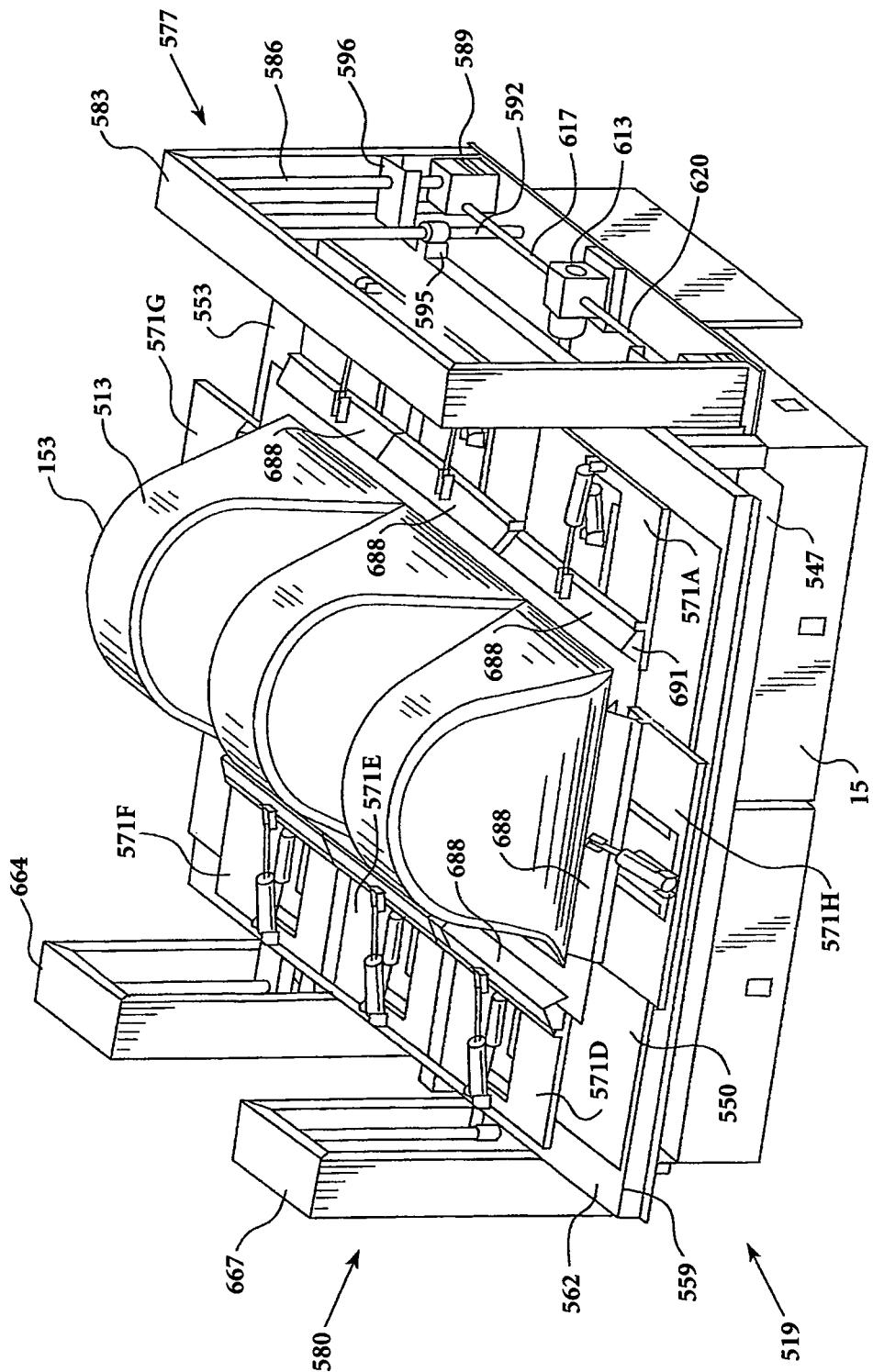
FIG. 18 is a representative perspective view of the sheet molding apparatus of FIG. 17 in which the heated thermoplastic sheet has been drawn by reduced pressure into contour matching contact with the interior surface of the first mold portion, while still being held within the clamp portions of the sheet retainers.

With the first portion of the heated thermoplastic sheet retained within the clamp interiors of the sheet retainers, first mold portion 24 and frame 550 are positioned relative to each other so as to contact a second portion of the second surface (e.g., 829, FIG. 25) of heated thermoplastic sheet 153 with at least a portion of the interior mold surface 27 of first mold portion 24. With reference to FIGS. 16 and 17, frame 550 (and correspondingly sheet retainers 571) is reversibly, controllably and vertically positioned (e.g., vertically downward along the z-axis) relative to the vertically stationary first mold portion 24, thereby resulting in contact of the second portion (e.g., 829) of the second surface (516) of the heated thermoplastic sheet 153 with at least a portion of the interior mold surface 27 of first mold portion 24. Frame 550 along with the sheet retainers 571 may be moved along the z-axis so as to be positioned below the perimeter edge 522 of first mold portion 24. Frame 550 may be reversibly and vertically positioned by means of the first and second screw actuator assembles (577, 580) in accordance with the description as provided previously herein, and in particular with carriage controller 45 providing operational frame vertical positioning instructions to motor 670 through physical/electrical coupling 817 (FIG. 5).

Depending on the initial position of frame 550 relative to interior mold surface 27, contact of the second portion of the second surface of the heated thermoplastic sheet with at least a portion of the interior mold surface of the first mold portion, may occur prior to, concurrently with or subsequently to contact (or clamping retention) of the first portion of the second surface of the heated thermoplastic sheet with/within the clamp interior 691 of the clamp portion 685 of the sheet retainers 571. For example, frame 550 may be initially positioned such that the upper surface 553 thereof is above perimeter edge 522 and below the upper terminus of interior mold surface 27 of the first mold portion 24 (in the case of a male first mold portion), in which case the second portion of the second surface of the heated thermoplastic sheet may contact a portion of the interior mold surface prior to or concurrently with contact and/or retention of the second portion of the heated sheet with/within the clamp interiors. In an embodiment of the present invention, contact of the second portion of the second surface of the heated thermoplastic sheet with at least a portion of the interior mold surface of the first mold portion, occurs after contact (or clamping retention) of the first portion of the second surface of the heated thermoplastic sheet with/within the clamp interior 691 of the clamp portion 685 of the sheet retainers 571.

Prior to, concurrently with or subsequent to contact of the second portion of the second surface of the heated thermoplastic sheet with at least a portion of the interior mold surface of the first mold portion, each sheet retainer (with a first portion of the heated sheet retained within the clamp interior thereof) is independently laterally moved to a lateral position selected from towards the perimeter edge 522 and/or away from the perimeter edge 522 of first mold portion 24. For example, as frame 550 is moved vertically downward (and the second surface of the heated thermoplastic sheet is brought into contact with at least a portion of the interior mold surface of the first mold portion) each sheet retainer 571 may be continually and/or intermittently laterally repositioned relative to (i.e., towards and/or away from) perimeter edge 522 of first mold portion 24. Alternatively, each sheet retainer 571 may be independently laterally repositioned relative to perimeter edge 522, prior to frame 550 being moved vertically downward, and the second surface of the heated thermoplastic sheet correspondingly being brought into contact with at least a portion of the interior mold surface of the first mold portion. Further alternatively, each sheet retainer 571 may be independently laterally repositioned relative to perimeter edge 522, after frame 550 has been moved vertically downward (e.g., at the bottom of its vertical stroke), and the second surface of the heated thermoplastic sheet correspondingly has been brought into contact with at least a portion of the interior mold surface of the first mold portion.

In a particular embodiment, the step of laterally moving at least one sheet retainer to a lateral position (relative to the perimeter edge of the mold), is performed at least one of prior to, substantially concurrently with and after the step of: positioning the first mold portion and the frame relative to each other so as to contact the second portion of the second surface of said heated thermoplastic sheet with at least a portion of the interior mold surface of the first mold portion. More particularly, the step of laterally moving at least one sheet retainer to its relative lateral position, is performed substantially concurrently with and/or after the step of relative positioning the first mold portion and the frame. Still further particularly, the step of laterally moving at least one sheet retainer to its relative lateral position, is performed substantially concurrently with the step of relative positioning the first mold portion and the frame.

Independent lateral repositioning of each sheet retainer may be achieved by means of extending or retracting reversibly retractable arm 766 of first linear actuator 739. For example, as arm 766 is extended out of cylinder 763, sheet retainer 571 is moved laterally along the x-axis away from perimeter edge 522 of first mold portion 24. Correspondingly, as arm 766 is retracted within cylinder 763, sheet retainer 571 is moved laterally along the x-axis towards or in the direction of perimeter edge 522 of first mold portion 24. Carriage controller 45 provides operational sheet retainer lateral positioning instructions to each sheet retainer 571 (or a hydraulic/pneumatic device in fluid communication with each first linear actuator 739) by means of physical/electrical coupling 820 (FIG. 5).

Lateral movement of the sheet retainer(s) (with the first portion of the heated sheet retained/clamped within the clamp interiors thereof) serves to control the thickness of at least a portion of the second portion of the heated thermoplastic sheet that is contacted with the interior mold surface of the first mold portion. In addition, lateral movement of the sheet retainer(s) (with the first portion of the heated sheet retained/clamped within the clamp interiors thereof) also assists and enhances the intimate contour matching contact of the second portion of the second surface of the heated thermoplastic sheet with the interior mold surface of the first mold portion.

Based on the evidence at hand, and without intending to be bound by any theory, it is believed that as a sheet retainer is moved laterally towards the perimeter edge of the first mold portion, a greater amount of heated sheet material is made available as the heated sheet is brought into contact with the interior mold surface (whether the mold is a male or female mold). A greater amount of heated thermoplastic material being present over that portion of the mold where the sheet retainer is moved towards the mold, results in increased sheet thickness in that area (and accordingly a molded article having increased thickness in that area). Correspondingly, as a sheet retainer is moved laterally away from the perimeter edge of the first mold portion, a lesser amount of heated sheet material is made available as the heated sheet is brought into contact with the interior mold surface (whether the mold is a male or female mold). A lesser amount of heated thermoplastic material being present over that portion of the mold where a sheet retainer is move away from the mold, results in decreased sheet thickness in that area (and accordingly a molded article having decreased thickness in that area).

In the case of a plurality of laterally repositionable sheet retainers (e.g., 571 A-H) being located around the perimeter edge of the mold, the thickness of the heated sheet may be varied in/over different areas of the mold, as the result of, for example, some sheet retainers being moved towards the perimeter edge, while others are moved away from the perimeter edge of the mold.

In the case of a first mold portion having a complex interior mold surface, for example, having portions that may be characterized as male, and other portions that may be characterized as female, some sheet retainers may be moved laterally towards the perimeter edge, while other sheet retainers are moved laterally away from the perimeter edge. For example, those sheet retainers that are adjacent to male interior mold surface portions, may be moved laterally away from the perimeter edge; while those sheet retainers that are adjacent to female interior mold surface portions, may be moved laterally towards the perimeter edge; or visa versa. Alternatively, or in addition thereto, the lateral position of one or more sheet retainers may be adjusted (e.g., serial adjustments and/or continual adjustments) as the second surface of the heated thermoplastic sheet is brought into contact with the interior surface of the mold, such positions being selected from towards the mold perimeter edge, away from the mold perimeter edge, and any combination, order or additional combinations thereof (e.g., towards, away and towards, or away, towards and away).

In an embodiment, each sheet retainer may be moved through a lateral distance (e.g., towards or away from the mold perimeter edge) that is typically from 2.54 cm to 91.44 cm, more typically from 5.08 cm to 60.96 cm, and further typically from 7.62 cm to 30.48 cm. In an embodiment, each sheet retainer may be moved through a lateral distance (e.g., towards or away from the mold perimeter edge) of approximately 19.05 cm.

With the sheet molding embodiment, the heated thermoplastic sheet may be longitudinally and/or transversely stretched by lateral movement of the sheet retainers away from the perimeter edge of the first mold portion, while the heated thermoplastic sheet is between its glass transition temperature and below its melting temperature, e.g., as represented by the following expression: $T_g < T_{(sheet)} < T_m$.

During the stretching operations (under conditions of $T_g < T_{(sheet)} < T_m$), the polymer molecules of the heated thermoplastic sheet, in the solid state, may become orientated in the stretching direction, thereby resulting in improved or increased physical properties (e.g., compressive strength) along the stretching direction. As such, the shaped thermoplastic sheet formed in accordance with the method of the present invention may exhibit uniaxial or biaxial orientation (relative to the polymer molecules). In addition, when the thermoplastic composition includes fibers, such as glass fibers, stretching of the heated thermoplastic sheet (e.g., under conditions of $T_g < T_{(sheet)} < T_m$), by lateral movement of the sheet retainers away from the mold perimeter edge, may also serve to orient the fibers uniaxilly or biaxially, thereby providing the shaped thermoplastic sheet with improved or increased physical properties along the stretching direction. Accordingly, the shaped thermoplastic sheet formed in accordance with the method of the present invention may alternatively or additionally exhibit uniaxial or biaxial fiber orientation.

As carriage 15 is moved beneath sheet die 113, the heated thermoplastic sheet 153 is in effect draped across first mold portion 24 and the sheet retainers 571. See, for example, FIGS. 13 through 16. With reference to FIG. 15, (i) the linear speed or velocity at which carriage 15 is moved beneath sheet die 113, (ii) the rate at which heated thermoplastic sheet 153 is produced from sheet die 113, and (iii) the thickness of the extruded sheet 153 (via gates 504) as it emerges from sheet die 113, may together be controlled so as to control the thickness of the heated thermoplastic sheet 153 as it is draped across the mold and clamp interiors of the sheet retainers.

In FIGS. 15 and 16, for purposes of clarity, heated thermoplastic sheet 153 is depicted as being rigid. Since heated thermoplastic sheet 153 has a temperature that is at least greater than its softening point, in practice, heated thermoplastic sheet 153 more typically drapes across the clamp interiors 691 of the sheet retainers 571 and optionally a portion of interior mold surface 27 (rather than rigidly residing thereon/therein and/or there-over).

Carriage controller 45 typically includes a computer program adapted, relative to a particular first mold portion 24, so as to provide operational instructions and control of, during the polymer introduction step: movement (e.g., forward velocity) of carriage 15 along guide path/track 39; vertical positioning of frame 550 (and correspondingly sheet retainers 571); opening and closing of each clamp member 688; lateral positioning of each sheet retainer 571; reduced pressure drawn through perforations 525 by pressure reduction apparatus 480; and temperature of mold 24 by means of mold temperature control apparatus 375. Sheet molding apparatus 519 may receive interchangeable first mold portions 24 having different configurations, in which case carriage controller 45 includes or is programmed to include a different computer program adapted to provide operational instructions (e.g., as summarized above) for each interchangeable mold.

With at least a portion of the second portion of the second surface of the heated thermoplastic sheet in contact with at least a portion of the interior mold surface of the first mold portion, reduced pressure is drawn (e.g., by means of first vacuum apparatus 480 and conduit 483) through the plurality of perforations (e.g., 525) of the interior mold surface. The second portion of the second surface of the heated thermoplastic sheet is drawn (as a result of the reduced pressure) into intimate contact with and matches the contour of the interior mold surface. See, for example, FIG. 18.

The interior mold surface of the first mold portion may optionally be heated so as to assist matching of the second portion of the second surface of the heated thermoplastic sheet with the contoured interior mold surface. As a result of, however, the residual heat retained within the heated thermoplastic sheet (due to its use upon formation, e.g., upon exiting the sheet die), separately heating the interior mold surface of the first mold portion is typically not required with the sheet molding embodiment of the present invention. In addition, in light of the residual heat retained within the heated thermoplastic sheet, separate or external heating of the heated thermoplastic sheet is typically not required with the sheet molding embodiment.

While maintained in intimate contour matching contact with the interior mold surface, the heated thermoplastic sheet is cooled. Cooling of the heated thermoplastic sheet results in the formation of a shaped thermoplastic sheet that retains the contour of the interior mold surface of the first mold portion. The heated thermoplastic sheet is typically cooled to a temperature that is less than the softening point or glass transition temperature of the thermoplastic sheet. When cooled to a temperature below its softening point or glass transition temperature, the thermoplastic sheet is no longer thermoformable, and as such retains the contoured shape of the interior mold surface.

Cooling of the heated thermoplastic sheet may be achieved by known means. For example, cool air may be passed over the first surface of the heated thermoplastic sheet. Alternatively or in addition thereto, the interior mold surface of the first mold portion may be cooled by means of a chilled fluid or coolant being passed through conduits (not shown) located under the interior mold surface of the first mold portion, by means of mold temperature control apparatus 375, and conduits 378 and 381 (FIG. 5).

After the thermoplastic sheet has been sufficiently cooled, the resulting shaped thermoplastic sheet (or molded article) is removed from the first mold portion at molded article removal station 21, in accordance with the description provided previously herein. To assist removal of the shaped molded article from the mold (e.g., the sheet mold) one or more ejector cores (not shown) may extend reversibly outward from the interior mold surface, in effect pushing the shaped thermoplastic sheet off of and away from the first mold portion. Alternatively, or in addition thereto, a gas (e.g., air) may be passed under pressure through the plurality of perforations (e.g., 525) in the interior mold surface, thereby lifting the shaped thermoplastic sheet/molded article off of and away from the first mold portion.

An excess portion of the thermoplastic sheet typically extends from the perimeter edge (e.g., 522) of the first mold portion 24 into the clamp interior 691 of the clamp portion 685 of the sheet retainer(s) 571. This excess portion of the thermoplastic sheet may be used to assist removal of the shaped thermoplastic sheet (or molded article) from the interior surface of the first mold portion. In an embodiment of the present invention and with reference to FIG. 18, after the thermoplastic sheet has cooled and hardened and with the excess portion of the thermoplastic sheet within (e.g., retained within) the clamp interior 691 of the clamp portion 685 of the sheet retainer(s) 571, frame support 559 and frame 550 are moved vertically upward, which results in the shaped thermoplastic sheet (153) being lifted off of and removed from interior surface 27 of first mold portion 24. With the excess portion of the thermoplastic sheet within the clamp portion of the sheet retainers, frame 550 may be moved vertically upward any suitable distance so as to effect separation of the shaped thermoplastic sheet from the first mold portion, such as 5%, 10%, 25%, 50%, 75% or 100% of the total vertical distance that frame 550 is moved in the method of the present invention (e.g., the total vertical distance traveled as depicted between FIG. 13 and FIG. 18).

The excess portion of the thermoplastic sheet extending from the perimeter edge of the first mold portion into the clamp interior 691 of the clamp portion 685 of the sheet retainer(s) 571, is typically detached along the perimeter edge at some point after the heated thermoplastic sheet has been drawn by reduced pressure into intimate contour matching contact with the interior mold surface of the first mold portion. The excess thermoplastic sheet material may be detached prior to or after the shaped thermoplastic sheet is removed from the first mold portion. Typically, the excess thermoplastic sheet material is detached after removal of the shaped thermoplastic sheet from the first mold portion.

The excess thermoplastic sheet material may optionally be detached after the shaped thermoplastic sheet is removed from the first mold portion. The excess thermoplastic sheet material may, for example, be used to secure and transport the shaped thermoplastic sheet (molded article) during post-molding operations, such as sanding, applying labels, cutting holes, inserting attachments and/or painting. After completion of the post molding operations, the excess thermoplastic sheet material may then be detached from the shaped thermoplastic sheet.

In the sheet molding embodiment, the heated thermoplastic sheet is typically detached from the sheet die at some point after it has been contacted with the clamp interiors of the sheet retainers, and before the shaped thermoplastic sheet is removed from the first mold portion. The heated thermoplastic sheet may be detached from the sheet die prior to, concurrently with or after the step of: positioning the first mold portion and the frame relative to each other so as to contact the second portion of the second surface of the heated thermoplastic sheet with at least a portion of the interior mold surface of the first mold portion. With reference to FIG. 16, heated thermoplastic sheet 153 has been detached from sheet die 113: after the first portion of the heated sheet has been retained within the clamp portions of the sheet retainers; and prior to positioning the first mold portion and the frame relative to each other so as to contact the second portion of the second surface of the heated thermoplastic sheet with at least a portion of the interior mold surface of the first mold portion.

The molding system of the present invention may further include a compression molding station (e.g., compression molding station 321), which includes a second mold portion having an interior mold surface, in which case sheet molding embodiment may further include the step of contacting compressively the interior mold surface of the second mold portion with the first surface of the heated thermoplastic sheet. Contact of the interior mold surface of the second mold portion with the first surface of the heated thermoplastic sheet, is performed: (i) after the second portion of the second surface of the heated thermoplastic sheet has been drawn into intimate contour matching contact with the interior mold surface of the first mold portion (by means of reduced pressure drawn through the perforations of the interior mold surface of the first mold portion); and (ii) before cooling of the heated thermoplastic sheet (and the corresponding formation of the shaped thermoplastic sheet).

Figure 26:
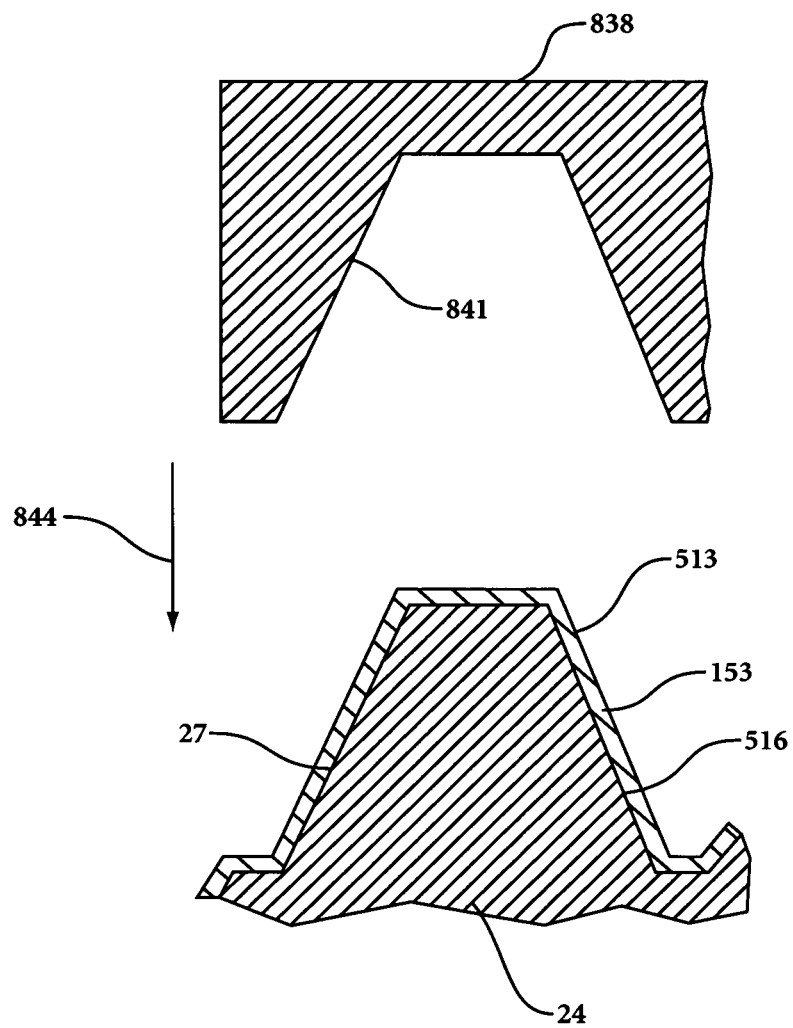
FIG. 26 is a representative partial side sectional view of a portion of the mold apparatus as depicted in FIG. 18, further including a second mold portion.

With reference to FIG. 26, second mold portion 838 has an interior mold surface 841. First mold portion 24 and second mold portion 838 are reversibly positionable relative to each other (e.g., along arrow 844), such that interior mold surface 27 of first mold portion 24 and interior mold portion 841 of second mold portion 838 are in reversibly positionable facing opposition relative to each other. More particularly, first surface 513 of heated thermoplastic sheet 153 and interior mold portion 841 of second mold portion 838 are in reversibly positionable facing opposition relative to each other (as depicted). When second mold portion 838 is moved in the direction represented by arrow 844 towards first mold portion 24, interior mold surface 841 of second mold portion 838 compressively contacts first surface 513 of heated thermoplastic sheet 153. Second mold portion 838 may be interchanged with second mold portion 330 of compression molding station 321, which may be operated in accordance with the description provided previously herein with regard to FIG. 8.

Interior mold surface 841 of second mold portion 838 is typically brought into compressive contact with first surface 513 of heated thermoplastic sheet 153 at a compressive force of 1.0 Kg/cm$^2$ to 4.0 Kg/cm$^2$ (14 to 57 psi), more typically from 1.2 Kg/cm$^2$ to 2.0 Kg/cm$^2$ (17 to 28 psi), and further typically from 1.3 Kg/cm$^2$ to 1.8 Kg/cm$^2$ (19 to 27 psi). In an embodiment, interior mold surface 841 of second mold portion 838 is typically brought into compressive contact with first surface 513 of heated thermoplastic sheet 153 at a compressive force of 1.5 Kg/cm$^2$ (21 psi).

Contact of the interior mold surface of the second mold portion with the first surface of the heated thermoplastic sheet may be undertaken for reasons including, but not limited to: imparting surface features into the first surface of the heated thermoplastic sheet; controlling the thickness of the sheet; and/or smoothing the first surface of the sheet. The interior mold surface of the second mold portion may be smooth, or it may include raised and/or lowered portions.

With the sheet molding embodiment of the present invention, the heated thermoplastic sheet may be a heated multilayer thermoplastic sheet having at least two thermoplastic layers, and accordingly the shaped thermoplastic sheet is a shaped multilayer thermoplastic sheet. Each thermoplastic layer may be formed from a separate thermoplastic composition, or the same thermoplastic composition. For example, each thermoplastic composition may be melt compounded so as to form separate molten thermoplastic compositions that are each separately fed into a multilayer sheet die, in accordance with art-recognized methods. The multilayer sheet die forms a heated multilayer thermoplastic sheet from the molten thermoplastic compositions fed therein.

Shaped thermoplastic sheets (or molded articles) that may be prepared with the sheet molding embodiment of the present invention may have complex 3-dimensional shapes, or relatively simple shapes, such as panels (e.g., wall panels, or wall panel covers). Molded articles that may be prepared according to the sheet molding embodiment of the present invention, include but are not limited to: fluid management structures, such as fluid/water management chambers, storm/waste water chambers, storm drains and culverts; storage structures; support structures or platforms (e.g., pallets); and shelters (e.g., shelters for domestic pets, such as dogs and cats).

In the method of the present invention, the polymer composition, introduced from the polymer introduction apparatus into contact with the interior mold surface of the mold, may be selected from thermosetting polymer compositions, thermoplastic compositions and combinations thereof. More typically, the polymer composition is a thermoplastic composition which includes at least one thermoplastic material. As used herein and in the claims, the term "thermoplastic material" and similar terms, means a plastic material that has a softening and melting point, and is substantially free of a three dimensional crosslinked network resulting from the formation of covalent bonds between chemically reactive groups, e.g., active hydrogen groups and free isocyanate groups. Examples of thermoplastic materials that may be included in the thermoplastic composition include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth)acrylates, thermoplastic acrylonitrile-butadiene-styrene, thermoplastic styrene-acrylonitrile, thermoplastic acrylonitrile-stryene-acrylate and combinations thereof (e.g., blends and/or alloys of at least two thereof).

In an embodiment, the thermoplastic material is selected from thermoplastic polyolefins. As used herein and in the claims, the term "polyolefin" and similar terms, such as "polyalkylene" and "thermoplastic polyolefin," means polyolefin homopolymers, polyolefin copolymers, homogeneous polyolefins and/or heterogeneous polyolefins. For purposes of illustration, examples of a polyolefin copolymers include those prepared from ethylene and one or more $C_3$-$C_{12}$ alpha-olefin, such as 1-butene, 1-hexene and/or 1-octene.

The polyolefins, from which the thermoplastic material of the thermoplastic composition, may be selected include, but are not limited to, heterogeneous polyolefins, homogeneous polyolefins, and combinations thereof. The term "heterogeneous polyolefin" and similar terms means polyolefins having a relatively wide variation in: (i) molecular weight amongst individual polymer chains (i.e., a polydispersity index of greater than or equal to 3); and (ii) monomer residue distribution (in the case of copolymers) amongst individual polymer chains. The term "polydispersity index" (PDI) means the ratio of $M_w/M_n$, where $M_w$ means weight average molecular weight, and $M_n$ means number average molecular weight, each being determined by means of gel permeation chromatography (GPC) using appropriate standards, such as polyethylene standards. Heterogeneous polyolefins are typically prepared by means of Ziegler-Natta type catalysis in heterogeneous phase.

The term "homogeneous polyolefin" and similar terms means polyolefins having a relatively narrow variation in: (i) molecular weight amongst individual polymer chains (i.e., a polydispersity index of less than 3); and (ii) monomer residue distribution (in the case of copolymers) amongst individual polymer chains. As such, in contrast to heterogeneous polyolefins, homogeneous polyolefins have similar chain lengths amongst individual polymer chains, a relatively even distribution of monomer residues along polymer chain backbones, and a relatively similar distribution of monomer residues amongst individual polymer chain backbones. Homogeneous polyolefins are typically prepared by means of single-site, metallocene or constrained-geometry catalysis. The monomer residue distribution of homogeneous polyolefin copolymers may be characterized by composition distribution breadth index (CDBI) values, which are defined as the weight percent of polymer molecules having a comonomer residue content within 50 percent of the median total molar comonomer content. As such, a polyolefin homopolymer has a CDBI value of 100 percent. For example, homogenous polyethylene/alpha-olefin copolymers typically have CDBI values of greater than 60 percent or greater than 70 percent. Composition distribution breadth index values may be determined by art recognized methods, for example, temperature rising elution fractionation (TREF), as described by Wild et al, Journal of Polymer Science, Poly. Phys. Ed., Vol. 20, p. 441 (1982), or in U.S. Pat. No. 4,798,081, or in U.S. Pat. No. 5,089,321. An example of homogeneous ethylene/alpha-olefin copolymers are SURPASS polyethylenes, commercially available from NOVA Chemicals Inc.

The polymer composition (e.g., thermoplastic polymer composition) may optionally include a reinforcing material selected, for example, from glass fibers, glass beads, carbon fibers, metal flakes, metal fibers, polyamide fibers (e.g., KEVLAR polyamide fibers), cellulosic fibers, nanoparticulate clays, talc and mixtures thereof. If present, the reinforcing material is typically present in a reinforcing amount, e.g., in an amount of from 5 percent by weight to 60 or 70 percent by weight, based on the total weight of the polymer composition. The reinforcing fibers, and the glass fibers in particular, may have sizings on their surfaces to improve miscibility and/or adhesion to the polymer materials into which they are incorporated, as is known to the skilled artisan.

In an embodiment of the invention, the reinforcing material is in the form of fibers (e.g., glass fibers, carbon fibers, metal fibers, polyamide fibers, cellulosic fibers and combinations of two or more thereof). The fibers typically have lengths (e.g., average lengths) of from 0.5 inches to 4 inches (1.27 cm to 10.16 cm). The polymer composition (e.g., the thermoplastic polymer composition) may include fibers having lengths that are at least 50 or 85 percent of the lengths of the fibers that are present in the feed materials from which the polymer composition is prepared, such as from 0.25 inches to 2 or 4 inches (0.64 cm to 5.08 or 10.16 cm). The average length of fibers present in the polymer composition may be determined in accordance with art recognized methods. For example, the polymer composition (or molded article prepared therefrom) may be pyrolyzed to remove the polymer material, and the remaining or residual fibers microscopically analyzed to determine their average lengths, as is known to the skilled artisan.

Fibers are typically present in the polymer composition, and accordingly the resulting molded article, in amounts selected independently from 5 to 70 percent by weight, 10 to 60 percent by weight, or 30 to 50 percent by weight (e.g., 40 percent by weight), based on the total weight of the polymer composition (i.e., the weight of the polymer material, the fiber and any additives). Accordingly, molded articles prepared by the method of the present invention may include fibers in amounts of from 5 to 70 percent by weight, 10 to 60 percent by weight, or 30 to 50 percent by weight (e.g., 40 percent by weight), based on the total weight of the molded article.

The fibers may have a wide range of diameters. Typically, the fibers have diameters of from 1 to 20 micrometers, or more typically from 1 to 9 micrometers. Generally each fiber comprises a bundle of individual filaments (or monofilaments). Typically, each fiber is composed of a bundle of 10,000 to 20,000 individual filaments.

Typically, the fibers are uniformly distributed throughout the polymer composition and the resulting molded article. During mixing of the fibers and the polymer composition, the fibers generally form bundles of fibers typically comprising at least 5 fibers per fiber bundle, and preferably less than 10 fibers per fiber bundle. While not intending to be bound by theory, it is believed based on the evidence at hand, that fiber bundles containing 10 or more fibers may result in a molded article (e.g., a shaped thermoplastic sheet) having undesirably reduced structural integrity. The level of fiber bundles containing 10 or more fibers per bundle, may be quantified by determining the Degree of Combing present within a molded article. The number of fiber bundles containing 10 or more fibers per bundle is typically determined by microscopic evaluation of a cross section of the molded article, relative to the total number of microscopically observable fibers (which is typically at least 1000). The Degree of Combing is calculated using the following equation: 100×((number of bundles containing 10 or more fibers)/(total number of observed fibers)). Generally, the polymer composition and resulting molded article each have a Degree of Combing of less than or equal to 60 percent, and typically less than or equal to 35 percent.

In addition or alternatively to reinforcing material(s), the polymer composition, may optionally include one or more additives. Additives that may be present in the polymer composition include, but are not limited to, antioxidants, colorants, e.g., pigments and/or dyes, mold release agents, fillers, e.g., calcium carbonate, ultraviolet light absorbers, fire retardants and mixtures thereof. Additives may be present in the polymer composition in functionally sufficient amounts, e.g., in amounts independently from 0.1 percent by weight to 10 percent by weight, based on the total weight of the polymer composition.

The present invention has been described with reference to specific details of particular embodiments thereof. It is not intended that such detailed be regarded as limitations upon the scope of the invention except insofar as and to the extent that they are included in the accompanying claims.

What is claimed is:

1. A method of forming a molded article comprising:
   a. providing a molding system comprising,
      i. a primary controller adapted to engage in wireless communications,
      ii. at least one carriage, each carriage being self-propelled and comprising a mold having an interior mold surface, a propulsion system comprising a drive motor drivingly coupled to a drive mechanism, a carriage controller operationally coupled to said propulsion system, and a carriage location indicator coupled to said carriage controller, said carriage controller being adapted to wirelessly communicate with said primary controller,
      iii. a polymer introduction station comprising a polymer introduction apparatus, a polymer introduction controller operationally coupled to said polymer introduction apparatus, and said primary controller being controllably coupled to said polymer introduction controller, and
      iv. a molded article removal station, wherein said primary controller is remotely located relative to each carriage, said polymer introduction station, and said molded article removal station, each carriage is reversibly positionable between said polymer introduction station and said molded article removal station, said primary controller is adapted to communicate wirelessly and controllably with each carriage controller, and said primary controller being free of a physical connection to each carriage;
   b. determining substantially continuously a location of each carriage by means of said carriage location indicator of each carriage;
   c. transmitting substantially continuously said location of each carriage from said carriage location indicator to said carriage controller of each carriage, and communicating substantially continuously and wirelessly said location of each carriage from said carriage controller of each carriage to said primary controller;
   d. communicating wirelessly a polymer introduction station position directive from said primary controller to said carriage controller, and providing operational polymer introduction station position instructions from said carriage controller to said propulsion system and correspondingly controlling movement of said carriage, thereby positioning said carriage at said polymer introduction station;
   e. communicating a polymer introduction directive from said primary controller to said polymer introduction controller, and providing operational polymer introduction instructions from said polymer introduction controller to said polymer introduction apparatus, thereby causing a polymer composition to be introduced from said polymer introduction apparatus into contact with said interior mold surface of said mold, thereby forming said molded article;
   f. communicating wirelessly a molded article removal station position directive from said primary controller to said carriage controller, and providing operational molded article removal station position instructions from said carriage controller to said propulsion system and correspondingly controlling movement of said carriage, thereby positioning said carriage at said molded article removal station; and
   g. removing said molded article from said mold of said carriage at said molded article removal station.

2. The method of claim 1 wherein,
   a. said primary controller is a primary programmable controller comprising a plurality of control programs;
   b. said carriage controller is a carriage programmable controller comprising at least one operational program; and
   c. said polymer introduction controller is a polymer introduction programmable controller comprising at least one operational program.

3. The method of claim 1 wherein said molding system further comprises a guide path,
   a. said guide path being a looped guide path;
   b. said polymer introduction station and said molded article removal station each being positioned separately along said guide path; and
   c. each carriage being separately and independently moveable along and directionally guided by said guide path.

4. The method of claim 3 wherein said guide path is a guide track, said guide track is a looped guide track, and said drive mechanism of each carriage engages drivingly with said guide track.

5. The method of claim 4 wherein said molding system further comprises an electric power strip that is separate from said guide track, said electric power strip being electrically coupled to each carriage and providing electric power to each carriage, and said electric power strip being a looped electric power strip.

6. The method of claim 5 wherein said electric power strip comprises
   a. a power box for each carriage, each power box being electrically and movably connected to said electric power strip, each power box comprising a power cable, and each carriage and power box forming a carriage-power box pair, wherein for each carriage-power box pair,
      i. said power cable being electrically connected to said carriage and providing electrical power to said carriage; and
      ii. said carriage comprising a pull rod extending outward from said carriage towards said power box, said pull rod comprising a cylinder that is slidingly and reversibly moveable along said pull rod, said cylinder and said power box having a cylinder-power box physical connection there-between that is free of electric power transfer,
   b. further wherein, as said carriage moves along said guide track, said pull rod, said cylinder and said cylinder-power box physical connection pulls said power box along said electric power strip and in electrical connection with said electric power strip, thereby maintaining said power cable electrically connected to said carriage.

7. The method of claim 3 wherein said molding system comprises at least two carriages, the carriages being movable in series along said guide path.

8. The method of claim 7 wherein each carriage comprises a forward collision detector, said forward collision detector being coupled to said carriage controller, said method further comprising:
   a. detecting, by said forward collision detector, an imminent collision of said carriage with a separate object forward of said carriage;
   b. transmitting, from said forward collision detector to said carriage controller, said imminent collision of said carriage with said separate object; and
   c. providing operational emergency stop instructions from said carriage controller to said propulsion system, thereby stopping forward motion of said carriage.

9. The method of claim 8 further comprising:
   a. communicating wirelessly, from said carriage controller to said primary controller, said imminent collision of said carriage with said separate object;
   b. communicating wirelessly, from said primary controller to the carriage controller of each carriage, a carriage emergency stop directive; and
   c. providing operational emergency stop instructions from the carriage controller to the propulsion system of each carriage, thereby stopping forward motion of each carriage.

10. The method of claim 8 wherein said forward collision detector comprises a collision sensor selected from the group consisting of physical contact sensors, optical sensors, infrared sensors, radar sensors and combinations thereof.

11. The method of claim 3 wherein
   a. said mold is a first mold portion, and said molding system further comprises a compression molding station interposed between said polymer introduction station and said molded article removal station,
   b. said compression molding station comprising a second mold portion held within a press, and a compression mold controller being operationally coupled to said press,
   c. said primary controller being controllably coupled to said compression mold controller, and said second mold portion having an interior mold surface, further wherein said polymer composition is introduced gravitationally onto said interior mold surface of said first mold portion from said polymer introduction apparatus,
   d. said method further comprising:
      i. communicating wirelessly, after introduction of said polymer composition onto said interior mold surface of said first mold portion, a compression molding station position directive from said primary controller to said carriage controller, and providing operational compression molding station position instructions from said carriage controller to said propulsion system and correspondingly controlling movement of said carriage, thereby positioning said carriage at said compression molding station,
      ii. communicating a compression molding directive from said primary controller to said compression mold controller, and providing operational compression molding instructions from said compression mold controller to said press, thereby causing said interior surface of said second mold portion to contact compressively said polymer composition introduced onto said interior mold surface of said first mold portion, thereby forming said molded article; and
      iii. communicating further operational compression molding instructions from said compression mold controller to said press, thereby causing separation of said interior surface of said second mold portion and said molded article from each other, and allowing for repositioning of said carriage to said molded article removal station.

12. The method of claim 3 wherein:
   a. said mold is a sheet mold,
   b. said interior mold surface of said sheet mold having a contour and a plurality of perforations;
   c. said polymer introduction apparatus comprises a sheet die; and
   d. said polymer composition being introduced gravitationally onto said interior mold surface of said sheet mold from said sheet die as an extruded sheet having a thermoformable temperature;
   e. said carriage further comprising a pressure reduction apparatus that is in fluid communication with said sheet mold and said plurality of perforations, and said carriage controller being operationally coupled to said pressure reduction apparatus;
   f. said method further comprising,
      i. communicating wirelessly a pressure reduction apparatus control directive from said primary controller to said carriage controller, and
      ii. providing operational pressure reduction apparatus instructions from said carriage controller to said pressure reduction apparatus, thereby drawing reduced pressure through said plurality of perforations and drawing said extruded sheet into contour matching contact with said interior mold surface of said sheet mold, thereby forming said molded article.

13. The method of claim 12 further comprising:
   a. communicating wirelessly a carriage forward velocity directive from said primary controller to said carriage controller, while said extruded sheet is gravitationally introduced onto said interior mold surface of said sheet mold; and
   b. providing operational carriage forward velocity instructions from said carriage controller to said propulsion system, thereby controlling the forward velocity of said carriage while said extruded sheet is gravitationally introduced onto said interior mold surface of said sheet mold, and correspondingly controlling thickness of said extruded sheet as it is gravitationally introduced onto said interior mold surface of said sheet mold.

14. The method of claim 1 wherein each carriage further comprises:
   a. a mold temperature control apparatus,
   b. each mold comprises at least one mold temperature sensor,
   c. each mold temperature sensor being coupled to said carriage controller,
   d. said mold temperature control apparatus being coupled to said mold, and
   e. said carriage controller being operationally coupled to said mold temperature control apparatus,
   f. said method further comprising,
   g. transmitting mold temperature values from each mold temperature sensor to said carriage controller,
   h. communicating wirelessly, after introduction of said polymer composition into contact with said interior mold surface of said mold and prior to removing said molded article from said mold, a mold temperature reduction directive from said primary controller to said carriage controller, and
   i. providing operational mold temperature reduction instructions from said carriage controller to said mold temperature control apparatus, thereby reducing temperature of said mold.

15. The method of claim 1 wherein wireless communication between said primary controller and said carriage controller is selected from the group consisting of radio frequency wireless communication, optical wireless communication and combinations thereof.

16. The method of claim 15 wherein wireless communication between said primary controller and said carriage controller is selected from radio frequency wireless communication.

17. The method of claim 1 wherein said molded article removal station comprises:
   a. a robotic molded article removal apparatus; and
   b. a molded article removal station controller that is operationally coupled to said robotic molded article removal apparatus, said primary controller being controllably coupled to said molded article removal station controller;
   c. said method further comprising:
      i. communicating, after positioning said carriage at said molded article removal station, a molded article removal directive from said primary controller to said molded article removal station controller; and
      ii. providing operational molded article removal instructions from said molded article removal station controller to said robotic molded article removal apparatus, thereby causing said robotic molded article removal apparatus to remove said molded article from said mold.

18. The method of claim 3 wherein, said polymer introduction station further comprises:
   a. a polymer introduction station position indicator; and
   b. said molded article removal station further comprises a molded article removal station position indicator; and
   c. said molding system further comprises at least one further position indicator, each further position indicator being separate from each carriage, said polymer introduction station, said molded article removal station, and each other further position indicator;
   d. further wherein determining continuously said location of each carriage comprises each carriage location indicator independently interacting with at least one of said polymer introduction station position indicator, said molded article removal station position indicator, and at least one further position indicator.

19. The method of claim 18 wherein said carriage location indicator is adapted to interact with each of:
   a. said polymer introduction station position indicator,
   b. said molded article removal station position indicator, and
   c. each further position indicator,
      by interaction means selected independently from the group consisting of physically tripped switch means, magnetic means, electromagnetic radiation means and combinations thereof.

20. The method of claim 18 wherein,
   a. said polymer introduction station position indicator is a polymer introduction station position indicator barcode,
   b. said molded article removal station position indicator is a molded article removal station position indicator barcode,
   c. each further position indicator is independently a further position indicator barcode,
   d. each carriage location indicator is independently a carriage location indicator barcode reader,
   e. further wherein determining continuously said location of each carriage comprises:
      i. each carriage location indicator barcode reader independently reading at least one of, said polymer introduction station position indicator barcode, said molded article removal station position indicator barcode, and at least one further position indicator barcode.

21. The method of claim 3 wherein:
   a. said carriage location indicator comprises a linear distance traveled measuring apparatus, and
   b. said looped guide path has a total looped guide path linear distance, wherein determining said location of said carriage comprises:
      i. selecting a zero linear distance start point on said looped guide path;
      ii. measuring continuously a linear distance traveled by said carriage by means of said linear distance traveled measuring apparatus relative to said zero linear distance start point; and
      iii. comparing continuously said linear distance traveled to said total looped guide path linear distance, thereby determining said location of said carriage on said looped guide path.

22. A molding system comprising:
   a. a primary controller adapted to engage in wireless communications;

b. at least one carriage, each carriage:
  i. being self-propelled and comprising a mold having an interior mold surface;
  ii. having a propulsion system comprising a drive motor drivingly coupled to a drive mechanism;
  iii. having a carriage controller operationally coupled to said propulsion system, and a carriage location indicator coupled to said carriage controller, said carriage controller being adapted to wirelessly communicate with said primary controller;
c. a polymer introduction station comprising:
  i. a polymer introduction apparatus;
  ii. a polymer introduction controller operationally coupled to said polymer introduction apparatus, and
  iii. said primary controller being controllably coupled to said polymer introduction controller;
d. a molded article removal station:
  i. wherein said primary controller is remotely located relative to each carriage, said polymer introduction station, and said molded article removal station,
  ii. each carriage is reversibly positionable between said polymer introduction station and said molded article removal station,
  iii. said primary controller is adapted to communicate wirelessly and controllably with each carriage controller, and
  iv. said primary controller being free of a physical connection to each carriage,
  v. further wherein operation of said molding system comprises:
    1. substantially continuous determination of a location of each carriage by means of said carriage location indicator of each carriage,
    2. substantially continuous transmission of said location of each carriage from said carriage location indicator to said carriage controller of each carriage, and substantially continuous wireless communication of said location of each carriage from said carriage controller of each carriage to said primary controller;
  vi. wireless communication of a polymer introduction station position directive from said primary controller to said carriage controller, and operational polymer introduction station position instructions provided from said carriage controller to said propulsion system and correspondingly movement of said carriage being controlled, said carriage thereby being positioned at said polymer introduction station,
  vii. communication of a polymer introduction directive from said primary controller to said polymer introduction controller, and operational polymer introduction instructions provided from said polymer introduction controller to said polymer introduction apparatus, a polymer composition resultantly being introduced from said polymer introduction apparatus into contact with said interior mold surface of said mold, a molded article thereby being resultantly formed, and
  viii. wireless communication of a molded article removal station position directive from said primary controller to said carriage controller, and operational molded article removal station position instructions provided from said carriage controller to said propulsion system and correspondingly movement of said carriage being controlled, said carriage thereby being positioned at said molded article removal station where said molded article is removed from said mold.

23. The molding system of claim 22 wherein:
  a. said primary controller is a primary programmable controller comprising a plurality of control programs;
  b. said carriage controller is a carriage programmable controller comprising at least one operational program; and
  c. said polymer introduction controller is a polymer introduction programmable controller comprising at least one operational program.

24. The molding system of claim 22 wherein said molding system further comprises:
  a. a guide path;
  b. said guide path being a looped guide path;
  c. said polymer introduction station and said molded article removal station each being positioned separately along said guide path; and
  d. each carriage being separately and independently moveable along and directionally guided by said guide path.

25. The molding system of claim 24 wherein:
  a. said guide path is a guide track;
  b. said guide track is a looped guide track; and
  c. said drive mechanism of each carriage engages drivingly with said guide track.

26. The molding system of claim 25 wherein said molding system further comprises:
  a. an electric power strip that is separate from said guide track;
  b. said electric power strip being electrically coupled to each carriage and providing electric power to each carriage; and
  c. said electric power strip being a looped electric power strip.

27. The molding system of claim 26 wherein said electric power strip comprises:
  a. a power box for each carriage,
  b. each power box being electrically and movably connected to said electric power strip,
  c. each power box comprising a power cable, and each carriage and power box forming a carriage-power box pair,
  d. wherein for each carriage-power box pair;
    i. said power cable being electrically connected to said carriage and providing electrical power to said carriage, and
    ii. said carriage comprising a pull rod extending outward from said carriage towards said power box,
    iii. said pull rod comprising a cylinder that is slidingly and reversibly moveable along said pull rod,
    iv. said cylinder and said power box having a cylinder-power box physical connection there-between that is free of electric power transfer,
    v. further wherein, as said carriage moves along said guide track, said pull rod, said cylinder and said cylinder-power box physical connection pulls said power box along said electric power strip and in electrical connection with said electric power strip, thereby maintaining said power cable electrically connected to said carriage.

* * * * *